April 29, 1952     J. R. DESCH ET AL     2,595,045
CALCULATING MACHINE

Filed March 20, 1940     11 Sheets-Sheet 1

Joseph R. Desch and
Robert E. Mumma
Inventors

By Earl Beust
Their Attorney

April 29, 1952   J. R. DESCH ET AL   2,595,045
CALCULATING MACHINE
Filed March 20, 1940   11 Sheets-Sheet 2
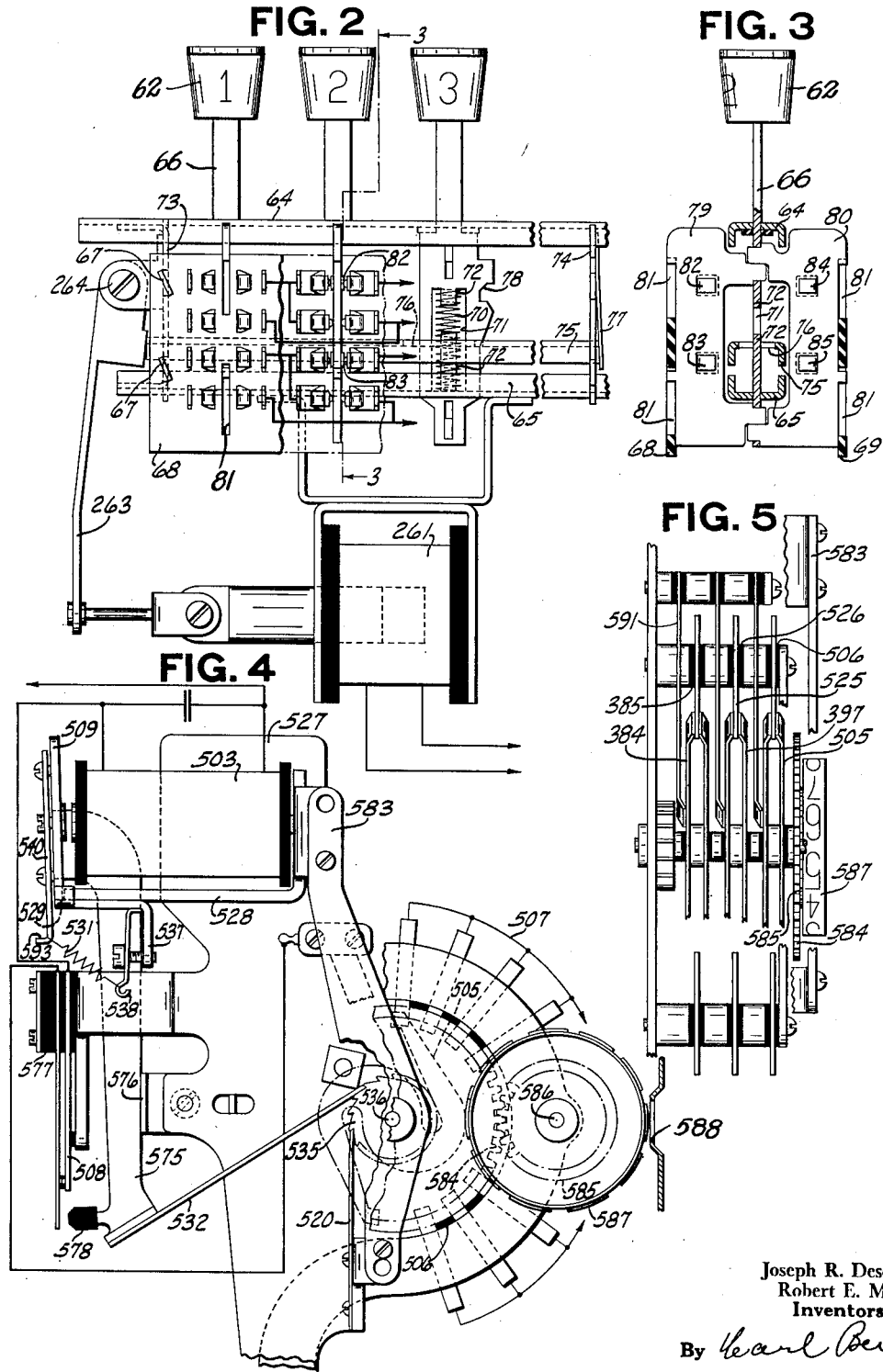
Joseph R. Desch and
Robert E. Mumma
Inventors
By
Their Attorney

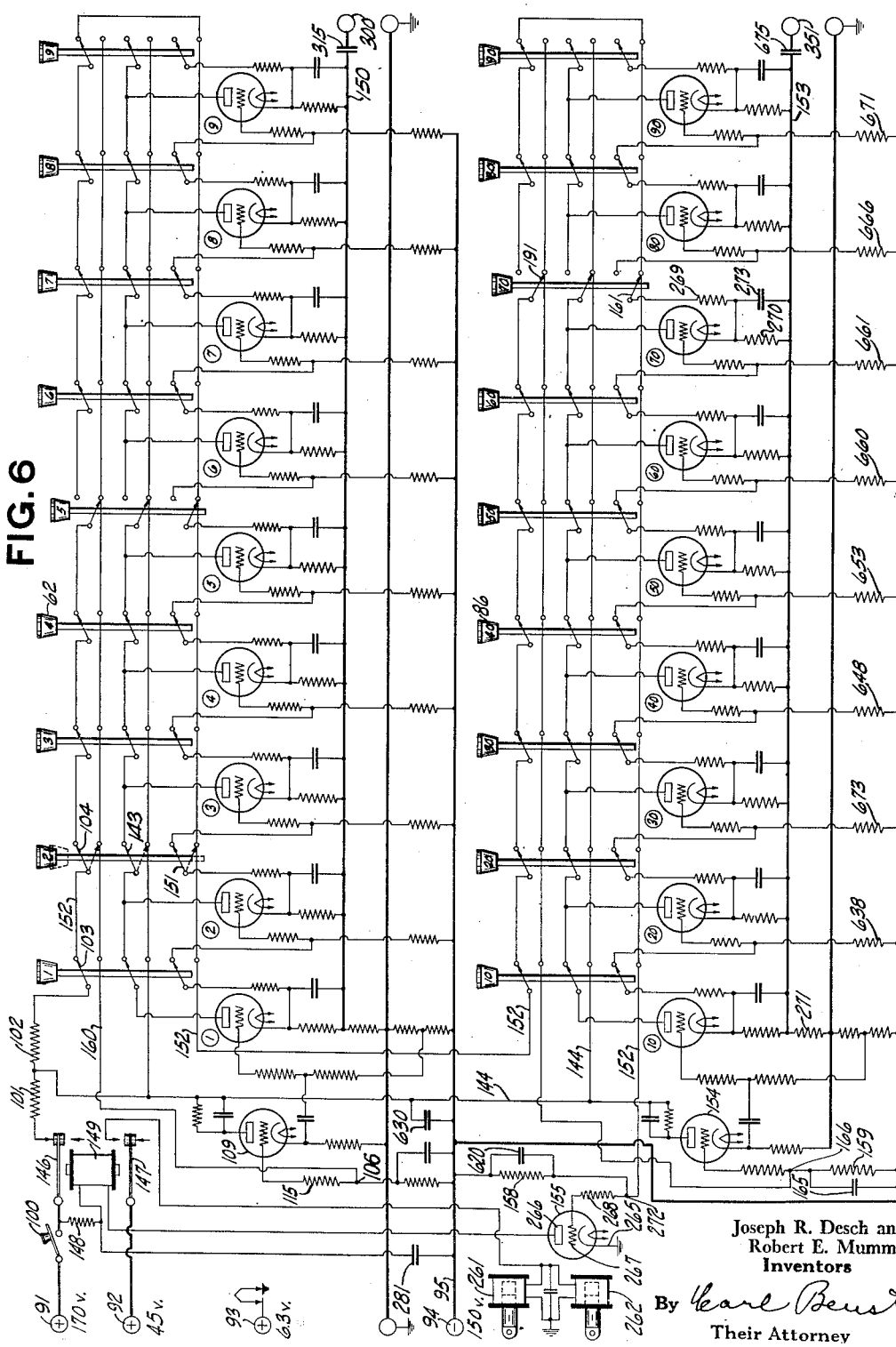

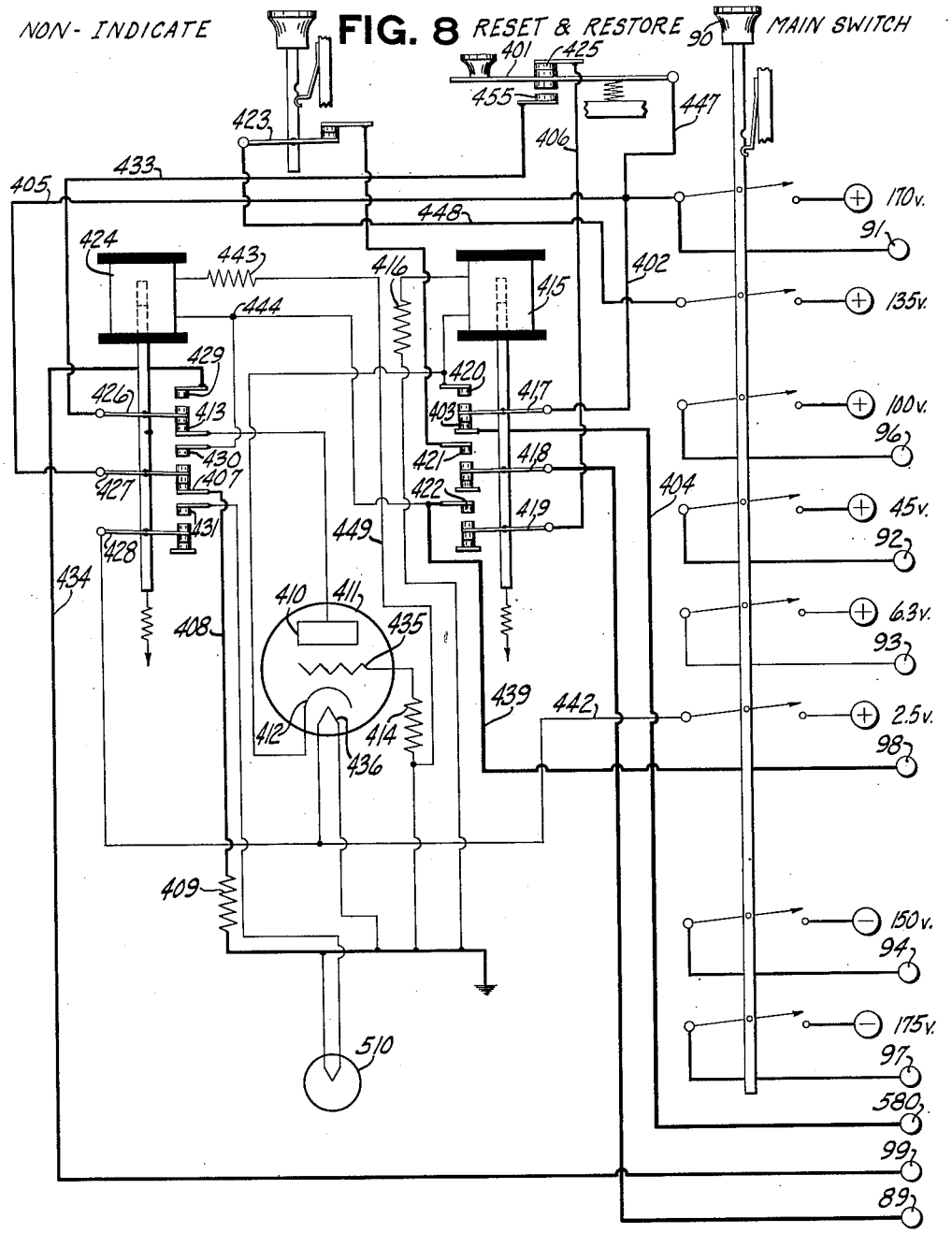

April 29, 1952 J. R. DESCH ET AL 2,595,045
CALCULATING MACHINE
Filed March 20, 1940 11 Sheets-Sheet 6

Joseph R. Desch and
Robert E. Mumma
Inventors

By Earl Benet
Their Attorney

April 29, 1952     J. R. DESCH ET AL     2,595,045
CALCULATING MACHINE

Filed March 20, 1940     11 Sheets-Sheet 7

Joseph R. Desch and
Robert E. Mumma
Inventors

By *Earl Benst*

Their Attorney

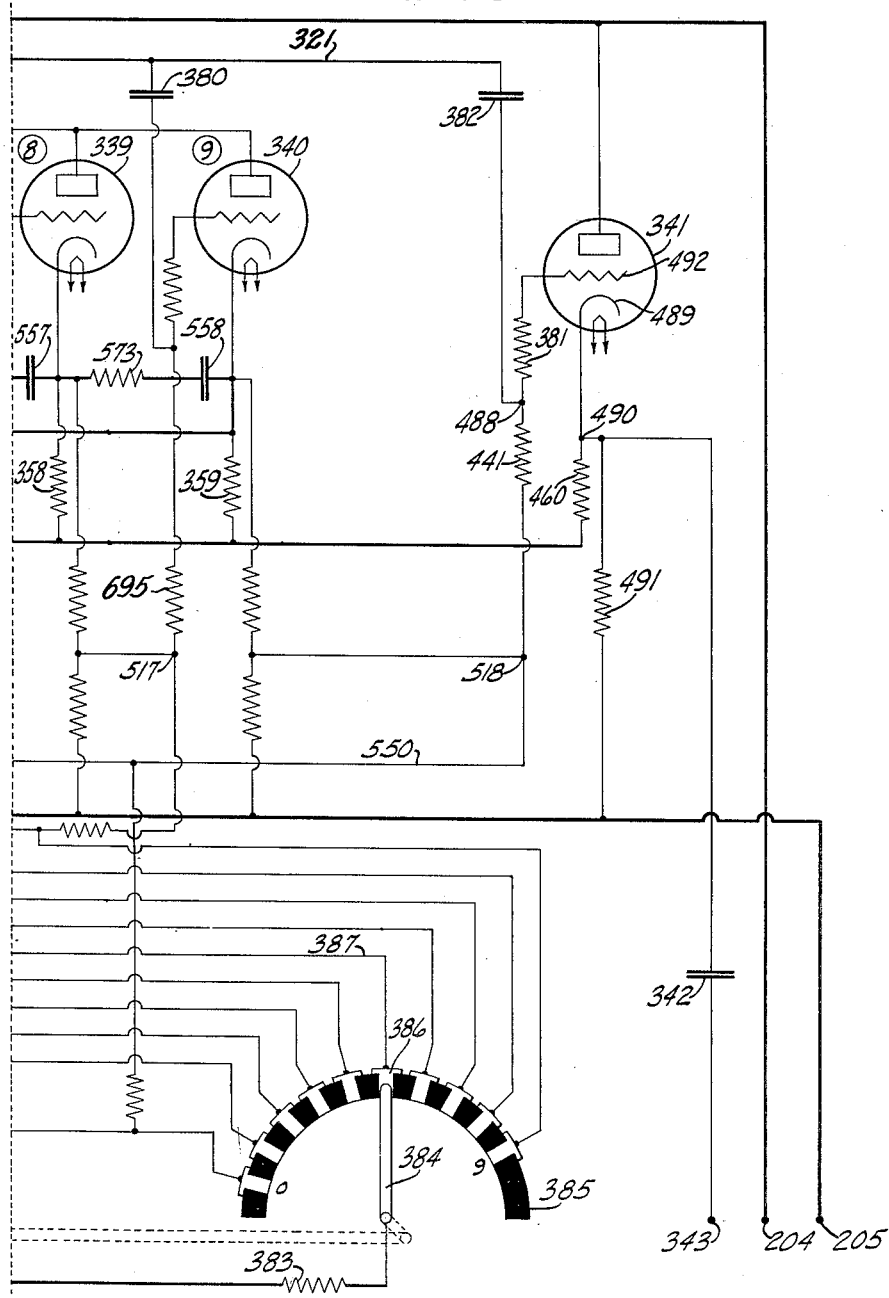

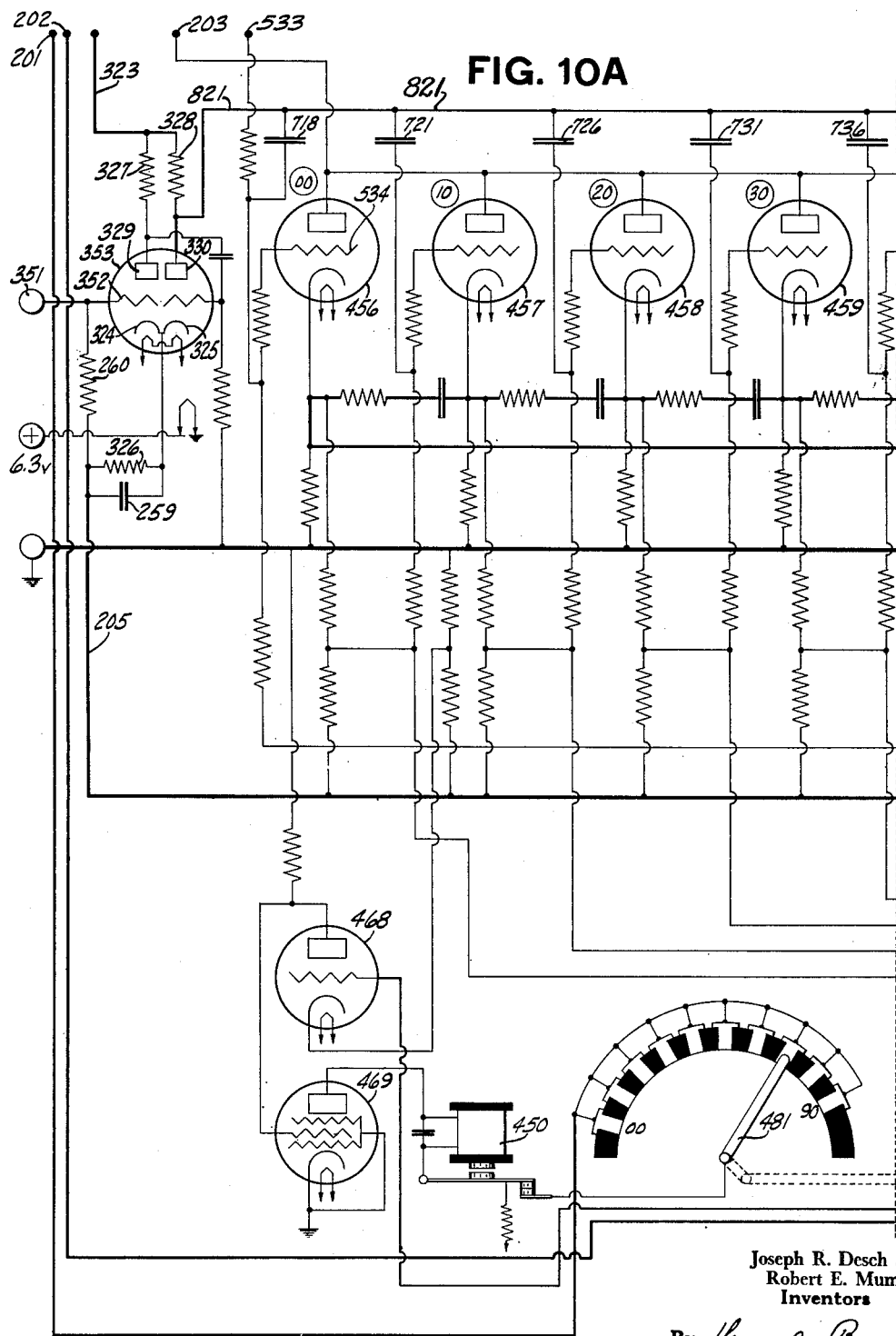

April 29, 1952   J. R. DESCH ET AL   2,595,045
CALCULATING MACHINE

Filed March 20, 1940   11 Sheets-Sheet 10

Joseph R. Desch and
Robert E. Mumma
Inventors

By *Kearl Beust*
Their Attorney

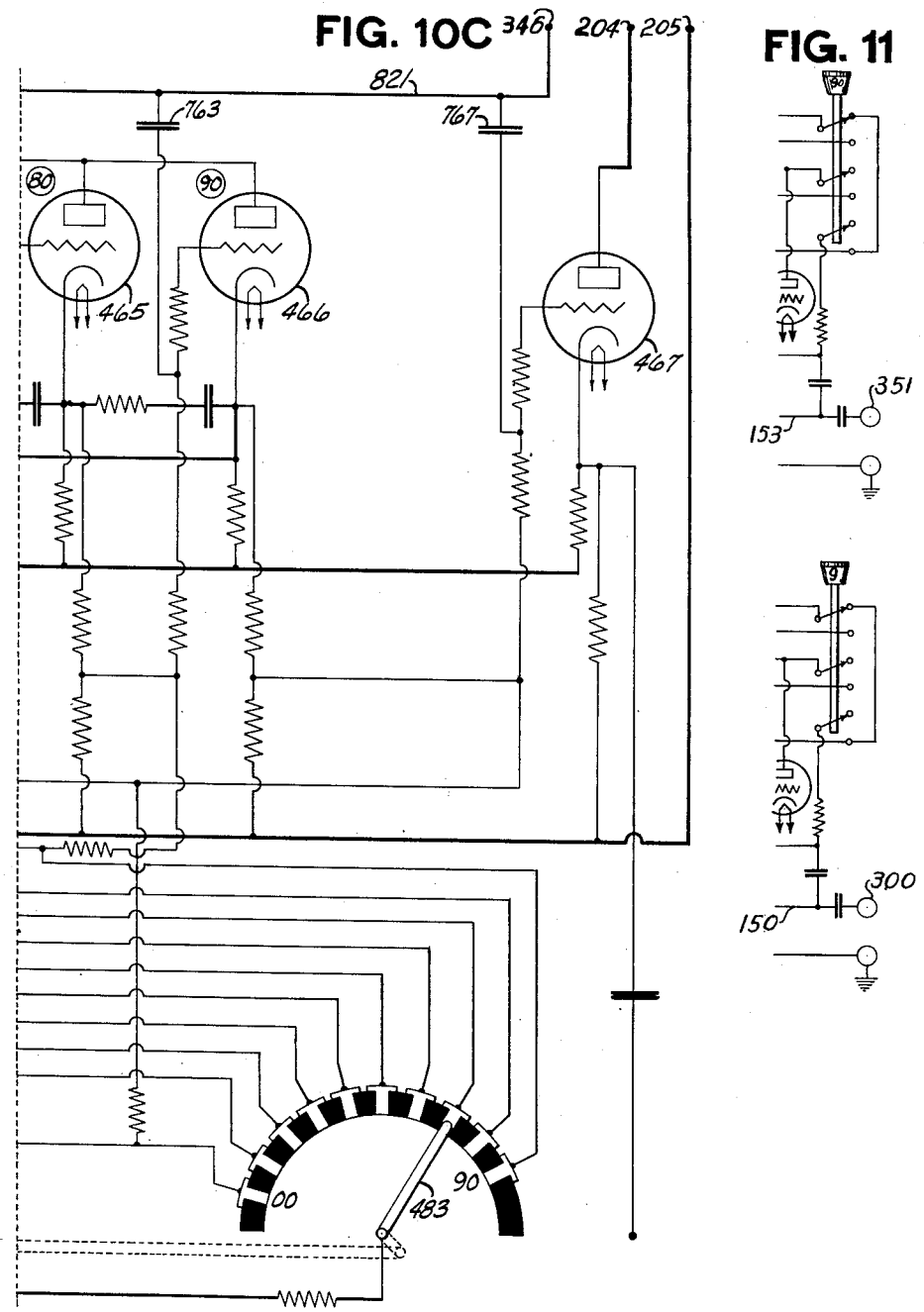

Patented Apr. 29, 1952

2,595,045

UNITED STATES PATENT OFFICE 2,595,045

CALCULATING MACHINE

Joseph R. Desch and Robert E. Mumma, Dayton, Ohio, assignors to The National Cash Register Company, Dayton, Ohio, a corporation of Maryland Application March 20, 1940, Serial No. 325,040

136 Claims. (Cl. 235—61)

This invention relates to calculating machines and more particularly relates to an electrical calculating machine that functions to differentially accumulate items solely by the flow of electric energy and without mechanical movement of any parts.

In this novel calculating machine, selected numerical data is entered by means of the differential action of electronic devices into an accumulator comprising a plurality of denominationally grouped electronic devices, the selective operation of which devices during a plurality of data-entering operations causes the accumulation of data. The relative electric condition of the electronic devices in the accumulator, as pertains to their conduction or nonconduction of electric energy, represents the digit value of accumulated data, which electric condition may be noted by observing the electronic devices or sensed by an electro-mechanical device for visual indication of the data. Neither the differential action nor the accumulating action of the machine involves any movement of the parts except for the flow of electric energy therethrough. Data to be entered into the accumulator may be derived from a denominationally-arranged keyboard controlling the differential action of a set of electronic devices, or the data standing on the visual indicator may be entered directly into the accumulator electronic devices without the use of keyboard-control.

The principal object of this invention is to provide a calculating machine which is much faster in operation than any such machine heretofore known.

Another object of this invention is to provide a calculating machine which is practically noiseless in operation.

Another object of this invention is to provide a calculating machine that can be manufactured at lower cost than machines now known, because of the fact that accurate operation does not depend upon the manufacture of parts to precise and accurate dimensions, thus eliminating the factor which has contributed greatly to the high cost of manufacture of such machines.

The foregoing and other objects of this invention are attained by providing an electrical calculating machine wherein selected data is entered and accumulated solely by the flow of electric energy without physical movement of any parts, except starting and stopping devices, and it is one of the principal objects of this invention to provide such a machine.

Another object of the invention is to provide a calculating machine accumulator having electronic devices as accumulating and storage means for numerical data.

Another object of the invention is to provide means for entering data into a numerical accumulator having electronic devices representing denominational digits.

Another object of the invention is to provide a calculating machine accumulator which has in operation no moving parts of ponderable mass.

Another object of the invention is to provide an accumulator of numerical data using electronic devices capable of receiving, accumulating and storing such data at the high speeds associated with purely electrical phenomena.

Another object of the invention is to provide means for producing a selected number of electric impulses in an electric circuit by operation of a selected number of electronic devices.

Another object of the invention is to provide means to produce a differentially-selected number of electric impulses at the extremely high speeds associated with purely electrical phenomena.

Another object of the invention is to provide an accumulator for a calculating machine and differential means for entering numerical data therein, said accumulator and differential means having, in operation, inertia and time factors of those negligible values associated with electrical phenomena.

Another object of the invention is to provide means whereby one group of electronic devices, operated one at a time in sequence, may cause the operation of another group of electronic devices one at a time in the operation sequence intervals of the first-mentioned group.

Another object of the invention is to provide an accumulator of numerical data necessitating, in entering differential data or in withdrawing accumulated data, no movement of the parts except their electrons or ions.

Another object of the invention is to provide means for transferring denominational carry-overs in an accumulator of numerical data solely by an electric impulse without physical movement of any parts.

Another object of the invention is to provide means to enter data into the denominational orders of an electronic numerical accumulator in denominational sequence.

Another object of the invention is to provide means for entering data into the denominational orders of an electronic accumulator of numerical data whereby the entry of carry-over data will not interfere with the entry of the selected data or vice-versa.

Another object of the invention is to provide an electronic numerical accumulator wherein stored data is represented by the relative electronic state of its parts, with an electro-mechanical means for sensing the stored data without disturbing the electronic condition of the accumulator.

Another object of the invention is to provide means for visually indicating the data in a numerical accumulator having the data stored therein in electronic devices.

Another object of the invention is to provide means to set an electronic type of numerical accumulator to represent zero.

Another object of the invention is to provide means to set a visible indicator to indicate the numerical condition of an electronic type of accumulator.

Another object of the invention is to provide means to set an electronic type of numerical accumulator in accordance with the data set up on a visual indicator, said entry being made without physical movement of any parts.

With these and incidental objects in view, the invention includes certain novel features of construction and combinations of parts, the essential elements of which are set forth in appended claims and a preferred form or embodiment of which is hereinafter described with reference to the drawings which accompany and form a part of this specification.

Of said drawings:

Fig. 2 is an elevation of a typical key bank, partly broken away.

Fig. 3 is a cross section through the key bank of Fig. 2 on the line 3—3.

Fig. 4 is a side elevation of the step-by-step operating magnet for one denomination of the indicator, the accumulator sensing means driven thereby, and the indicator set in accordance therewith.

Fig. 5 is a section through part of the commutator and wiper arm assembly of the accumulator sensing means shown in Fig. 4.

Fig. 6 is a wiring diagram of two sets of electronic devices, constituting two denominational orders, and exercising differential control over the accumulator.

Fig. 8 is a wiring diagram of the main switch and the manually-operated control circuits for non-indicating, resetting, and restoring operations.

Figure 9A:
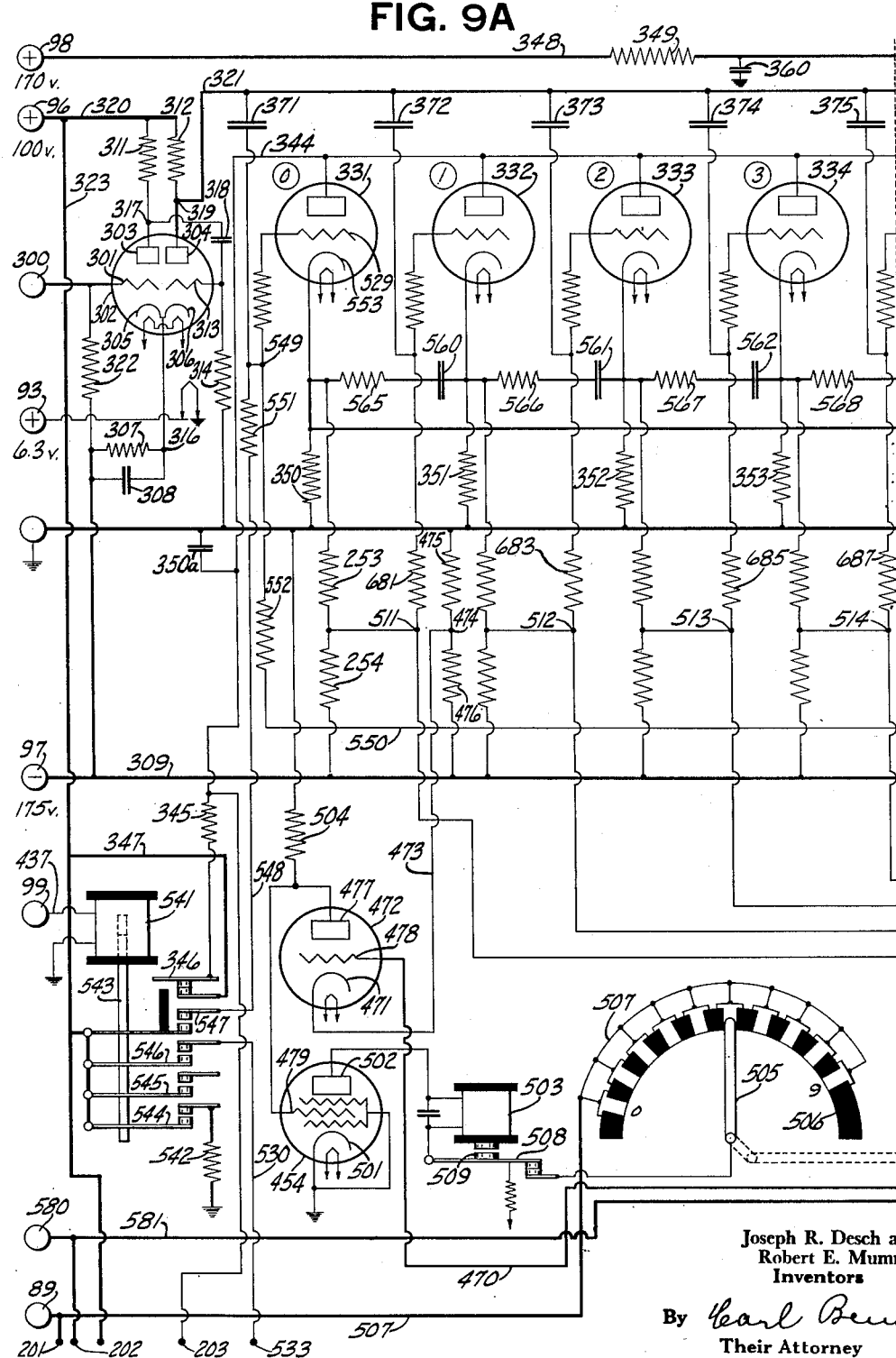
Figure 9B:
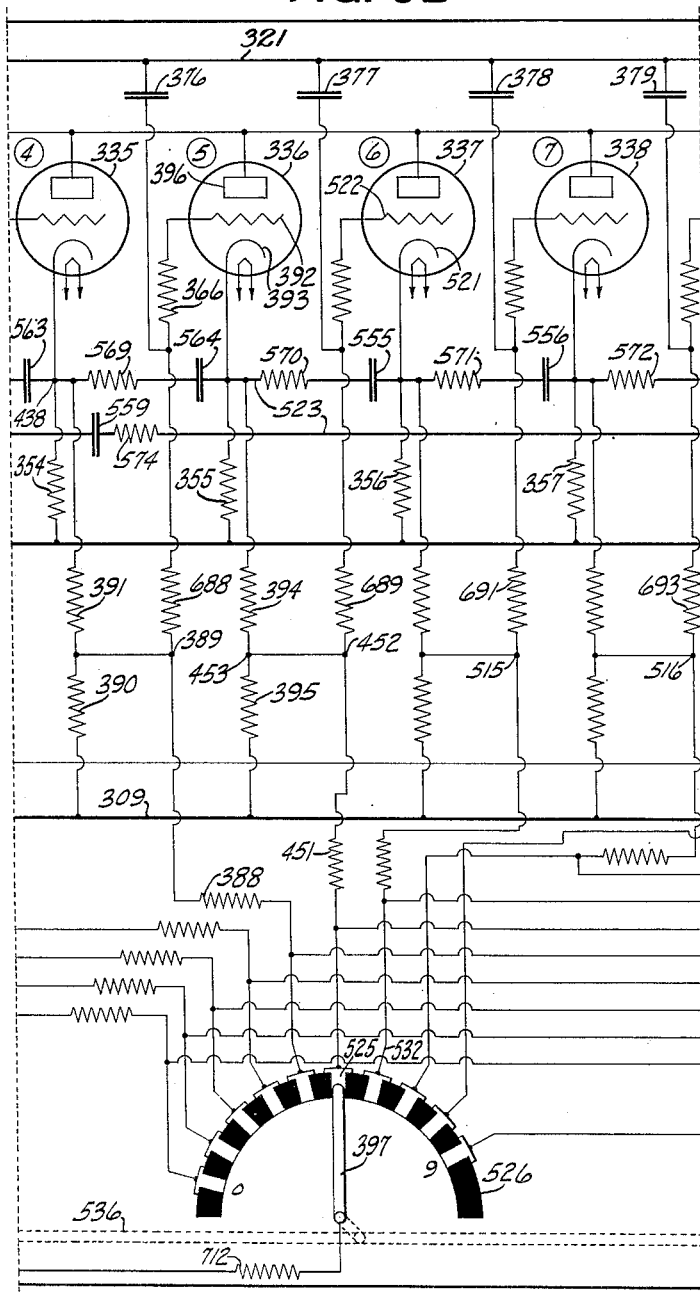

Figs. 9A, 9B, and 9C, taken together, form a wiring diagram of the units denomination of the accumlator.

Figure 10B:
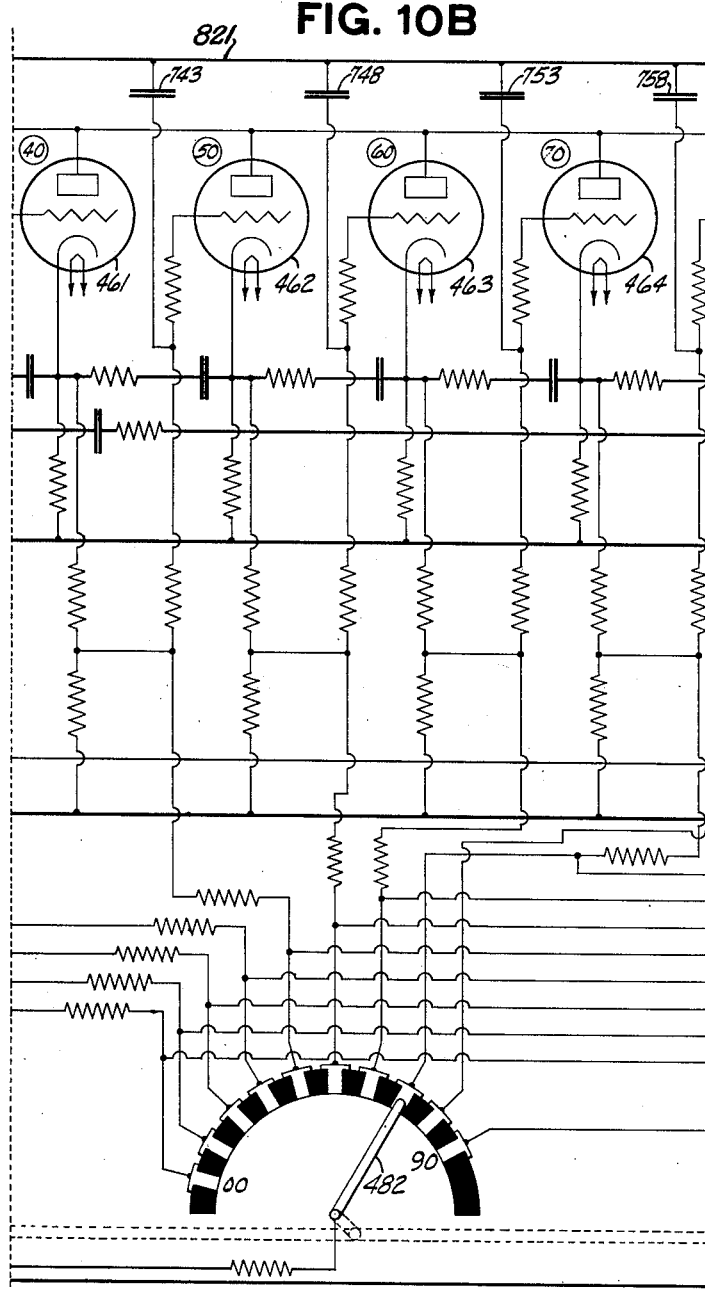

Figs. 10A, 10B, and 10C, taken together, form a wiring diagram of the tens denomination of the accumulator.

Fig. 11 is a fragment of a wiring diagram, similar to Fig. 6, showing the connections for causing entry of data into the accumulator starting with the highest denominational order.

General description

The machine embodying the invention may be conveniently considered by sections which are functionally comparable to the key banks, differential actuator, accumulator and visual indicator of a purely mechanical calculating machine. The relation of these sections, as regards their function, is shown diagrammatically in Fig. 1.

The calculating apparatus of our invention, which attains the objects stated hereinbefore, includes an accumulator for registering the items entered and for preserving the sum of such items, and such accumulator, broadly considered, comprises a plurality of sets of electron tubes, one for each denomination of the accumulator, each set including an electron tube for each digit of the denomination. The tubes of each set are connected in an endless operative chain so as to be rendered conductive or caused to operate one at a time in sequence, in response to sequences of electric potential impulses impressed on the corresponding denominational input conductor with which the set of tubes is coupled. The amount registered on the accumulator may be noted by observing which tubes of the sets are conductive.

Means are provided by which the completion of a sequential chain of operations of a set of tubes in the accumulator will produce automatically an electric potential impulse in the input conductor associated with the next higher denominational set of tubes, whereby to effect a carry-over from one denomination to the next higher denomination.

As indicated above, the accumulator is actuated by means of impulse sequences impressed upon the denominational input conductors, with which the sets of tubes are coupled. The accumulator is actuated differentially by means of an impulse generator, the output conductors of which are connected to the respective input conductors of the accumulator. Said impulse generator consists of a plurality of banks of electron tubes, one bank for each denomination, and each bank including an electron tube for each of the digits "1" to "9" inclusive. Each bank of electron tubes is so interconnected that, when operation of the first tube of the bank is initiated, the remaining tubes in the bank may be caused to operate automatically in sequence, and, as each tube in the bank operates, or becomes conductive, it generates an electric potential impulse which is transmitted to its output conductor and, hence, to the corresponding input conductor of the accumulator. A series of switches are provided for each bank of tubes, which switches are selectively operable to determine the number of tubes in the bank that will operate sequentially and, thus, determine the number of impulses in a sequence to be generated by the bank and transmitted to the corresponding denomination of the accumulator. These switches of the several banks are selectively controlled so that, on each denominational input conductor of the accumulator, there will be impressed an impulse sequence, having a number of impulses in the sequence corresponding to the digit, in the corresponding denomination, of the item to be entered. These switches may be selectively controlled by means of banks of digit keys, upon which the operator sets up the items to be entered.

The apparatus illustrated herein also includes an electro-mechanical sensing and indicating means for rendering visible and readable the data accumulated, which means acts to set the dials automatically with respect to the conductive condition of the tubes in the accumulator banks. The apparatus includes, also, means to reset the accumulator to zero; that is to say, means by which all tubes of the accumulator may be caused to cease operation and the zero tubes then caused to operate. The apparatus includes, also, means whereby the sensing and indicating means may be utilized automatically to set the accumulator in accordance with the amount standing on the indicator; that is to say, to cause those tubes of the accumulator to operate which correspond to the reading of the indicator. The apparatus includes, also, various control devices by which the operation of the apparatus is effectively controlled.

The disclosed machine has a keyboard of two denominations of nine keys each, representing the units and the tens denominational orders of the decimal system of numbers. These key banks may have set thereon any number from 1 to 99 for entry into the machine in one operation. The section corresponding in function to a differential actuator comprises units and tens denominational orders corresponding to the keyboard, each of which denominational orders acts under control of its associated key bank to enter data into the accumulator, and is purely electrical, having no moving parts except for the key release and the "single operation" control cooperating therewith. This section is referred to hereinafter as the "differential actuator." The accumulator is purely an electrical device and has, in addition to the units and tens denominational orders represented on the keyboard, a hundreds or overflow denomination. The accumulator includes a purely electric means associated with each denominational order of the accumulator for transferring carry-overs from one denomination to the next higher denomination. The visual indicator may be set by an electro-mechanical sensing means for each denomination, which means sense, and are controlled by, the data-representing electrical condition of the associated denominational order of the accumulator. The principle embodied in the disclosure can be expanded indefinitely in respect to the number of key bank controlled denominations and in respect to the number of overflow denominations and their associated indicator units. The drawings disclose this sectional plan of construction of the machine. The keys, certain controls dealing with special operations, the key release mechanism, and the sensing and the indicating devices are the only mechanically moving elements in the machine. While the drawings show only two denominational orders in the keyboard and three in the accumulator and in the indicator, as many additional denominational orders may be used as desired.

After the keys have been manually set and a starting switch 100 (Figs. 1, 6, and 7) has been closed, the data is entered into the accumulator with a speed limited only by ordinary electrical circuit characteristics, such as resistance, capacity, inductance, and ionization time, and not limited by the physical movement of any mechanical part. Data may be entered into the accumulator many times faster than it takes to set up the data manually on a keyboard and to close the starting switch. An approximate time may be computed for the entry of data into such an accumulator if the circuit characteristics are known. In the circuit to be described, the circuit element values are given as typical. In the particular embodiment based on these values, the longest time required to enter data of two denominational digits, after closing the starting switch, is approximately .0022 second, being the time required to enter the number "99," which is longer than the time required to enter the number "10."

It is within the purview of this invention to use any of the well-known means for controlling the entry of data, other than the manual keyboard described herein; for instance, the switching of the differential actuator circuits may be controlled by any of the well-known methods for sensing data such as that represented on record materials by perforations, light-controlling areas, electrically-conductive areas, or magnetized areas. The key bank control is used in this embodiment as one example of selective circuit-switching means.

The electro-mechanical sensing and indicating means is constantly ready to indicate new totals as new data is entered and is relatively slow in operating compared with the time taken to make an entry of data into the accumulator, yet it will follow the operation of the accumulator and ultimately indicate the amount finally stored in the accumulator, as it is not positively connected to the accumulator, but merely explores its electrical condition until the amount finally stored in the accumulator is sensed, and then stops. If the amount changes, the exploring commences again. The indicator is mechanically attached to and shows the position of the exploring means at any time.

Figure 1:
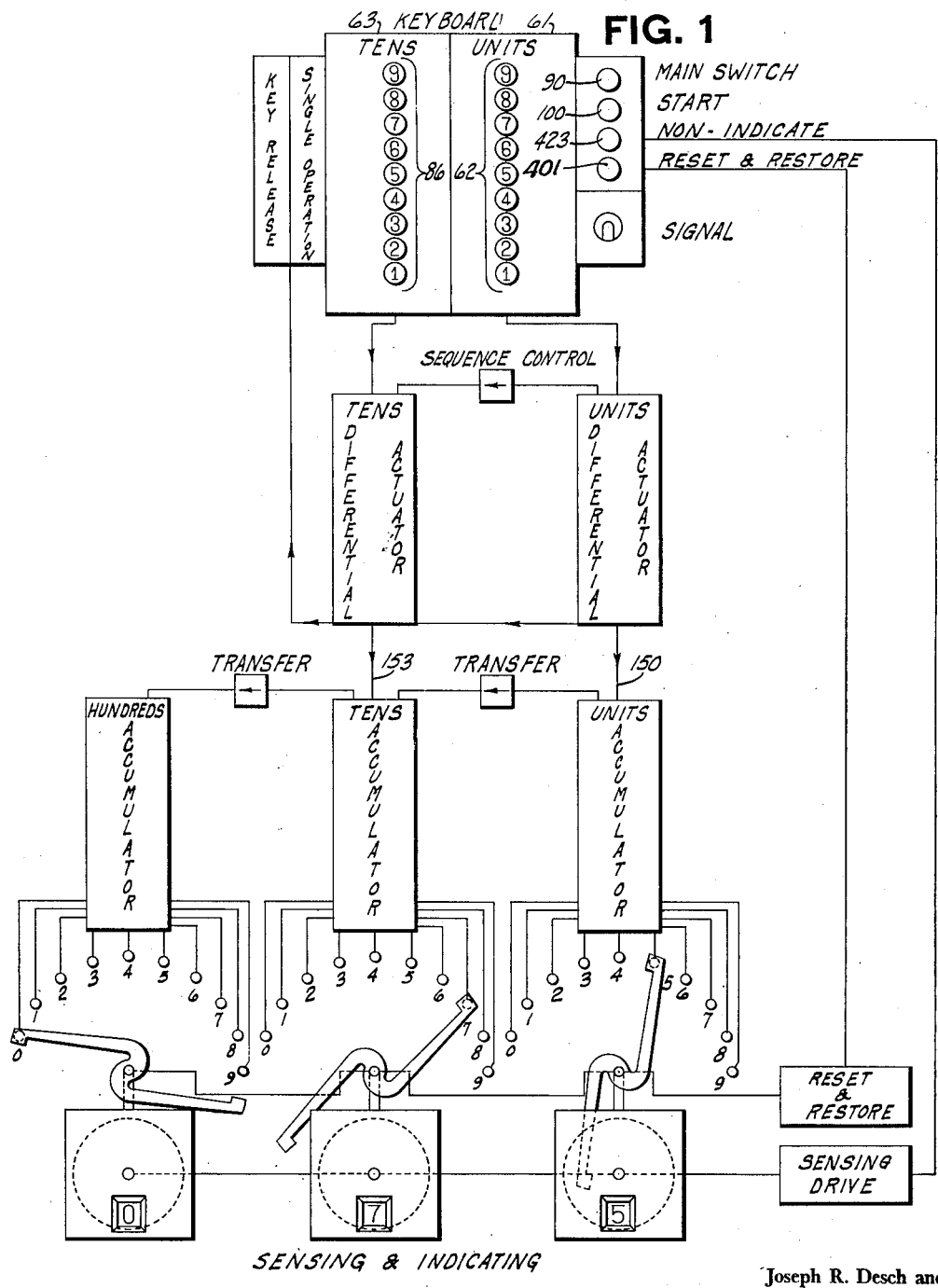
Fig. 1 is a diagrammatic chart explanatory of the functional relation between the several units of the machine.

The differential actuator (Figs. 1 and 6) is composed of a group of nine grid-controlled gaseous electron discharge tubes for each denominational order. The tubes in each denominational order consist of a "starting" tube and the nine tubes representing the nine digits 1, 2, 3, 4, 5, 6, 7, 8, and 9. These tubes are arranged in a circuit whereby, commencing with the starting tube, they may be fired and rendered electrically conductive one at a time in sequence, one tube being fired by the conditions occurring during the starting of conduction in the next lower tube, which lower tube itself is extinguished as the next tube in the series is rendered conductive. The starting tube in a denominational series is fired by closing the starting switch 100 (Figs. 1 and 6) to commence the automatic sequential operation. The firing of the starting tube fires the "1" tube and the firing of the "1" tube fires the "2" tube. The firing of the "2" tube fires the "3" tube and extinguishes the "1" tube. This process continues until the tube representing the depressed key is reached, which tube, upon being fired, cannot fire the tube having the next higher digit value as the anode-energizing circuit of the tube having the next higher digit value is broken by a switch operated by the depressed key. The firing of each tube in a denominational series, except the starting tube, impresses an electric potential impulse upon an output conductor common to all the digit-representing tubes of the denomination. There is one output conductor for each denominational order of the actuator, and each output conductor is connected to the corresponding denominational order of the accumulator, as indicated by reference numbers 150 and 153 (Figs. 1 and 6). The number of impulses impressed on each denominational output conductor in a given operation is equal to the value of the depressed key in that denomination.

The denominational groups of the differential actuator are themselves operated sequentially, the firing of the tubes of the group in the units denominational order being completed before the firing of the tubes in the group in the tens denominational order commences, or vice versa, if desired, as will be explained. Timing elements have been provided in each group of tubes of the differential actuator, which elements are operable, when the lower denominations are operated first in the sequence, to give a slight pause before the sequential firing of the next higher denominational group of tubes commences, to permit denominational carry-overs to be made to that denomination of the accumulator without interference with the entry of the differential data. The electric potential impulses, as they occur in the respective output conductors from the differential, actuate their respective accumulator orders, each impulse being so timed as to be reecived by the accumulator before the next impulse is produced.

The accumulator consists of the three denominational orders, units, tens, and hundreds. Each denominational order of the accumulator consists of ten grid-controlled gaseous electron discharge tubes representing the digits 0, 1, 2, 3, 4, 5, 6, 7, 8, and 9, which are arranged in a circuit so that they are fired one at a time in endless chain sequence, either by the impulses sent through the output conductor of its associated differential actuator, or by impulses produced by the transfer device, with the exception of the overflow denomination, which is actuated only by the impulses from the transfer device of the next lower denominational order. The carry-overs from one denomiation to the other are made by having an extra electric impulse introduced in the next higher denominational order upon the entry of the next impulse in the lower order after any "9" digit representing tube has been fired in that lower order, said impulse in the lower order also having its regular function of firing the "0" or zero tube in the lower order. Inasmuch as the denominational groups of tubes of the differential actuator are fired in sequence, the accumulator orders are added into in the same sequence. In the circuits as disclosed, the pause between operations of the different groups of tubes of the actuator is provided for the purpose of allowing the denominational carry-over impulse, if any, to actuate the next denomination of the accumulator before impulses from the differential actuator actuate it. Such interference between carryover impulses and differential impulses may be rendered impossible by entering the data into the higher denominational order before entering it into the next lower denominational order, which is done by arranging for the highest order of the differential actuator to be operated first. This may be accomplished by using the units keys (Fig. 1) as tens keys (Fig. 11), and using the tens keys as units keys and having output conductor 150 lead to the tens bank input terminal of the accumulator and having the conductor 153 lead to the units bank input terminal of the accumulator.

The accumulator, after having data entered therein, has one tube in each denomination remaining in a conductive state, said tube representing the digit in that denomination, of the sum of the accumulated data. Subsequent entries of data into a denomination cause a continuation of the sequential chain firing of the tubes, beginning with the tube having the next higher digit value to the conductive tube. Thus, the accumulator differs from the actuator in that one tube, in each order, is maintained conductive between data-entering operations. Each tube in the differential actuator is fired by the preceding tube, whereas the tubes in the accumulator are fired by the impulses from the differential actuator.

A sensing means is provided for each denominational order of the accumuator, the presence of a "zero" tube in each denominational order of the accumulator making it possible to sense the zero or cleared condition of a denomination in a positive manner. The normally operative sensing means of each denomination explores the condition of the accumulator tubes through electrically-connected contacts, one by one, until a contact representing a conductive tube is located, whereupon the operation of the sensing means is made to cease and the number which that tube represents is thereby made visible by a number wheel set in accordance with the position of the then stationary sensing means. The sensing means has exploring or wiper arms representing a denomination, which arms when the sensing means is operative, move over the sensing contacts until a conductive tube is sensed in the particular denomination. If the wiper arm is stationary on the contact related to a conductive tube and the tube is extinguished by the entry of data into the accumulator, the exploring movement of the wiper arm will commence and continue until the new contact representing the new accumulation is found.

The accumulator is cleared or set to zero by extinguishing all the tubes and subsequently firing the zero tubes in each denomination. The sensing means then resume their exploring operation and stop at zero in each denomination because those tubes are now conductive.

If the main supply of electric current be switched off by main switch 90 (Figs. 1 and 8), deenergizing the accumulator and the sensing means before resetting the accumulator to zero, the indicator will still have set thereon the last amount in the accumulator. The accumulator eelctron tubes, being deprived of current will have no tube conductive and therefore will have no data therein. Under these conditions, in the event the main supply of current is again turned on by closing switch 90, the accumulator is caused, by the flow of energy through certain wiper arms, set with those previously referred to, to render the proper tubes conductive in accord with the data on the indicator. This restoring of data into the accumulator is accomplished automatically, as will be explained.

A non-indicate key switch 423 (Figs. 1 and 8) has been provided so that, upon opening said switch, the accumulator may be operated without the indicator functioning. If the switch 423 is closed after data-entering operations, the indicator will be set in accordance with the accumulated data.

The action of grid-controlled gaseous discharge electron tubes such as those used in the differential actuator and accumulator, is well known. An electric potential of sufficient magnitude impressed between a cathode and an anode in a gas-filled envelope is controlled by an intervening grid element which is normally provided with a negative bias potential with relation to the cathode so as to prevent the flow of electrons to the anode. If the biasing grid potential is reduced to a point where it is no longer in control of the emission of electrons from the cathode, current will flow at once through the tube from the anode to the cathode and in so doing will ionize the inert gas within the tube. The ionization of the gas within the tube causes an increase in the flow of electrons from the cathode to the anode and renders the grid incapable of further blocking the electric flow. This flow, once started, will continue even though the grid be restored to its controlling bias potential, and will not cease until the cathode-anode current is interrupted by some other means. When the gas in the tube is ionized and the electron flow has started, the tube is said to have been fired, discharged, or rendered conductive. This is also called the operating condition of the tube and whenever, in this specification and the claims, reference is made to causing an electron tube to operate, it is intended to mean the bringing of such tube to the condition of maximum conductivity. The conductive tube may be extinguished, or rendered non-conductive, either by adjusting the cathode capacity and resistance so that for an instant, as the capacitors are charging, there is no flow of current from the anode, or by shutting off the potential completely. Under these conditions the grid, if at controlling bias potential, resumes control. Both of these phenomena are used in the disclosed machine, as will be explained. Ordinarily the bias potential of the grid with relation to the cathode is not kept at a hair-trigger point, but at a substantial bias, thus rendering the tube more stable and unresponsive to slight fluctuations of potential of the grid.

The automatic sequential firing of the tubes in the differential actuator is accomplished by placing a high resistance in the cathode supply circuit of each tube, which causes an abrupt positive rise in potential of the cathode of a tube as it fires, and this abrupt rise in potential is utilized through interconnecting circuits to extinguish the tube of next lower digit value in the series by temporarily raising its cathode potential above the potential of the anode, and, by the same positive potential rise, to destroy the grid control of the tube having the next higher digit value, causing it to fire unless it be cut out by switch means operated by a digit-representing key.

In the accumulator, the same phenomenon— the rise in potential of the cathode when the tube fires, caused by placing a high resistance in the cathode supply—is used to extinguish the tube having the next lower digit value in the series, as is the case with the differential actuator, and to weaken the grid control of the tube having the next higher digit value by reducing its bias to the trigger point so that the next potential impulse from the differential actuator, which impulses are common to all the tubes of the accumulator series, will cause only the tube with the weakened grid bias to fire. More detailed explanation will be given on this subject as the accumulator is describe more particularly.

The digit keys, by operating switches, control the stopping of the firing of the tubes in each of the differential groups after predetermined numbers of tubes have been fired. As each tube is fired it produces, by the rise in its cathode potential, an electric impulse in a conductor common to all the differential actuator tubes in the denomination, which impulse is conveyed to the corresponding order of the accumulator, which causes the firing of the tube next in numerical order. Thus, except for the release of the keys after the entry of the data and except for the means to prevent a repeat entry while the keys are still depressed, there are no movements of mass involved in data-entering operations except the mass of electrons and ions causing the electric current. The only factors which limit the speed of the entry of data are electrical in nature and are placed in the circuit for the proper timing of the impulses and firing of the electronic devices.

The speed of the actual entry of data into the accumulator is so extremely rapid that the time of making such an entry is negligible in comparison with the duration of the manual movements necessary to press the starting key. The time lapse between the pressing of the starting button and the consequent firing of the tubes in the differential actuator and the accumulator may be as short as .001 second for the entry of a single digit. From this it will be apparent that the speed of making an entry into the accumulator is extremely fast in comparison to the speed with which the data may be set up either by manual keys as shown in this embodiment or by other more rapid data entry control means such as mechanically-sensed, electrically-sensed, or light-sensed records, which data entry control means have been mentioned as within the purview of the disclosure.

The diagrammatic representation shown in Fig. 1 illustrates the denominational groups in the differential actuator, the accumulator, and the indicator. These groups may be added to as desired. There may be more than one overflow denomination if desired, but there must be one accumulator order for each denomination of the differential actuator and one indicator for each denomination of the accumulator.

The principle of the invention, as set forth in this disclosure, is embodied in a machine having certain electric supply potentials and electronic devices of certain electrical characteristics. In balancing the circuits, resistors and capacitors having a fixed relationship with one another are used. Electronic devices or potentials of different characteristics may be used without departing from the principle of this invention, merely by using different values of resistance and capacity to obtain the relationship disclosed herein.

*The keyboard*

The keyboard consists of a units denomination key bank 61 (Fig. 1) having nine digit keys 62 (Figs. 1, 2, 3, and 6) and a tens denomination key bank 63 having nine digit keys 86 (Figs. 1 and 6). The keys in each bank are of similar construction and a description of the keys in one bank will be sufficient for an understanding of all the keys.

Each key has a stem 66 (Figs. 2 and 3) slidably mounted in alined holes in a top plate 64 and a bottom plate 65 of a unitary key frame, said plates being spaced and fastened together by transverse vertical webs 73 and 74 (Fig. 2) each of which has laterally projecting ears 67 to engage side plate members 68 and 69 (see also Fig. 3) of the key frame. Each key is provided with a restoring spring 70 (Fig. 2) which engages the bottom plate 65 and is contained in a slot 71 in the key stem where it is retained by projections 72. As a key is depressed, the spring compresses against the bottom plate 65, giving the key an upward restoring urge. The keys are limited in their upward motion by a shoulder on the key stem 66 striking the top plate 64. A key locking plate 75 (Figs. 2 and 3), having clearance holes 76 for each key stem, is slidably mounted in clearance holes in the webs 73 and 74. The locking plate 75 is urged to the left, as shown in Fig. 2, by spring 77 until the edges of the key clearance slots contact the key stems. As a key is depressed, the locking plate is forced to the right by a camming surface on the key stem, until notch 78 allows the locking plate to move to the left, locking the key in depressed position. By chamfering each of the notch edges, the action of the key bank is made flexible, causing any depressed keys in the bank to be restored when another key in the bank is depressed. Each key stem has inserted therein an insulating web formed of two pieces 79 and 80 (Fig. 3) having ears projecting into slots in the key stems 66 and into guiding slots 81 in the side plate members 68 and 69, so that the insulating web pieces slide up and down with the keys. On each web are four contacts 82, 83, 84, and 85 (Figs. 2 and 3), each of which contacts in the up position can close a circuit between one pair of switch points and in the down position can close a circuit between another pair of switch points. These switch points are supported by the side plate members 68 and 69. Therefore, by the depression of a key, four circuits may be broken and four circuits may be closed. The invention uses but three of these four available pairs of switch points, the description of this key bank being given to illustrate one way in which multiple switching may be accomplished by a single key. A key release solenoid 261 for the units bank of keys (Figs. 2 and 6), when energized, moves lever 263 counter-clockwise, around pin 264, to move the locking plate 75 to the right and release a depressed key. A similar solenoid 262 causes the release of any depressed key in the tens bank of keys. There is one gas-filled electron tube 155 (Fig. 6), similar to those already described, for controlling the operation of both solenoids 261 and 262. The control tube 155, when fired, energizes a solenoid 149 to close the normally open switch 147, which supplies the grounded solenoids 261 and 262 with 45 volts positive potential, causing these solenoids to become energized and operate their armatures and thus release any depressed digit keys.

The circuits entering into the operation of the control tube 155 will now be considered.

As the main switch 90 (Figs. 1 and 8) is closed, terminals 91, 92, 93, and 94 are impressed, respectively, with the following electrical potentials: 170 volts positive, 45 volts positive, 6.3 volts positive, and 150 volts negative.

Figure 7:
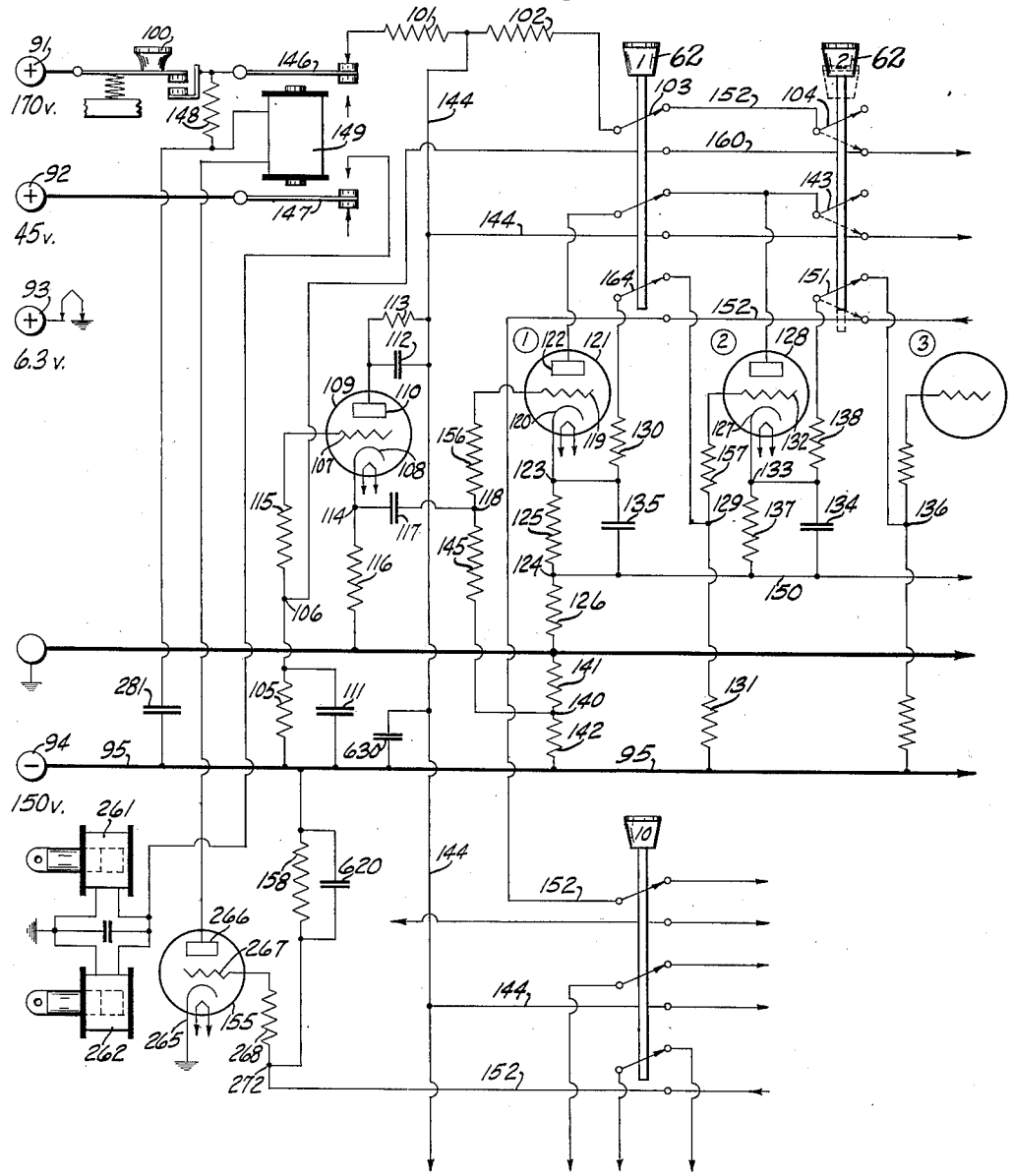
Fig. 7 is a wiring diagram of an enlarged section of a portion of the units denomination set of electronic device shown in Fig. 6.

Terminal 93, which has a potential of 6.3 volts positive at this time, supplies the current to heat the cathode 265 of control tube 155 and is shown grounded in Figs. 6 and 7 through a typical heater filament symbolical of the heater filaments of all the tubes. The heater circuits from the terminal 93 to the tubes have been omitted because they would tend to obscure other circuits in these figures.

When the main switch 90 is closed and terminal 94 has a 150-volt negative potential applied thereto, the conductor 95 assumes this potential. Grid 267 of the control tube 155, when no digit keys have been depressed, assumes a normal bias of 150 volts negative by being connected to the 150-volt negative conductor through resistor 263 of 250,000 ohms and the paralleled resistor and capacitor comprising resistor 158 of 100,000 ohms and capacitor 620 of .005 microfarad.

The cathode 265 of the control tube 155 is connected to ground. With the grid 267 at a potential of 150 volts negative and the cathode 265 grounded, the tube 155 will not fire.

When the main switch 90 is closed, the 170-volt positive potential of terminal 91 will not be applied directly to the plate 266 of the control tube 155. However, when the starting switch 100 is closed the plate 266 has 170 volts applied thereto through a circuit which extends from the terminal 91, over closed contacts of the starting switch 100, through resistor 148 of 300 ohms and the solenoid 149. To slow down the application of this potential to the plate and prevent the possible firing of the tube by the sudden application of this potential when the starting switch is closed, a capacitor 281 of .1 microfarad is connected from a point between the resistor 148 and the solenoid 149 to the 150-volt negative line 95.

When no digit key has been depressed, the closing of switch 100 after switch 99 has been closed, in addition to supplying the plate potential to tube 155, also supplies a positive potential to its grid 267 through switch 146, resistor 101 of 200 ohms, resistor 162 of 100,000 ohms, through the contact arms as 103, 104, closed on their upper contacts since no keys are depressed, through the conductor 152, common to both denominations, and resistor 268. This 170-volt positive impulse on the grid 267 changes the potential of the grid from negative to positive and causes the tube 155 to fire and become conductive, the current flowing through the plate circuit of the tube energizing solenoid 149, which operates and closes the circuit to key release solenoids 261 and 262, as explained above, without any result as far as the digit keys are concerned, as none were depressed.

However, if keys have been depressed—for example, the "5" key in the units bank and the "70" key in the tens bank—the 170-volt impulse introduced on conductor 152, by closing starting switch 100 after the main switch 90 has been closed does not directly affect the grid 267, but is switched so that the 170 volts positive impulse is impressed on the grid of the starting tube 109 of the units denomination, through line 160 and resistor 115 of 400,000 ohms, firing that tube, as will be explained, to start the sequential firing of the tubes in the units bank. Tube 109 remains conductive until its plate circuit is interrupted by opening switch 100 or switch 146 and as long as this tube remains conductive it is impossible to start the sending of a second group of impulses over output conductor 150. After the ensuing sequential firing of the "1," "2," "3," "4," and "5" tubes of the units bank, and the starting tube and the "10," "20," "30," "40," "50," "60" and "70" tubes of the tens bank, a positive cathode potential impulse caused by firing the "70" tube is switched onto the common conductor 152 by the key-operated switch 161 (closed by depression of a key in the bank of highest order) to fire the control tube 155, the firing of which tube causes the energization of the solenoid 149 and thereby the energization of solenoids 261 and 262 to cause the release of the keys. The starting switch 100 must be held closed until solenoid 149 is energized, but this interval is so short that it is practically impossible for the operator to withdraw pressure from switch 100 before solenoid 149 is energized. When the solenoid 149 is energized, switch 146 is opened to disconnect the common conductor 152 and conductor 144, which supplies plate potential to the tubes of the differential actuator, from the source of potential to which they have been connected by the closing of the starting switch 100. By thus removing the potential from the plates of the tubes, any conductive tube will be extinguished and none of the tubes can be rendered conductive thereafter until switch 146 is again closed and by switch 100 being again opened and closed, so that any impulses which would be generated by shifting contacts as 104, 143, 151, 161, and 191 when the keys are restored to undepressed position with the starting switch 100 closed, would not cause a misoperation of the tubes.

When the "70" key is depressed, as described above and shown in Fig. 6, switch 161 connects the point 272; that is, the grid of control tube 155, and common conductor 152 to ground through the resistor 269 of 100,000 ohms, the resistor 270 of 25,000 ohms in parallel with a capacitor 273 of .02 microfarad, through the tens denomination output conductor 153 and the resistor 271 of 5,000 ohms. This causes the potential of the point 272 and grid 267, which are connected to the 150-volt negative conductor 95 through the resistor 158 of 100,000 ohms and capacitor 620 of .005 microfarad in parallel, to drop from 150 volts negative to approximately 84 volts negative, which drop is not sufficient to cause the tube to fire or be conductive. If the circuit just traced were the only circuit in the tens bank, the point 272 would assume the potential of about 84 volts negative, but circuits associated with the "10," "20," "30," "40," "50," "60," and "80" tubes are also included in the tens bank. These circuits form parallel paths which extend from the 150 volts negative conductor 95 through resistors 638, 673, 648, 653, 668, 661, and 671, through switches similar to 161, (closed on the upper contacts since the keys are elevated) through resistors similar to 269, through resistors and capacitors in parallel similar to 270 and 273, to the tens denominational output conductor 153 and thence through resistor 271 to ground. These parallel paths between the 150-volt negative conductor 95 and output conductor 153 cause the effective resistance of this part of the circuit to become smaller and raise the negative potential of the tens output conductor 153 and also raise the negative potential of the point 272 slightly above the 84 volts negative mentioned above. This negative increase in potential of point 272 will not affect the operation of the tube 155. When the "70" tube fires, its cathode will acquire a positive potential which, through resistor 269, will cause the potential of the common conductor 152, and point 272, to change so that the potential of the grid 267 will become about 2½ volts positive and this will cause the tube 155 to fire and become conductive. The manner in which the potential of the cathode of the "70" tube is raised to a positive value to change the potential of the grid 267 from negative to positive will be made clear during the description of the operation of the differential actuator. The firing of tube 155 will result also if a key in the units denomination bank is depressed and no key in the tens denomination bank is depressed, as the last tube to fire in the units bank will have its cathode positive potential impulse shunted around the tens bank on conductor 152 to the grid 267 of the key release control tube 155 instead of to the starting tube 154 of the tens bank, by reason of all the key switches in the tens bank being in normal position.

Differential actuator

In describing the differential actuator, as regards its electrical operation, it is necessary to trace the flow of electric energy through the circuits. As the operation of the differential actuator is dependent on relative values of the electric potentials, resistors, capacitors, and the electron tube constants, for the timing and the sequence necessary in producing the differential action, actual values will be given as an example. These values are given to show how the differential operates and should not be considered the only set of values which can be used. The values used are determined by the input voltages selected, by the type of electron tube selected, and by the speed of operation needed. It should be evident from the explanation which follows that certain of the time factors involved result from the proper choice of these values. With the values given here as an example, the impulses for the number "99" may be impressed on the output conductors 150 and 153 to the accumulator, as has been said, in about .0022 of a second after the starting switch 100 (Figs. 1 and 6) is closed, and the number "1" may be impressed on the output conductor 150 to the accumulator in about .0003 of a second. If there were five denominational key banks, the number "99999" could be impressed upon the five output conductors to the accumulator in about .0058 of a second. Inasmuch as it is necessary for the accumulator to respond to the impulses from a given denomination of the differential actuator one by one, it is apparent that its speed of response is somewhat higher than that of the actuator. The extremely high-speed production of differential impulses and operation of an accumulator by the impulses are due to the fact that they are accomplished solely by the flow of electric current without movement of ponderable mass.

The wiring of the circuits of a two-denomination differential actuator is shown in Fig. 6. An enlarged section of part of the circuit is shown in Fig. 7, to which reference is principally made in the following explanation.

In giving the explanation of operation of the sequential firing of the tubes in the differential actuator, the first portion of the units bank (Fig. 7) is used as an example. This portion shows starting switch 100, the "1" and "2" digit keys 62, the tubes 121 and 128 representing digits "1" and "2" respectively, the units denominational order starting tube 109 for starting differential operation of the digit tubes when a key is depressed in this order, the key release control circuits, the circuit breaker switch for "single operation" control, and the various circuits coordinating these elements.

The conditions resulting from the firing of the starting tube 109 are such that they have no effect on the digit-representing tubes except to fire tube 121 representing the digit "1." The method of firing the "1" tube by a starting tube to commence the differential action is used as a convenient way of impressing a uniform firing impulse on the grid of the "1" digit-representing tube 121, in operations wherein a key of that denomination is depressed. It is to be noted that the starting tube could be replaced by any other means that would fire the "1" digit-representing tube. The sequential firing of the tubes is so rapid that the firing of the "1" digit-representing tube cannot be done reliably by the switch 100 alone because of the possibility that the operator might vibrate switch 100 in closing it, thus giving more than one firing impulse to the digit-representing tube 121 before the keys are released and causing the firing of the selected tubes more than once, which would result in an error in the entry of data. The starting tube is not extinguished and therefore cannot be fired again until the data-entering operation is completed and all the tubes are deprived of energy by the opening of switch 146. It will be explained later how the digit tubes are extinguished after firing either by the action of the next tube firing or by the completion of the data-entering operation causing switch 146 to open.

Each of the digit-representing tubes 121 and 128 has associated therewith a circuit which connects the 140-volt negative conductor 95 to the ground. The circuit for the "1" digit-representing tube is representative and is traced as follows from ground, through resistor 126 of 5,000 ohms to point 124 and output conductor 150, through resistor 125 of 25,000 ohms and capacitor 135 of .02 microfarad in parallel to point 123, through resistor 130 of 100,000 ohms, through switch 164 of the unoperated digit key to point 129 and through resistor 131 of 100,000 ohms, to the 150-volt negative conductor 95. The cathode for the "1" digit-representing tube 121 is connected in this circuit at point 123, and the grid for the "2" digit-representing tube 128 is connected, through resistor 157 of 500,000 ohms, to the point 129. The connection of the cathode of the tube of lower digit value to the grid of the tube of the next higher digit value by means of circuits such as this one enables the firing of one tube to cause the next tube to fire in sequence.

Although but two digit-representing tubes are here considered, the explanation given will serve for the whole denominational bank of nine tubes, as the resistors, capacitors, and bias potentials used are of the same values. The firing of the tubes occurs in so short a period of time, ranging in the ten-thousandths of a second, that the transient changes in voltage cannot be measured with absolute certainty, and therefore, although the use of the resistors, capacitors, and the potentials of the electric supply lines of the values as given will result in accurate operation of the machine, the potential fluctuations in the circuits as stated should be deemed approximations and are given chiefly to explain the theory of operation.

In the explanation of the operation of the differential actuator as made in connection with Fig. 7, it will be assumed that the "2" digit key 62 has been depressed manually from a position shown by the full lines to the position shown by the dotted lines and the switches 104, 143, and 151 have been moved from the full-line position to the dotted-line position.

As mentioned previously, when the main switch 90 (Figs. 1 and 8) is closed, terminals 91, 92, 93, and 94 are impressed with the following electric potentials, respectively: 170 volts positive, 45 volts positive, 6.3 volts positive, and 150 volts negative. These terminals, also shown in Figs. 6 and 7, supply the necessary electric energy to operate the differential actuator.

Terminal 93 of 6.3 volts positive, as has been mentioned, supplies the current to heat the cathodes of all the electron tubes in the differential actuator and accumulator and is shown grounded in Figs. 6 and 7 through a typical heater filament symbolical of the filaments of all the tubes. The heater circuits from the terminal to the various tubes have been omitted for the reason that they would tend to obscure the other circuits to be described. Heater elements, which have been symbolically shown in each tube, are connected to terminal 93 and become heated when the main switch 90 is operated.

When the main switch 90 is closed and the potential of 150 volts negative is applied to conductor 95, the grid of the starting tube 109, which is connected to this conductor through resistor 105 of 100,000 ohms and capacitor 111 of .005 microfarad in parallel, point 106, and resistor 115 of 400,000 ohms will assume a negative potential of approximately 150 volts. At the same time, the potential of the cathode 108 of the starting tube 109 and the point 114, which are connected to ground through resistor 116 of 25,000 ohms, will assume a slight negative potential while the capacitor 117 is charging, being connected through capacitor 117, of .00005 microfarad, to point 118, through resistor 145, of 400,000 ohms to point 149, which is located between resistors 141 of 75,000 ohms, and 142, of 100,000 ohms, connecting the 150-volt negative conductor 95 with ground. When the capacitor 117 has become charged and current no longer flows in this circuit, the point 114 will be at ground potential. The slight negative potential rise of the cathode 108 will not cause the tube 109 to be fired, because the grid 107 at this time has a potential of 150 volts negative and the characteristics of the tube are such that it will fire and conduct current from the anode to the cathode only when the potential of the grid exceeds, in a positive sense, a potential value of 15 volts more negative than that of the cathode.

Upon closing the starting switch 100 after the main switch 90 has been operated, the 170-volt positive terminal 91 is connected to the point 106 in the circuit from the 150-volt negative conductor to the grid 107, which connection is from terminal 91, through starting switch 100, through the normally closed switch 146, resistor 101 of 200 ohms, resistor 102 of 100,000 ohms, switch 103 in its normal unoperated position, conductor 152, switch 104 in its operated position, and conductor 160 to the point 106, to which the grid 107 is connected. This application of 170 volts positive potential to the point 106 will cause the potential of the grid 107 to change from 150 volts negative to about 9 volts positive with respect to the grounded cathode and will cause the starting tube 109 to fire and be conductive. The capacitor 111 of .005 microfarad in the circuit connecting grid 107 with the 150-volt negative conductor 95 acts to slow down the application of the firing voltage to the grid 107.

When the starting switch 100 was closed, as noted above, it also connected the plate 110 of the starting tube 109 to the 170-volt positive terminal through the circuit over the closed switch 100, over the normally closed switch 146, and resistor 101, and from this point over conductor 144, capacitor 112 of .005 microfarad in parallel with resistor 113 of 400,000 ohms, to plate 110.

As the starting tube fires, it allows electrons to flow from the cathode 108 to the plate 110. The flow of current through the tube 109 is not limited by the 400,000-ohm high resistance 113 until capacitor 112 becomes charged, at which time the resistor 113 becomes effective to reduce the plate-cathode current and also to reduce the potential of cathode 108. The potential drop across the tube 109, when conductive, is about 15 volts as is usual in gaseous electron tubes of this type. This makes point 114 have, after the firing of tube 109 and as capacitor 112 starts to charge, a potential of about 155 volts positive with respect to ground. When resistor 113 assumes the current load as the capacitor 112 becomes charged, the potential of the plate 110 drops to about 25 volts positive with respect to ground, and the cathode 108 and point 114 assume a potential of about 10 volts positive with respect to ground. After the first surge of current from plate 110 to cathode 108 in tube 109, the resistor 113 makes the current flow very small. Resistor 116 limits the cathode current flow before resistance 113 takes effect and acts to make the potential of cathode 108 high while capacitor 112 is charging. Resistors 105, of 100,000 ohms, resistors 101 and 102 totaling 100,200 ohms, and resistor 115, of 400,000 ohms, limit the grid current. It is seen, therefore, that, as tube 109 fires, a momentary voltage surge of approximately 146 volts positive is impressed across the .00005 microfarad capacitor 117 to point 118 and causes a positive voltage impulse of about 146 volts to be to be impressed at said point 118. Point 118 is normally at a potential of 64 volts negative with respect to ground, being connected through resistor 145 of 400,000 ohms to point 149 between resistor 141 of 75,000 ohms and resistor 142 of 100,000 ohms connecting the ground conductor with the 150-volt negative conductor 95.

The grid of the "1" digit-representing tube is connected, through resistor 156 of 100,000 ohms, to the point 118 and assumes its normal potential of 64 volts negative, which changes to a positive potential of about 82 volts when the starting tube fires and impresses the positive potential surge of 146 volts on point 118. When the main switch 90 is closed and the 150 volts negative potential is applied to conductor 95, current will flow in each of the circuits associated with the digit-representing tubes, such as the one traced earlier herein from the 150-volt negative conductor 95 through resistor 131, point 129, switch 164 in normal position, resistor 130, point 123, paralleled resistor 125 and capacitor 135, output conductor 150, point 124, and, through resistor 126, to ground. The potentials of the points 123 and 129 will become fixed after capacitor 135 becomes charged, and the only current flow will be that determined by the resistors. Under these conditions, the point 123 and cathode 120 of the "1" digit-representing tube connected thereto will assume a potential of about 19 volts negative, point 129 and the grid 132 of the "2" digit-representing tube connected thereto will assume a potential of 84 volts negative, and point 124 and the output conductor 150 connected thereto will assume a potential of 3.2 volts negative.

When the starting switch 100 is operated after the main switch 90 is closed and the "2" digit key is depressed, the 170-volt potential is applied to plate 122 of the "1" digit-representing tube through a circuit traced from terminal 91, operated starting switch 100, switch 146, through resistor 101 of 200 ohms, conductor 144, and through operated switch 143.

With the grid 119 of the "1" digit-representing tube normally at the same potential, 64 volts negative, as is point 118, and the cathode 120 at a potential of 19 volts negative, the gaseous triode "1" digit-representing tube 121 is kept from firing.

When the 146-volt positive potential impulse, caused by the firing of the starting tube 109, is impressed upon the grid 119 of the "1" digit-representing tube 121, it is apparent that grid 119 will become temporarily about 82 volts positive with respect to ground, or 101 volts positive with respect to the 19-volt negative cathode 120, and the tube 121 will fire. The voltage impulse at point 118 which fires tube 121 is kept from grounding by resistor 145 of 400,000 ohms. Resistor 156 of 100,000 ohms in series with resistor 145 limits the grid current of grid 119.

When the tube 121 fires and the gas therein becomes ionized, the internal resistance of the tube drops and the potential difference between plate 122 and cathode 120 drops to about 15 volts, so that cathode 120 and point 123 will have a potential slightly less than 155 volts positive with reference to ground. It should be noted that the resistor 101 of 200 ohms in the plate circuit is much smaller than the resistors 125 and 126 totaling 30,000 ohms in the cathode circuit and the voltage drop across the resistor 101 will have but little effect in changing the potential of plate 122 when the tube fires.

At the moment the tube fires, the current in the cathode circuit between points 123 and 124 momentarily will be principally through the capacitor 135 and very little will flow through the resistor 125, so that there will be a very small voltage drop across this resistor and points 123 and 124 will have about the same potential, 155 volts positive with respect to ground. As the capacitor 135 becomes charged, more current will flow through resistor 125 and the potential drop across the resistor will cause the point 124 to have a more negative potential than point 123. The rise of the potential of the cathode 120 toward 155 volts positive will cause the grid 132 of the "2" digit-representing tube 128, which is connected to point 123 through resistor 139, unoperated switch 164, point 129, and resistor 157, to change from its normal negative potential of 84 volts to a positive potential of approximately 2.5 volts. This change in potential of grid 132 will not cause the "2" digit-representing tube to fire immediately, because the point 124 and conductor 150 have about the same potential as point 123 when the capacitor 135 begins to charge and the cathode 127 of the "2" digit-representing tube, which cathode is connected to output conductor 150 by the resistor 137 and capacitor 134 in parallel, will have a potential change similar to that of grid 132 and will retain the effective biasing potential difference between the grid 132 and cathode 127 of the "2" digit-representing tube so as to prevent the tube from firing immediately. As the capacitor 135 becomes charged and current begins to flow in resistor 125, there will be a potential drop across this resistor which will increase as the capacitor becomes charged and more current flows through the resistor. Under these conditions, the positive potential of point 124 and the output conductor 150 will decrease as the drop across the resistor 125 increases, while the potential of the point 123 remains unchanged, so that, while the potential of the grid 132 remains at 2.5 volts positive, the potential of the cathode 127 will drop below 17.5 volts positive, at which time the potential of grid 132 will exceed, in a positive sense, a potential value 15 volts more negative than that of the cathode 127 and the "2" digit-representing tube 128 will fire and be conductive.

Through the same circuit as described above in connection with the "1" digit-representing tube, the plate of the "2" digit-representing tube has impressed thereon a potential of about 170 volts positive. The cathode circuit for the "2" digit-representing tube is similar to the one for the "1" digit-representing tube, so that, as the "2" digit-representing tube 128 fires, its cathode 127 rises to a positive potential of about 155 volts and the potential of output conductor 150 also rises toward 155 volts. Just as in the case of the "1" digit-representing tube, this potential drops off after capacitor 134 becomes charged and current flows through resistor 137.

Since the "1" digit-representing tube is conducting when the "2" digit-representing tube fires, its cathode 120 is at 155 volts and the surge of positive potential impressed upon output conductor 150, when the "2" tube fires, is impressed on capacitor 135 and causes the cathode 120 of the "1" digit-representing tube to have a temporary potential rise above the 170-volt positive potential of the plate 122 and causes the current to stop flowing in the cathode-plate circuit, extinguishing the tube and allowing the grid 119 to resume control. Point 136, normally at a potential of 84 volts negative, were switch 151 in normal position, would be affected by the firing of tube 128 in the same manner as point 129 was affected by the firing of tube 121 and would cause the potential of the grid for the "3" digit-representing tube to be raised to 2½ volts positive, firing the "3" digit-representing tube as the "2" digit-representing tube was fired, but instead by operation of the "2" key 62 the grid of the "3" digit-representing tube is connected only to the 150-volt negative conductor 95, giving it a controlling bias potential even though its cathode rises in potential as the conductor 150 rises in potential when the "2" digit-representing tube 128 fires.

It should be noted that the cathode of the digit-representing tube corresponding to the depressed digit key is not connected to the 150-volt negative conductor 95 by the usual circuit to which is connected the grid of the digit-representing tube of next higher value, but is connected by a switch as 151, shifted by depression of the key, to common conductor 152. This conductor 152 extends to the tens denomination bank of the differential actuator and, if a key is depressed in the tens bank as shown in Fig. 6, said conductor is connected by operated switch 191 to a circuit which extends through resistor 159 of 100,000 ohms and capacitor 165, of .005 microfarad, in parallel to the 150-volt negative conductor, and if no key is depressed in this bank, extends to point 272 where it is connected through resistor 158, of 100,000 ohms, and capacitor 620, of .005 microfarad, in parallel to the 150-volt negative conductor 95.

Switch 151, therefore, having been operated to make contact with the common conductor 152, the positive potential surge of point 133 is transferred to the common conductor 152 to be conveyed to the next denomination, there to be switched by an operated switch as 191 to the point 166 to impress the positive impulse on the grid of the starting tube 154 to fire the starting tube 154 of the tens denominational bank (Fig. 6) if a digit key in that denomination is depressed, or to be shunted to point 272 to impress the positive impulse on the grid 267 to fire the key release control tube 155 if no key is depressed.

As many tubes will fire in sequence in a denominational bank as is represented by the number of the key depressed in that bank, the starting tube excepted. As each digit-representing tube is fired, a positive voltage impulse of about 146 volts occurs in the denominational output conductor corresponding to conductor 150 or conductor 153, which impulses actuate the accumulator in a manner to be described.

When any digit-representing tube in a denomination is conductive and the capacitor in its cathode circuit is charged, the output conductor for that denomination will have a positive potential of about 26 volts and the cathodes of other tubes in that denomination will be changed from a normal negative potential of 19 volts to a positive potential of about 6.5 volts. The shift of the potential of the cathodes of the digit tubes from 19 volts negative to about 6.5 volts positive will not cause the tubes to fire because the grids are at about 72 volts negative potential at this time. The values selected for the cathode resistors and capacitors depend on the potentials of the supply conductors and the speed of operation desired.

The grid resistors, the cathode resistors, and the timing capacitors are of the same values for all the digit-representing tubes in each denomination. The firing of the digit-representing tubes "1" and "2" in sequence, followed by the extinguishing of the "1" digit-representing tube and the operation of the key release solenoids and single operation switch 146, as described in connection with Fig. 7, is typical of the operation of the differential actuator. It is to be noted that, in the typical operation described, there is no means to extinguish the "2" digit-representing tube 128 until switch 146 opens; therefore at the end of a data-entering operation the last tube to fire in the bank will not be extinguished until the switch 146 opens.

In the above description of the operation of the differential actuator, only two digit tubes were considered. When the full bank of nine digit tubes is considered, certain of the potentials will vary, due to the increase in the number of parallel circuits between the output conductor and the 150-volt negative conductor 95, one circuit being provided for each tube except the "9" digit-representing tube. The circuit for the "1" digit-representing tube is representative and has been traced as follows from the 150-volt negative conductor 95, through resistor 131, point 129, switch 164, resistor 130, point 123, resistor 125 and capacitor 135 in parallel to output conductor 150 and point 124, which are connected to ground through resistor 126. As the number of parallel circuits increases, the effective resistance of the circuit between the 150-volt negative conductor 95 and output conductor 150 decreases and the drop across this part of the circuit decreases, causing an increase in the negative potential of output conductor 150, the points corresponding to point 123 and cathodes connected thereto and points corresponding to point 129 and grids connected thereto. Since the cathodes and grids have corresponding rises in potential, the variation will not cause the tubes to fire. When the nine digit-representing tubes are considered, the normal potential of the output conductor 150 is 22.6 volts negative instead of 3.2 volts negative, the normal potential of the cathodes is 36.7 volts negative instead of 19 volts negative, and the normal potential of the grids is 93.3 volts negative instead of 84.5 volts negative.

It should also be noted that when the full bank of nine digit-representing tubes is considered, the potential surges impressed on the output conductor will cause the potentials of the cathodes and grids of the other tubes in the bank to vary with the potential of the output conductor. However, the only grid which receives a sustained rise in potential will be the one connected to the cathode of the tube which has just fired, and the sustained rise of potential of this grid will cause the next tube to fire when the cathode potential of that next tube recedes to a point where the grid is less than 15 volts negative with respect to the cathode.

A potential change delaying arrangement is provided for each of the starting tubes for slowing the application of the positive potential to their grids, which delays the firing of the starting tube in each denominational bank to allow time for the transfer of carry-over data to be made from the next lower denomination of the accumulator before the key set data is entered from the differential actuator, thus avoiding possible interference of the entries. This arrangement, for example, is seen in the circuit between the grid 107 of the starting tube 109 and the 150-volt negative conductor 95 and comprises resistor 105 and capacitor 111.

The key switches corresponding to switch 143 (Fig. 7) connect to the anode plate supply conductor 144, all those tubes of the bank which are of a digit value equal to or lower than the key depressed, and which are to be fired in the sequence. By the plate potential supply switches, like switch 143, it is therefore possible to cut out the plate supply of all the tubes representing digits higher in the order than the digit represented by the digit key depressed, and to impress upon the output conductors 150 and 153 of the units and tens denominations of the differential actuator, the exact number of impulses represented by the digit value of the key depressed in their respective banks.

As many such banks of differential actuators may be connected together as desired, said banks operating in sequence. The switching circuits controlled by the keys are so arranged that if there be no key depressed in a denomination the impulse for firing the starting tube will be shunted on common conductor 152 to the next denomination in which there is a key depressed. At the end of its circuit through the denominational banks the common conductor 152 is connected, as has been explained, to the grid of the key release control tube 155 (Figs. 6 and 7), operating the solenoid 149 which opens switch 146 to break the plate supply and closes the normally open contact 147, which contact 147, when closed, causes the energization of solenoids 261 and 262 and the consequent release of the keys.

In the circuit shown in Fig. 6, the sequence of firing is the units denomination first and the tens denominaiton second. If the keys in the first bank were renumbered as tens keys (Fig. 11) and the keys in the second bank were renumbered as units keys, and if conductor 153 were connected to the units bank input terminal of the accumulator and the conductor 150 were connected to the tens bank input terminal of the accumulator, it would be possible to enter the differential data into the accumulator in the tens bank first and the units bank second. Under those circumstances, the transfer of carryovers from tens denominational bank to hundreds denominational bank would not interfere with data-entering operations even though no timing delay between sequential operation of denominational banks were provided. This optional method of denominating the banks and of connecting the output conductors from the differential actuator is deemed to be within the scope of this invention.

A capacitor 630 of .5 microfarad is placed between the plate supply conductor 144 and the 150-volt negative conductor to prevent a too sudden application of plate potential to the differential actuator digit tubes.

*Power supply controls*

Means have been provided for controlling the application and removal of potentials to and from certain circuits of the machine and also for indicating when the tubes of the actuator and accumulator are in condition to operate and for controlling the application and removal of potentials to and from various circuits automatically at that time.

When the main switch 90 (Fig. 8) is open, the sources of potential are removed from all circuits, extinguishing all tubes in the actuator and accumulator to clear these parts of data and in general preventing the operation of the machine.

The closing of the main switch 90, as mentioned earlier herein, impresses terminals 91, 92, 93, and 94 of the differential actuator with their respective potentials to enable the actuator to operate.

The closing of the main switch 90 also completes certain circuits to apply potentials to certain terminals associated with the accumulator and enables other means to apply potentials to other terminals associated with the accumulator when the tubes are in condition to operate. The main switch 90 directly closes circuits to impress the terminals 96 and 97 associated with the accumulator with potentials of 100 volts positive and 175 volts negative respectively. The terminal 93, which has 6.3 volts impressed thereon upon operation of the switch, is also associated with the accumulator to provide a source of potential for the heater elements of the tubes in the accumulator. Another of the circuits closed by the operation of the main switch 90 can be traced, starting at the 170-volt positive supply terminal (Fig. 8), through conductor 402, switch 417, contact 403, and conductor 404 to terminal 580, and enables data standing on a result indicator to be set up in the accumulator elements to condition the accumulator to be responsive to actuation by the actuator, all of which will be explained more fully later. A further one of the circuits closed by the operation of the main switch 90 extends from the 170-volt positive potential source, through conductor 405, switch 427, contact 407, conductor 408, and resistor 409 of 5,000 ohms to ground and operates to keep the potential in the conductors connected to the 170-volt positive source cushioned against sharp fluctuation as loads are cut in and out during the operations preparatory to operating the machine.

An electron gas discharge tube 411, similar to those already described, is provided in the control means to cause the operation of switches to apply a potential of 135 volts negative to terminal 89 and a potential of 170 volts positive to terminals 98 or 99, depending upon the position of the restore and reset key switch 401, and remove the potential of 170 volts positive from terminal 580. The cathode 412 of tube 411 is connected to ground through the winding of the magnet 415 and the resistor 416 of 2,000 ohms. The grid 435 of tube 411 is connected to ground through resistor 414 of 100,000 ohms and, having the same potential as the cathode 412, the grid control will not prevent tube 411 from firing and the tube will fire as soon as the cathode 412 is heated by its heater 436 and switch 401 is depressed. The grid 435, being at ground potential and being located between the plate 413 and the cathode 412, assists in starting current to flow in the cathode-plate circuit. The main starting switch 90 connects the 2.5-volt positive supply, through conductor 442, to the heater element, which also is connected to ground.

The 170-volt positive potential supply is connected by the main switch 90 to conductor 447, which is connected to the restore and reset key switch 401, from which the circuit may have either of two paths, depending upon whether or not the key switch 401 is depressed. Before the key switch 401 is depressed, the circuit extends through contact 425 over conductor 406 to switch 419, but is not completed at this time, since switch 419 engages a contact which is not connected to any other conductor. When the key switch 401 is operated, the circuit extends through contact 455 to conductor 433, switch 426, and contact 413 to plate 410 to impress a positive potential of 170 volts on the plate of the tube 411.

It is clear that tube 411 will become conductive upon the operation of the main switch 90 and the operation of the restore and reset key switch 401 and after the heater element 436 has heated the cathode 412 sufficiently to start electron emission. By the time the heater 436 has heated cathode 412, the heater elements of the other tubes; that is, those of the differential actuator and accumulator, will have been heated sufficiently so that the actuator and accumulator may be operated.

As tube 411 becomes conductive and current flows in its cathode-plate circuit, the magnet 415 becomes energized and causes the switches 417, 418, and 419 to be shifted from their normal position into engagement with contacts 420, 421, and 422, respectively. The shifting of switch 417 breaks the circuit at 403 to the terminal 580, removing the 170-volt positive potential therefrom to prevent further entries in the accumulator under control of the indicator, and closes a circuit from the 170-volt positive supply over closed main switch 90, conductor 402, switch 417, contact 420, to magnet 415 to maintain this magnet energized until the main switch 90 is opened. Contact 420 is connected to the cathode 412 so that the closing of switch 417 on contact 420 will impress the 170-volt positive potential on the cathode. The application of the 170-volt positive potential to contact 420 will raise the potential of the cathode 412 to the potential of the plate 410 and will cause the tube 411 to cease being conductive, but magnet 415 is kept energized by the circuit over switch 417 and will not become deenergized when the tube 411 stops conducting. The shifting of switch 418 completes a circuit from the 135-volt positive potential, through operated main switch 90, conductor 448, non-indicate switch 423 in closed position, contact 421, and switch 418 in moved position to terminal 89. This terminal is connected to the operating means for the indicating means and will cause the indicating means to be operated to show the amounts standing in the accumulator in a manner to be explained more fully later. The operation of the non-indicate switch 423, which is provided to control whether or not the indicator means will be operative to indicate amounts standing on the accumulator, will interrupt the circuit from the 135-volt positive source of supply to terminal 89 to prevent the application of potential thereto and operation of the indicating means even though switch 418 be operated. The engagement of switch 419 with contact 422 prepares several circuits which are completed when the restore and reset key switch 401 is in its normal position. These circuits are the same from the 170-volt positive supply source, through operated main switch 90, conductor 447, switch 401, contact 425, conductor 406, and shifted switch 419 to contact 422, where the circuits branch, one going through conductor 439 to impress 170-volts positive on the terminal 98 associated with the anodes or plates of the transfer tubes of the accumulator, and the other going to point 444, through the winding of a magnet 424, resistor 443 of 2,000 ohms, and conductor 449 to ground to energize magnet 424.

When magnet 424 becomes energized, it shifts switches 426, 427, and 428 into engagement with contacts 429, 430, and 431 respectively. The shifting of switch 426 breaks, at 413, the circuit to plate 410 of the tube 411 and connects the circuit from the 170-volts positive potential source, through operated main switch 90, conductor 447, restore and reset key switch 401 when operated, contact 455, conductor 433, switch 426, contact 429, and conductor 434 to terminal 99 associated with the accumulator, so that 170-volts positive may be applied to terminal 99 upon a subsequent operation of the restore and reset key switch 401 to cause the accumulator and indicator to be reset to zero by means to be described hereinafter more fully. The shifting of switch 427 breaks, at 407, the circuit from the 170-volt positive supply to ground through resistor 409 and closes a circuit from the 170-volt positive potential supply through operated main switch 90, conductor 405, switch 427, contact 430, point 444, magnet 424, resistor 443 of 2,000 ohms, and conductor 449 to ground to provide a holding circuit for magnet 424, which maintains the magnet 424 energized as long as the main switch 90 is closed. The switch 428, when operated, completes a circuit from the 2.5-volt positive potential supply to ground, through operated main switch 90, conductor 442, switch 428, contact 431, and signal light 519, causing the light to be lighted to indicate when the cathodes have been heated and the restore and reset key switch 401 has been returned to normal position after firing the tube 411 and also that the machine is ready for operation. As long as the signal light 519 is illuminated, it indicates that the elements of the machine are in condition to be operated.

It is seen from the above that, in order to prepare the machine for operation, the main switch 90 must be closed to cause the heating elements for the tubes to heat the tubes and also to close circuits to apply potential to the actuator and accumulator, and to the restoring wiper arms associated with the indicator, to set up in the accumulator the amount standing on the accumulator at the end of the last previous operation, as indicated by the positions of said arms. Next, the restore and reset key switch 401 must be depressed, and, if the cathodes of the tubes have been properly heated, switches will be operated to break the circuit to the restoring wiper arm to prevent repeated setting of the amount contained in the indicator into the accumulator, and potentials will be applied to other terminals associated with the accumulator. The last step in preparing the machine for operation occurs when key switch 401 is released, and this will cause further switches to operate to apply potential to the remaining terminals associated with the accumulator, and a signal light will be lighted to indicate that the tubes are properly heated and that potentials have been impressed on all the terminals necessary for a proper operation of the machine. These conditions will continue until the main switch 90 is opened.

Accumulator

The impulses produced by a given denominational order of the differential actuator are transmitted to the corresponding denominational order of the accumulator through an input terminal which is connected to a related output conductor of the actuator. In the embodiment of our invention disclosed herein, the electric potential impulses generated by the differential actuator are transmitted to the accumulator by means of direct connections between the output conductors 150, 153, of the differential actuator and the corresponding terminals 300 and 351 of the accumulator, but we wish it to be understood that any of the well-known means for transmitting electric potential impulses may be made use of without departing from the spirit of our invention.

Each denominational order of the accumulator is similar to all the others, so that an explanation of the units denominational order of the accumulator will serve as an explanation of any order. Ten tubes 331 to 340 inclusive designated "0," "1," "2," "3," "4," "5," "6," "7," "8," and "9" (Figs. 9A, 9B, and 9C) are used as digit-representing tubes. These tubes are of the gaseous triode type similar to those used in the differential actuator, in which type of tube the grid is normally biased to prevent the tube from being conductive, but when the grid loses control because of an increased positive potential with relation to the cathode, it does not regain control until the cathode-plate current is stopped by some other means. These tubes are interconnected by circuits in an endless chain series so that the impulses sent to the accumulator cause the tubes to fire one at a time in sequence from one digit value to the next higher until the tube representing "9" operates, and then to begin the series over at the "0" digit-representing tube, each impulse firing a tube and that tube remaining conductive until the next impulse is received. The firing of a tube quenches or extinguishes the tube of next lower digit value and prepares the tube of next higher digit value to be rendered conductive by the next impulse. The tube, which is conductive, represents the digit, in that denomination, of the sum of the accumulated data, and means are provided to sense the conductive or non-conductive condition of the tubes in a denomination and to indicate which one is conductive.

When the tube 340 representing the digit "9" has been fired and is conducting, it prepares the "0" digit-representing tube 331 and a transfer tube 341 so that the next impulse will fire both of these tubes and will extinguish the "9" digit-representing tube. The transfer tube 341 is of the gaseous triode type similar to those used in the differential actuator and digit-representing tubes of the accumulator, but is so connected in the circuit as to be self-extinguishing. When the tube 341 is fired, it transmits a single potential impulse to the tens denomination input conductor 821 (Fig. 10C) to cause the prepared digit-representing tube in that order to be fired to cause the entry of "one" in that order.

In order to insure that the impulses from the differential actuator to the accumulator will be of sufficient magnitude to cause the proper operation of the accumulator, and in order to effect constant amplitude of the impulses, an amplifier tube is inserted between each of the output conductors from the differential actuator and the tubes of a related denominational order of the accumulator. The duo-triode type of tube and the circuit used to amplify and stabilize the impulses from the differential actuator have been employed because they are capable of amplifying the high-speed impulses used and will keep the amplified impulses entered into the accumulator of the same positive polarity as they are when received from the differential actuator.

When the main switch 90 is opened removing the various potentials from the terminals associated with the accumulator, the tubes cease to be conductive and will no longer represent data. In order to condition the digit-representing tubes for operation by the impulses from the differential actuator, circuits are completed through the indicating means, when the main switch 90 is closed, to cause the digit-representing tubes, corresponding to the setting of the restoring wiper arms associated with the indicating means, to fire and prepare the digit-representing tubes of next higher digit value for operation when impulses are received from the actuator.

An outstanding difference between the sequential operation of the digit-representing tubes in the differential actuator and the accumulator resides in the control of the firing of the tubes. In the differential actuator, the digit-representing tubes are fired in sequence by their own interaction, whereas in the accumulator these tubes are merely prepared for sequential firing by their interaction and are actually fired by impulses from the differential actuator.

The operation and function of the various tubes used in the accumulator having been explained, the circuits will now be described for the units denominational order which are representative of those used in the various orders of the accumulator.

The input terminal of the units denominational order of the accumulator is designated (in Figs. 6 and 9A) as 300 and is connected to the output conductor 150 of the differential actuator through capacitor 315 (see Fig. 6) of .005 microfarad. Terminal 300 leads to the primary grid 301 (Fig. 9A) of the duo-triode two-stage vacuum power amplifying tube 302.

As the main switch 90 is closed, 100 volts positive is applied to the plate anodes of amplifying tube 302 (Figs. 8 and 9A) through terminal 96, conductor 320, and resistor 311 of 10,000 ohms to plate 303 and through resistor 312 of 40,000 ohms to plate 304. The cathodes 305 and 306 of amplifier tube 302 (Fig. 9A) are connected through resistor 307 of 1,000 ohms and capacitor 308 of .1 microfarad, arranged in parallel, to the 175-volt negative conductor 309, which is energized through terminal 97 (Fig. 8) when the main switch 90 is closed.

The primary grid 301 (Fig. 9A), being connected to the 175-volt negative conductor 309 through a resistor 322 of 5,000 ohms, is normally at 175 volts negative potential, which blocks the passage of current from the plate 303 to cathode 305, as the potential of the cathode is slightly more positive than the primary grid because of the normal flow of electrons from the cathode 306 to plate 304, as will be explained. Grid 313 of tube 302 (Fig. 9A) is connected through resistor 314 of 60,000 ohms to the ground and normally permits electrons to flow from cathode 306 to plate 304, which causes point 316 to become about 167 volts negative potential, giving about an 8-volt negative bias to the primary grid 301 in respect to its cathode at this instant. As an impulse of about 146 volts positive is impressed on grid 301 when a digit-representing tube in the units denominational order of the differential actuator fires, it makes grid 301 more positive and causes a very high momentary current between plate 303 and cathode 305. Under these circumstances, point 317, because of the resistor 311, assumes a potential of about 150 volts negative, which causes a 250-volt potential change in a negative sense to be impressed through capacitor 318 of .01 microfarad and onto grid 313, stopping the plate current from plate 304 to cathode 306. As point 319, before the stopping of the current from plate 304, was, because of resistor 312, at a potential of about 155 volts negative with respect to ground and resumes the 100-volt positive potential, with respect to ground, of the conductor 320 when the current from plate 304 ceases, a potential change of 255 volts in a positive sense is impressed on the impulse conductor 321. After the differential impulse on grid 301 has passed, tube 302 resumes its normal condition, in which current flows from plate 304 to cathode 306, the grids 301 and 313 assuming their normal potential by means of the paths afforded by resistors 314 and 322. The tube 302 is then ready to amplify the next positive impulse coming from the units bank of the differential actuator in the manner described.

The potential surges approaching 250 volts as a maximum in the positive sense which are applied to the input conductors such as 321 will cause the prepared digit-representing tubes of the accumulator to be fired and become conductive.

As stated before, when the main switch 90 is closed, it applies a positive potential of 100 volts to terminal 96 associated with the accumulator. This terminal 96 is connected to the plates of the digit-representing tubes 331 to 340 through the following circuit, from terminal 96, through conductor 323, conductor 347, normally closed switch 346, resistor 345 of 300 ohms, and common conductor 344, to which the plate of each tube is connected. Common conductor 344 is connected to ground through a capacitor 350a of .1 microfarad to prevent the application of this potential too suddenly on the plates of the digit-representing tube.

In a manner similar to that explained in connection with the digit-representing tubes of the differential actuator, each digit-representing tube of the accumulator has associated therewith a circuit which connects the 175-volt negative potential conductor 399 with ground, to which circuit are connected, at proper points, the cathode of the associated digit-representing tube and the grid of the digit-representing tube of the next higher digit value. The circuit associated with the "4" digit-representing tube of the units order of the accumulator (Fig. 9B) is representative of these circuits and extends from the 175-volt negative potential conductor 399 through resistor 390 of 50,000 ohms, resistor 391 of 60,000 ohms, point 438, and resistor 354 of 25,000 ohms to ground. When the main switch 90 is closed and potential is applied to conductor 399, the cathode of the "4" digit-representing tube, which is connected to point 438, will assume a negative potential of about 32 volts and the grid of the "5" digit-representing tube, which is connected through resistor 366 of 100,000 ohms and resistor 669 of 400,000 ohms to point 389 between resistors 390 and 391, will assume a negative potential of about 110 volts. As the above circuit is typical, it is clear that, under the circumstances indicated, the cathodes of the inactive digit-representing tubes will assume a negative potential of about 32 volts and the grids of these tubes will assume a negative potential of about 110 volts. Connecting the cathode of a digit-representing tube with the grid of the tube representing the next higher digit value by means of the typical circuit enables the firing of one tube to prepare the next tube for firing when the next impulse is received from the differential actuator, or in the higher denominational orders, from the differential actuator or a transfer tube.

After the main switch 90 has been operated, the switch 419 (Fig. 8) has been shifted, and the restore and reset key switch 491 has been returned to its normal position, as explained previously, a positive potential of 170 volts is applied to terminal 98. Terminal 98 is connected through conductor 348 and resistor 349 of 500 ohms to the plate of the transfer tube 341. Conductor 348 is connected to ground through capacitor 360 of .1 microfarad to avoid application of potential to the plate of the transfer tube too suddenly. The cathode 439 of the transfer tube 341 is connected to point 499 in a circuit which extends from the 175-volt negative potential conductor 399, through resistor 491 of 1,000,000 ohms, point 499, and resistor 460 of 200,000 ohms to ground and assumes a negative potential of about 28 volts.

The grid of each of the digit-representing tubes 331 to 340 is also connected to input conductor 321 in order that the impulses impressed on the conductor 321 may cause the prepared tube to fire. The connection for the grid of the "5" digit-representing tube is representative and extends from input conductor 321, through a capacitor 376 of .00001 microfarad, to a point between the resistor 366 of 100,000 ohms and resistor 669 of 400,000 ohms. These capacitors for the units order are numbered 371 to 380 inclusive, and these 400,000-ohm resistors are numbered 552, 681, 683, 685, 687, 689, 689, 691, 693 and 695. The values for the capacitors as 376 and resistors as 669 may be varied to adjust the time of operation of the accumulator so that the accumulator will respond to the impulses entering on conductor 321 and will not lag and fail to respond to any one of such impulses. The resistors and capacitors shown provide for the proper timing of the operation of the accumulator when considered with the values given to the resistors and capacitors of the differential actuator.

The grid 492 of the transfer tube 341 also has a connection to the input conductor 321, extending from point 493 located between resistors 381 of 100,000 ohms and 441 of 250,000 ohms, and through a capacitor 382 of .00001 microfarad.

The restoration of amounts to the accumulator under control of the restoring wiper arms associated with the indicator will now be described.

It has been explained how, upon the main switch 90 being closed, 170 volts positive potential is impressed through conductor 402 and contact 403 (Fig. 8) to the restoring impulse terminal 580 (see also Fig. 9A). Terminal 580 is connected to conductor 581 (Figs. 9A, 9B, and 9C), which, passing through resistor 383 (Fig. 9C) of 30,000 ohms, is connected to wiper arm 384 coacting with the "5" contact 386 in the data restoring means commutator 385 associated with the indicating means which serves the units denominational order. The wiper arm 384 which stands, for purposes of illustration, on the contact representing the "5" digit-representing tube 336 is shown in the position in which it stopped when main switch 90 (Fig. 8) was last opened, assuming that switch 423 was then closed, indicating the number then standing in the units denominational order. When the 170 volts positive potential is applied to terminal 580, this potential will be applied through conductor 581, resistor 383, wiper arm 384, contact 386 (Fig. 9C), conductor 387, and resistor 388 (Fig. 9B) of 50,000 ohms, to point 389.

As explained above, point 389, as the 170 volts positive potential is applied, is at a potential of about 110 volts negative with respect to ground, being connected to the 175-volt negative conductor 309 by resistor 390 of 50,000 ohms and being connected to ground through resistor 391 of 60,000 ohms in series with resistor 354 of 25,000 ohms. Therefore, the grid 392 of the "5" digit-representing tube, being of the same potential as point 389, is 110 volts negative with respect to ground. At the same time cathode 393 of the "5" digit-representing tube is 32 volts negative with respect to ground, being connected to ground through resistor 355 of 25,000 ohms and connected to the 175-volt negative conductor 309 through resistor 394 of 60,000 ohms and resistor 395 of 50,000 ohms. Under these conditions, the "5" digit-representing tube is non-conductive because, as beforestated, in the particular type of tube used, the "firing" occurs when the potential of the grid exceeds, in a positive sense, a potential value 15 volts more negative than that of the cathode. Therefore, when the 170-volt positive potential is applied through wiper arm 384 and contact 386, the potential of point 389 changes to 31½ volts negative, as point 389 is then connected to the 170-volt positive conductor through resistor 388 (Fig. 9B) of 50,000 ohms and resistor 383 (Fig. 9C) of 30,000 ohms, and is connected to the 175-volt negative conductor 309 (Fig. 9B) through resistor 390 of 50,000 ohms, and connected to the ground through resistor 391 of 60,000 ohms and resistor 354 of 25,000 ohms. The potential of grid 392 then is 31½ volts negative as compared with the cathode potential of 32 volts negative and the "5" digit-representing tube fires. In this manner, as soon as the main switch 90 is closed, and the tube cathodes are heated, the digit "5," which stood in the indicator for the units denominational order in the accumulator when the main switch 90 was opened and the "5" tube was rendered non-conductive, is restored to the accumulator by causing the "5" digit-representing tube to become conductive. When the "5" digit-representing tube becomes conductive, the potential of cathode 393 immediately rises from its normal negative potential of 32 volts to within 15 volts of the plate 396 due to the high resistance in the cathode circuit, and since the plate is approximately 100 volts positive, the cathode 393 will assume a positive potential of about 85 volts, producing a net potential change for the cathode 393 of about 117 volts in the positive sense. The change in the potential of the cathode 393 will cause the potential of point 452 to change from its normal negative potential of 110 volts to 57 volts negative, as this point is connected to point 453, which is connected through resistor 394 of 60,000 ohms to the conductive cathode 393 having a positive potential of 85 volts and is connected through resistor 395 of 50,000 ohms to the 175-volt negative conductor 309. This change in potential of points, such as point 452, when the tubes are conductive, is used to control the operation of the stepping magnet for the indicating means.

The circuits involved in the operation of the stepping magnet 503 and the manner in which the potential change of points, such as point 452, exert their control will now be described.

Two electron tubes are associated with each stepping magnet. The stepping magnet control tube 472 and stepping magnet energizing tube 454 for the units denominational order stepping magnet 503 (Fig. 9A) are representative so that a description of their operation will apply also to similar elements in the other denominational order.

Tube 472 is of the vacuum type having a control grid and tube 454 is of the gaseous type having a control grid and a screen.

The plate 477 of the stepping magnet control tube 472 is connected through resistor 504 of 500,000 ohms to ground. The cathode 471 of this tube is connected through conductor 473 to point 474, which point is connected to ground through resistor 475 of 50,000 ohms and is connected to the 175-volt negative potential conductor 309 through resistor 476 of 50,000 ohms, causing the cathode to assume a negative potential of 87 volts when the main switch 90 is closed. The grid 478 of this tube is connected through conductor 479, resistor 712 of 1,000,000 ohms, wiper switch 397, contact 525 of commutator 526 (the indicating means showing "5" in the example being described), and resistor 451 of 50,000 ohms to point 452, which is normally at 110 volts negative potential, but which changes, as explained above, to 57 volts negative when the "5" digit tube is conductive. Tube 472, being a grid-controlled vacuum tube, will conduct current from the plate to cathode whenever the grid is at a potential more positive than 8 volts negative with respect to the cathode. It is seen, therefore, that the control tube 472 will be conductive when wiper arm 397 stands on a contact of the commutator 526, which contact has a potential more positive than 79 volts negative with respect to ground. Due to the negative potential of the cathode 471 and the resistor 504 through which the plate 477 is connected to ground, plate 477 will assume a negative potential as soon as the tube 472 becomes conductive.

The stepping magnet energizing tube 454, is of the gaseous type, and will become conductive when its grid is not at a sufficient negative bias and potential is applied to the cathode-plate circuit. Once the tube begins to discharge, it will continue to discharge until the cathode plate circuit is interrupted, even though the grid assumes a negative biasing potential. If the grid is at a sufficient negative bias when the cathode-plate circuit is completed, the tube will not fire or become conductive.

The plate 502 of the stepping magnet energizing tube 454 is connected through the winding of the stepping magnet 03, normally closed contact 508, wiper arm 505, contacts of commutator 506, and conductor 507, to terminal 89. The 135-volt positive potential is not applied to terminal 89 directly by the operation of main switch 90, but, as described earlier, requires a preliminary operation of key switch 401. The cathode 501 of this tube is connected directly to ground. The grid 479 of this tube is connected to the plate 477 of tube 472 and is normally at ground potential but will assume a negative potential whenever tube 472 is conductive. Inasmuch as the grid 479 is at ground potential when the control tube 472 is not conductive and the cathode 501 is also at ground potential, the stepping magnet energizing tube 454 will fire and become conductive as soon as potential is supplied to plate 502. When tube 454 is conducting, the current through plate 502 will energize the stepping magnet 503, and cause the armature 509 to be attracted thereto. The armature 509 associated with the stepping magnet 503 (Figs. 4 and 5) has attached thereto an arm 575 carrying a pawl 532 cooperating with a ratchet 535 connected to the axle 536, to which are fastened the wiper arms 384, 397, and 505. The pawl and ratchet are so arranged that when the armature 509 is attracted by the magnet 503, the armature merely tensions a return spring 531 and when the magnet is deenergized, the return spring 531 moves the armature 509 and pawl 532 to operate the ratchet 535 and move the wiper arms one step. The armature 509, upon being attracted by energization of the stepping magnet 503, will cause the contact 508 to open and interrupt the circuit through the winding of the stepping magnet 503, causing the magnet to become deenergized, causing the pawl and ratchet to move the wiper arms one step, and causing the contact 508 to close to again complete the circuit from the wiper arm 505 through the winding of the magnet 503 to plate 502. As the wiper arm 505 steps from contact to contact on the commutator 506, it will engage the insulation between the contacts and interrupt the circuit from terminal 89 to plate 502. The circuit from terminal 89 to plate 502 will therefore be broken in two places and will not be reclosed to supply potential to the plate 502 until contact 508 is closed and wiper arm 505 engages the next contact on the commutator. If grid 479 has no negative bias, the application of potential to plate 502 will cause the energizing tube 454 to become conductive, and the subsequent current in the cathode-plate circuit will cause the stepping magnet 503 to become energized again. This energization and deenergization of the stepping magnet 503 is repeated as often as the stepping magnet energizing tube 454 is conductive.

The timing of the closing of the control circuit for the grid 478 of the stepping magnet control tube 472 through wiper arm 397 and the closing of the circuit to apply potential to plate 502 of the stepping magnet energizing tube is such that the control tube can operate, if controlled by an operating digit representing tube, to apply negative potential to grid 479 of the energizing tube 454 before the potential is applied to plate 502, so as to prevent the firing of the stepping magnet energizing tube 454.

As has been pointed out, the stepping magnet control tube 472 is of the vacuum type and will be conductive when its grid is more positive than 8 volts negative with respect to its cathode 471, which has a normal potential of 87 volts negative; and the stepping magnet energizing tube 454 is of the gaseous discharge type and will fire and become conductive if its grid is not at a sufficient negative bias when potential is applied to its cathode-plate circuit, and will remain conductive even though a biasing potential is applied to the grid after the tube becomes conductive. It follows, therefore, that, as long as the wiper arm 397, to which the grid of the control tube 472 is connected, is moved step by step over the contacts of the commutator 526 and engages contacts connected to the cathodes of non-conducting digit-representing tubes, which contacts have a negative potential of 110 volts, the control tube 472 will be non-conductive, the grid 479 will remain at ground potential, and the energizing tube 454 will fire and extinguish repeatedly upon the repeated closing and opening of the circuit to plate 502 by the continued operation of the armature 509 and contacts 508 and the step-by-step movement of the wiper arm 505. When, however, the wiper arm 397 engages a contact of the commutator 526, which contact is connected to the cathode of a conducting digit-representing tube and has therefore changed from a negative potential of 110 volts to a negative potential of 57 volts, the control tube 472 will be rendered conductive, causing the grid 479 to assume a negative bias, and the energizing tube 545 will be prevented from refiring upon the reclosing of its plate circuit, thus preventing the further stepping of the wiper arms 397 and 505.

Up to this point it is assumed that, in preparing the actuator and accumulator for operation, the only manual operation has been to operate the main switch 90 (Fig. 8), which caused the application of various potentials to the terminals 91, 92, 93, and 94 of the differential actuator to prepare for the operation of the digit-representing tubes and other related tubes therein, caused the application of various potentials to terminals 95, 96, and 97 of the accumulator to prepare for the operation of the digit-representing tubes therein, and caused the application of potential to the terminal 580 to cause digit-representing tubes to be fired and rendered conductive to restore into the accumulator the data which was left on the indicator at the end of the last operation before the main switch was opened. This causes the "5" digit-representing tube in the units denominational order of the accumulator to become conductive, changing the potential of the point 452 and contact 525 from 110 volts negative to 57 volts negative, which causes the stepping magnet control tube 472 to become conductive and the potential of the grid 479 of the stepping magnet energizing tube 454 to become negative. At this stage of the preparation, potential has not been applied to terminal 89 and the plate 502 of tube 454 connected thereto, and consequently, even if the potential of grid 479 were not negative, there would be no energization of the stepping magnet 503.

The restore and reset key switch 401 is now depressed, as explained earlier herein, and causes the magnet 415 (Fig. 8) to become energized, which magnet, when energized, shifts switch 417 to break, at contact 403, the connection to terminal 580 to prevent repeated entry of amounts under control of the indicating means, and shifts switch 418 to engage contact 421 so as to apply a 135-volt positive potential to terminal 89 from the 135-volt positive potential source, over circuits traced earlier in connection with Fig. 8. The 135-volt positive potential is applied through conductor 507 to each contact of the contacts on commutator 506, wiper arm 505, closed switch 508, and the winding of stepping magnet 503 to plate 502, but, as the grid 479 is negative at this time, tube 454 is non-conductive and no current flows through the magnet 503.

The magnet 415 will remain energized through its holding circuit over switch 417 as long as the main switch 90 is closed. When the key switch 401 is released and is restored to its normal or upper position, it closes a circuit to energize magnet 424, which will shift switch 426 to prepare a circuit to cause the application of 170 volts to terminal 99 and the winding of resetting control magnet 541 connected thereto, which circuit will be completed by the key switch 401 when again operated after magnet 424 has been energized. Magnet 424 also closes the circuit to the signal light 510 to cause the signal light to be lighted to indicate that the accumulator is ready to receive entries from the differential actuator under control of the digit keys.

In the example being given, the condition of the accumulator when the signal light 510 is lighted is as follows.

The "5" digit-representing tube is conductive at this time; the stepping magnet energizing tube 454 has potential applied to its plate circuit but is non-conductive due to the negative bias of the grid 479; the tube 302 for amplifying the positive potential impulses from the differential actuator is in condition to operate; the plates of all the digit-representing tubes of the accumulator are impressed with 100 volts positive; the cathodes of the same tubes are at 32 volts negative potential with the exception of the conductive "5" digit-representing tube, which is at 85 volts positive potential; points 511, 512, 513, 514, 515, 516, 517, and 518, are at 110 volts negative potential; point 399, due to the current from grid 392 to cathode 393, is slightly less than 110 volts negative potential; point 452 is about 57 volts negative potential; and grid 522 of the "6" digit-representing tube 337, which is connected to point 452, will have a potential of 57 volts negative, a potential sufficient to prevent the "6" digit-representing tube 337 from firing, but which will allow this tube to be fired when the next positive impulse occurs in the conductor 321.

As before stated, the positive impulse surges from amplifier tube 302 through conductor 321 will approach 250 volts as a maximum in a positive sense, which positive surges are impressed through the capacitors 371 to 380 inclusive and 382, each of .00001 microfarad capacity, to the grids of the digit-representing tubes and the transfer tube. By choosing proper values for the capacitors as 376 and resistors as 688, the amount of the potential change of the grids can be regulated as well as the speed of response of the accumulator. The potential change of the grids, because of the values used, will not be sufficient to cause the non-conductive tubes to fire whose grids are at 110 volts negative with respect to ground and 78 volts negative with respect to their cathodes. The digit-representing tube having a value of one higher than the conducting digit-representing tube, in the instant case the "6" digit-representing tube, will have its grid at a potential of 57 volts negative with respect to ground, due to the change in potential of point 452 when the "5" digit-representing tube is conductive, and as the cathode 521 of the "6" digit-representing tube is at a potential of 32 volts negative with respect to ground, the grid 522 will be but 25 volts negative with respect to the cathode, and the potential surge on conductor 321 will cause a sufficient potential change to the grid to cause the "6" digit-representing tube to fire and be conductive.

When the "6" digit-representing tube is conductive, its cathode 521, due to the high resistance in the cathode circuit, will immediately assume a positive potential of 85 volts, causing a surge of 117 volts in the positive sense in potential of conductor 523 which links the tubes of a denominational order in an endless operative chain. The .005 microfarad capacitors numbered 555 to 564 inclusive, one of which is positioned in conductor 523 between each two cathodes, allow the cathode potential surge to be transmitted along the conductor. As cathode 393 of the "5" digit-representing tube, still conducting, is at 85 volts positive potential, the added positive surge of 117 volts will cause the positive potential of the cathode 393 to be greater than the 100-volt positive plate 396, and tube "5" will be extinguished, the grid will resume control, and point 452 will resume its normal 110-volt negative potential. The 5,000-ohm resistors 565 to 574 inclusive, introduced between each two of the cathode condensers on conductor 523, eliminate extra potential surges in the conductor 523 by dampening any tendency to oscillate.

As contact 525 (Fig. 9B) in commutator 526 is of the same potential as point 452, which has changed from 57 volts negative to nearly 110 volts negative because tube "5" has been extinguished, the 110-volt negative potential is impressed on grid 478 of the stepping magnet control tube 472, making the grid 478 have a negative bias of 23 volts over the 87-volt negative cathode 471, rendering the tube 472 non-conductive, which, causing grid 479 to return to ground potential and lose control, allows current to flow in the stepping magnet energizing tube 454, energizing magnet 503. The stepping pawl 532 (see Fig. 4), having been prepared to become effective by the tensioning of spring 531 upon the attraction of the armature 509 to the magnet 503, which movement of the armature 509 toward the magnet also breaks the circuit energizing the magnet 503 by opening switch 508, becomes effective when magnet 503 is deenergized and is drawn to normal position by return spring 531, thus moving the common axle 536 (Figs. 4, 9A, 9B, and 9C) of the sensing arms 505, 397, and 384 one step, to position "6" on commutator 526, where wiper arm 397 senses, through conductor 532, the point 515, which is 57 volts negative because the "6" digit-representing tube 337 is conductive. This results in grid 478 (Fig. 9A) of the stepping magnet control tube 472 becoming ineffective to block the plate current, which current causes the grid 479 to assume a negative potential and prevent the refiring of the stepping magnet energizing tube 454. Thus, when wiper arm 505 reaches the "6" contact, no current is supplied to the stepping magnet 503 and the indicator comes to rest at "6," which represents the conductive tube. It will be understood from this that the sensing means will continue the exploring operation until a contact of 57 volts negative potential is found by wiper arm 397, indicating a conductive tube. In case none of the tubes are conductive, the indicator would show that fact by never coming to rest.

The tens denominational order is shown in Figs. 10A, 10B, and 10C and is similar in operation to the units denominational order described above.

Certain electrical supply lines described in connection with Figs. 9A, 9B, and 9C are common to Figs. 10A, 10B, and 10C. Figs. 9A and 10A contain a common connection 201 for the 135-volt positive conductor energizing the stepping relay; a common connection 202 for the 170-volt positive conductor for restoring the indicated amount into the accumulator; a common connection 323 for the 100-volt positive conductor supplying the plate potential to the amplifying tubes; a connection 203 to the digit-representing tube plate supply conductor; and a connection 533 for the grid impulse conductor for the "00" tube for clearing operations (to be described).

Electric conductors common to Figs. 9C and 10C are the transfer impulse conductor identified by the common connection 343; the transfer tube plate supply identified by the common connection 204; and the 175-volt negative supply conductor identified by the connection 205.

The duo-triode two-stage vacuum tube 353 for the tens denominational order is of the same type as the amplifying tube 302 used in the units denominational order. Its primary grid 352 is connected to terminal 351, which is connected to the tens denominational output conductor 153 of the differential actuator through a capacitor 675 of .005 microfarad. Its plates 329 and 330 are connected through resistor 327 of 10,000 ohms and the resistor 328 of 40,000 ohms, respectively, and conductor 323 to the 100-volt positive terminal 96. Its cathodes 324 and 325 are connected through resistor 326 of 1,000 ohms and capacitor 259 of .1 microfarad in parallel to the 175-volt negative potential conductor 205, which is an extension of the negative potential conductor 309 (Fig. 9C). The grid 352 is also connected to the 175-volt negative potential conductor 205 through a resistor 260 of 5,000 ohms, through which it assumes a normal negative potential of 175 volts. The tube 353 operates in the same manner as tube 302 to impress a surge approaching 250 volts as a maximum in the positive sense on the input conductor 821 whenever an impulse is received from the corresponding denomination of the actuator. This input conductor 821 can also receive impulses from the transfer tube 341 of the units denominational order over conductor 343 and capacitor 342 of .002 microfarad, as will be explained more in detail later herein.

Digit-representing tubes corresponding to the values "00," "10," "20," "30," "40," "50," "60," "70," "80," and "90" are shown at 456, 457, 458, 459, 461, 462, 463, 464, 465, and 466 and are connected by circuits to cause them to be fired one at a time in succession, as were the digit-representing tubes of the units denominational order.

A transfer tube 467, which operates exactly like the transfer tube 341, will cause an impulse to be sent to the next higher order, in the instant showing, the overflow order.

The stepping magnet 450 will operate the wiper arms 481, 482, and 483 of the indicating means of the tens denominational order in the same manner as the stepping magnet 503 of the units denominational order. Wiper arm 482 will sense for a conductive digit-representing tube to control the operation of the stepping magnet control tube 468 and stepping magnet energizing tube 469.

The conductor 202 will connect wiper arm 483 to the terminal 580 to enable the restoration of digit values into this order of the accumulator at the same time and in the same manner as that explained above in connection with wiper arm 384 of the units denominational order.

The accumulator denominational banks are unitary and as many may be added in series as is desired, either to be operated by an equivalent differential denominational bank and the transfer device of the adjoining bank or by the transfer device of the adjoining bank alone.

*Clearing*

When the main switch 90 is opened and all values are erased from the accumulator, the accumulator will not assume a zero or cleared condition when the main switch 90 is closed again, but the values erased from the accumulator will be restored, as explained earlier herein. To clear the accumulator of any value standing thereon and to enable further entries to be made therein, all digit-representing tubes must be rendered non-conductive and the "0" digit-representing tube in each order must then be rendered conductive.

With the "6" digit-representing tube 337 conductive and the wiper arms 384, 397, and 505 at rest on the "6" contacts of their respective commutators, the key switch 401 is operated after switch 427 has shifted. The 170-volt positive source of potential is connected through closed main switch 90 (Fig. 8), conductor 447, key switch 401, contact 455, conductor 433, switch 426, contact 429, and conductor 434 to terminal 99. The terminal 99 (Fig. 9A) is connected through the winding of resetting control magnet 541 to ground.

When the magnet 541 is energized, it draws its armature 543 upwardly, first closing switches 544, 545, 546, and 547 and later opening switch 346. When switches 546 and 547 close, the conductor 530 and the connection 533 (see also Fig. 10A), leading to the grid 534 of the zero tube of the tens bank designated "00" and the conductor 548 leading to the grid 529 of the zero tube of the units bank designated "0" are connected with the 100-volt positive conductor 323 and immediately thereafter, on further upward motion of armature 543, switch 346 is opened, removing the plate potential of all the tubes from "0" through "9," and "00" through "99" thus extinguishing all of said tubes. The switch 545 represents the means by which the overflow or hundreds bank "zero" tube grid is energized, although the circuits of that bank are not shown in the drawings. On the return movement of the armature 543 (Fig. 9A) to normal, when key switch 401 (Fig. 8) is released, switch 346 (Fig. 9A) first closes to supply the plate potential to the digit tubes, and, before switch 547 opens, point 549, which point 549 is connected through a resistor 552 and conductor 550 to point 518, at the "9" end of the accumulator (Fig. 9C) which point 518 is at 110 volt negative potential is still subjected to the 100-volt positive potential which results in point 549 becoming about 17 volts negative, lying, as it does, between resistor 551 of 500,000 ohms and resistor 552 of 400,000 ohms. The cathode 553 of the "0" tube, being 32 volts negative by being connected through resistor 350 of 25,000 ohms to ground and through resistors 253 and 254 of 60,000 ohms and 50,000 ohms respectively to the 175-volt negative conductor 309, and the grid 529 being 17 volts negative, the "0" digit-representing tube fires. Continued movement of the armature 543 to home position opens the switches 547, 546, 545, and 544. Switches 546 and 545 supply the grid voltage for firing the zero digit-representing tubes in the tens and the overflow or hundreds denominations of the accumulator, respectively. Switch 544, connecting the 100-volt conductor 323 to ground through resistor 542 of 2,500 ohms, holds the load in the 100-volt positive conductor as the plate voltages are cut off, thus tending to keep the voltage in said conductor from fluctuating. As the zero tubes in all the accumulator banks are thus fired, the accumulator as a whole is cleared of data. Points in each bank of the accumulator corresponding to point 511 change in voltage from 110 volts negative to 57 volts negative, causing the respective sensing unit wipers to stop on the "zero" contacts and position the associated indicators so that the zeros are displayed.

It will be observed that, after entering a number of items in the accumulator, the operator may depress the non-indicate key to open switch 423 and prevent further response of the indicator to changes in the conditions of the accumulator tubes while the non-indicator switch 423 is open. If, with said non-indicator switch open, the operator continues to enter items in the accumulator, the indicator will not show the sum of the items entered but, instead, will show the sum of the items entered up to the instant when the non-indicate key was depressed. Accordingly, the amount as indicated by the condition of the tubes will not be the same as the amount shown by the indicator wheels 587 (Fig. 4). The operator may now open the main switch 90 (Fig. 8), which will remove the operating energy from all the accumulator tubes but will not disturb the setting of the indicator. Upon closing the main switch 90 again, the accumulator tubes will again be connected to the source of operating energy, and terminal 580 will be connected through line 404, normally closed switch 403, and line 402 to the 170-volt positive terminal, so that that positive potential is applied through conductor 581, contact arm 384 (Fig. 9C), controlled by the indicator, and the appropriate commutator contacts 386 to the control grids of the accumulator tubes which correspond to the setting of the indicator, with the result that the amount standing on the indicator has been substituted in the accumulator for the amounts previously standing in the accumulator, as indicated by the condition of the tubes thereof.

It is to be noted that this is a substitutive entry in the accumulator, in that it wipes out the previous entry in the accumulator and substitutes a new entry therefor, whereas the entering of items in the accumulator through the application of impulse sequences to the input conductors 321 and 821 (Figs. 9A and 10A) is an additive entry, since the new items are added to those previously standing on the accumulator.

Transfer of denominational carry-overs

Whenever, in an operation of the accumulator, a "9" digit-representing tube has been fired and is conductive, it conditions both the "0" digit-representing tube and the transfer tube so that the next impulse to that order of the accumulator will cause both the "0" digit-representing tube and the transfer tube to fire, the firing of the "0" tube causing the "9" tube to be extinguished and the "1" tube to be prepared for firing and the firing of the transfer tube causing an impulse to be sent to the next higher denominational order.

When the "9" digit-representing tube 340 (Fig. 9C) is conductive, point 518 will have a negative potential of 57 volts, as heretofore explained in connection with the points 452 and 515 when the digit-representing tubes "5" and "6" were conductive. The potential of point 518 is conveyed through conductor 550 and resistor 552 to point 549, to which the grid 529 of the "0" digit-representing tube 331 is connected, and to the point 488, to which the grid of the transfer tube is connected. When the next impulse is impressed on input conductor 321, both the "0" digit-representing tube 331 and the transfer tube 341, being prepared, will be fired. The 117-volt rise in cathode potential of the "0" digit-representing tube is transmitted to the cathode of the still-conducting "9" digit-representing tube by the common conductor 523 through capacitor 559 and resistor 574, thus extinguishing the "9" digit-representing tube. The potential of the cathode 489 of the transfer tube is taken from point 490, which point is connected to ground through resistor 460 of 200,000 ohms and is connected to the 175-volt negative conductor through resistor 491 of 1,000,000 ohms, making point 490, when transfer tube 341 is not conducting, at a potential of about 38 volts negative. As the impulse comes to the grid 492, through capacitor 362 of .00001 microfarad, the transfer tube is fired and causes the cathode potential to rise to 155 volts positive as the potential of the plate of the transfer tube is 170 volts positive. The resultant positive potential surge of 193 volts is conducted over the conductor 343 through capacitor 342 of .002 microfarad to the input conductor 821 (Figs. 10A, 10B, and 10C) of the tens denominational bank of the accumulator and acts in that bank of the accumulator, just as though an impulse had come from the tens denomination differential actuator, to "fire" the digit-representing tube which is prepared in that denominational order. In this way, denominational carry-overs are made from one denominational bank to another. The cathode current in the conductive transfer tube is relatively large at first, due to the charging of the distributed capacity of the conductors to ground, the cathode to heater capacity of tube 341 and the capacitors 718, 721, 726, 731, 736, 743, 748, 753, 758, 763, and 767 of .00001 microfarad each in the tens denominational order. When these capacitors are charged, the cathode current of transfer tube 341 (Fig. 9C) becomes very small due to the 200,000-ohm resistor 460 and the 1,000,000-ohm resistor 491. During the initial high current from the plate to the cathode of the transfer tube 341, the gas therein is ionized, but momentarily becomes deionized as the cathode potential reaches a positive peak at or above the plate potential, due probably to inductance phenomena in the cathode circuit. At the time the cathode 489 is at the potential of the plate, current ceases to flow, and the grid, having resumed its negative 110-volt potential from point 519 (Fig. 9C) through resistor 441 of 250,000 ohms and resistor 381 of 100,000 ohms, will keep the cathode current from again flowing as the potential difference increases between the cathode and the plate. The transfer tube is thus self-extinguishing and is ready to be prepared for another operation when the "9" digit-representing tube is again rendered conductive. Such self-extinguishing phenomena are prevented in the digit-representing tubes by the use of cathode resistors of less value and by the resistors as 565 heretofore described placed in series with the capacitors as 560 connecting each two adjacent cathodes. Therefore, assuming that in the tens denominational order of the accumulator the "00" digit-representing tube is conductive when the transfer tube fires, the "10" digit-representing tube 457 will be fired by the impulse from the transfer tube of the units denominational order. If the "90" digit-representing tube 436 of the tens denominational order of the accumulator had been conductive, and an impulse came over transfer conductor 343 from the units to the tens denominational order, the "00" digit-representing tube 456 and the "transfer" tube 467 of the tens denominational order would both fire, entering the carry-over of one into the hundreds denominational order, both the transfer tubes in the units and the tens denominational orders then extinguishing themselves.

It will now be apparent that the time delay element composed of a resistor and a capacitor in parallel connected to the grid of the starting tube of each differential actuator bank is used to withhold the firing of a denominational entry until a possible transfer has been made into that order of the accumulator, and why, in the alternative embodiment, by the alternative method of adding into the higher denominations first there can be no interference of the entered data impulses and the transfer impulses.

The stepping relays

Although not novel, the mechanical elements constituting the driving means for the sensing wiper arms and the indicator wheel coupled thereto will be described with reference to Figs. 4 and 5. Fig. 4 is a side elevation of the sensing and indicating mechanism for the units denominational order. Reference numerals on Figs. 4 and 5 in general correspond to the same elements as bear like numbers in the diagrammatic showings in Figs. 9A, 9B, and 9C.

On a vertical frame plate 527 (Fig. 4) is secured a horizontal plate 528 to which is attached the stepping magnet 503 (see also Fig. 9A) for operating an armature 509 fulcrumed on a projection 529 of an angle plate 537 secured to plate 528, the lower extending arm of said angle plate 537 having screwed thereto a spring anchor 538 for return spring 531, the other end of which spring is attached at point 593 to a lower projecting part of spring anchor 540 attached to armature 509, so that the armature is normally held away from the magnet 503. A lower projecting arm 575 of said armature, bearing against stop 576, limits the movement of the armature as it is pulled away from the magnet under urge of spring 531. Attached to plate 527 is a switch block 577 holding the contacts constituting switch 508. On movement of the armature toward the magnet 503, which magnet is energized through normally closed switch 508, the boss 578 opens switch 508, deenergizing the magnet 503, allowing spring 531 to return the armature to normal. Pawl 532 attached to the arm 575 cooperates with a ratchet 535 secured to an axle 536 journaled in plate 527. The other end of axle 536 is journaled in plate 583 attached to plate 528. As the armature moves toward the stepping magnet, the pawl is retracted one tooth and on the return of the armature to normal, under the influence of spring 531, rotates the ratchet and axle corresponding to the angle of one tooth. The ratchet has 20 teeth requiring twenty movements of the armature for its complete rotation. Secured to the axle 536 are the three wiper arms 595, 397, and 384, each of which has two arms which (see also Figs. 5, 9A, 9B, and 9C) are adapted by one arm or another to contact one of ten commutator contacts associated therewith whenever the armature is in normal position. Each of the wiper arms is connected by a wiper brush as 591 (Fig. 5) to a conductor to complete an electric circuit when the wiper arm engages one of the contacts of its related commutator. Thus, as axle 536 is rotated step by step, the wiper arms make a contact at the completion of each step. A spring member 520 engages the ratchet 535 to prevent reverse movement thereof. Means, heretofore described, are provided for stopping the energizing current of the stepping magnet whenever arm 397 wipes a contact of certain potential. The ten contacts stand for the ten decimal digits. Also attached to axle 536 (Figs. 4 and 5) is a pinion 584, which drives by one rotation a second pinion 585 two rotations. Pinion 585, secured on frame-supported axle 586, has secured to it a symbol wheel 587 bearing the decimal digits. For each contact which is wiped by arm 397 and stopped thereon because of a conductive tube, the corresponding symbol is positioned in front of a viewing aperture 588 to indicate the accumulated data visually.

There is one of the sensing and indicating units for each bank of the accumulator and they may be placed side by side, as shown in Fig. 1, so as to render the denominational indications readable in the correct contextual order.

Operation

Assuming that the described machine is in a deenergized condition due to main switch 90 being open and that it is desired to make an entry of data into a cleared accumulator, the operator first closes main switch 90, waits for the heater elements of the tubes to warm, and then operates key switch 401, allowing it to be returned to normal by its spring. Signal light 510, by lighting, indicates that the machine is operative. At this point, if the signal light has lighted, the indicator and the accumulator contain the same data. If the accumulator is not in a cleared or zeroized condition, a second operation of key switch 401 will clear it and render the zero digit-representing tubes in each denominational order conductive. The digit keys are then depressed and starting switch 100 is depressed to render the differential actuator operative to enter the selected number data into the accumulator. It is to be noted that, if the key switch 401 were not operated a second time and data was entered by means of the digit keys and starting switch 100, the amount set on the digit keys would be added to that last standing on the indicator. At any time during a series of entries of data, it is possible to disable the indicator by opening the non-indicate switch 423, which will retain in the indicator the sum then accumulated. Ensuing entries of data will not change the setting of the indicator until the non-indicate switch 423 is again closed, at which time the indicator will be operated to show the new total. At any time during the operation of the machine, key switch 401 may be operated to reset the accumulator to zero. On completion of a series of entries, main switch 90 may be opened, leaving the accumulated sum on the indicator to be used in the future or to be cleared on the next operation of the machine. By resetting the accumulator before the main switch 90 is opened, the indicator will be left at zero, and in putting the machine into operation again in a cleared condition, the main switch 90 has to be closed and key switch 401 operated only once.

The structure shown in the disclosure is adapted for use with any data that may be represented by impulses, it being necessary only to change the symbols on the keys and indicators to correspond to the data symbols involved. The structure is also adapted for indefinite expansion, both in unit elements in an order or in the number of orders. Thus, for instance, a duodecimal system of numerical notation may be represented by a twelve-digit bank; or an alphabet may be represented by a twenty-six-element bank, there being as many tubes as there are letters in the alphabet.

While the form of structure herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed is:

1. In a calculating machine, in combination, a plurality of electron tubes each having an anode and a cathode, said tubes being arranged in series in a bank; a circuit supplying electric energy for the anodes of said tubes, said circuit being made potentially available to all the tubes by means of a common conductor; and an electric conductor normally connecting all the anodes of the tubes in the bank, said conductor having therein switches, one associated with each tube, so arranged that when a switch is operated it connects its associated tube and all tubes in the bank lower in the series to said first-mentioned common conductor and interrupts the normal connection between the associated and the higher tubes of the series.

2. In combination, a plurality of banks of electronic devices each bank having a plurality of selectively operable control elements; a conductor common to all the banks; switching means actuated by the operation of a control element in a selected bank and connections therewith which cause a certain one of the electronic devices in that bank to be connected to said conductor to prepare an initiating circuit for that bank and which interrupts the conductor to prevent extension of the initiating circuit to the remaining banks; and a second switching means operated by said control element and connections therewith for connecting said conductor beyond the interruption to another of the devices in the selected bank to enable said other electronic device to transmit a potential impulse through said conductor to initiate an operation in another bank.

3. In combination, a plurality of banks of electron discharge tubes; means coupling the tubes of each bank so that they will operate sequentially one at a time from a beginning tube to a selected last tube; means coupling the banks so that they will operate successively; depressible keys controlling the couplings, by which the last tube to operate in a given bank is selected; normally effective locking means for each bank to keep the operated keys depressed; and means controlled by the last tube to operate in the last bank to operate for releasing the locking means.

4. In combination, a plurality of banks of electron discharge tubes; means coupling the tubes of each bank so that they will operate sequentially one at a time from a beginning tube to a selected last tube; means coupling the banks so that they will operate successively; operable devices controlling the couplings by which the last tube to operate in a given bank is selected; normally effective locking means for each bank to keep the operated devices in operative position; a solenoid for each locking means, which, when energized, releases said locking means; and means rendered effective by the operation of the last tube to operate in the last bank to operate for energizing the solenoids.

5. In combination, denominational banks of electron discharge tubes, one tube being provided for each digit in each bank; connecting means for causing consecutive operation of the tubes; a manual control element for each tube; an electron tube for starting the consecutive operation of the tubes in each bank; a circuit for transmitting an electric impulse to said starting tube; and switching means actuated by said manual control element for connecting said circuit to a source of electric energy, whereby the starting electron tube of a given bank will be caused to operate only if a manual control element in that bank is operated, said electric starting energy in all banks except the first bank being obtained from the last tube to fire in the preceding bank.

6. In combination, a plurality of denominational banks of electron discharge tubes each bank having a plurality of tubes each representing a digit in the denomination; connecting means for causing consecutive operation of the tubes; a control key associated with each tube; means controlled by an operated control key in one of the banks to supply operating current to all those tubes in said bank representing the digits in the bank up to and including that of the operated key; means to start the operation of each bank of tubes; switch means controlled by the operated keys and effective only in those banks in which a key is operated to render the associated starting means operable; and switch means controlled by the operated keys for causing the completion of operation in one bank to cause the operation of the next selected bank's starting means, an operated key in a bank determining that that bank shall operate.

7. In a calculating machine, the combination of a differential actuator comprising a series of denominational banks of control keys; a series of denominational banks of electron discharge tubes representing the digits, the controlled sequential operation of which tubes produces a controlled number of electric impulses for differentially operating an accumulator; an electric impulse producing starting tube of the gaseous electron discharge type for each denominational order of the differential actuator, the operation of which is necessary to start the operation of its associated denominational bank; a starting means for the differential actuator comprising a starting switch and a conductor common to all the banks, the operation of said starting switch closing a switching circuit, including the conductor, which causes a discharge in the starting tube of the first denomination in which a key has been depressed; and connections including switching means controlled by an operated digit key which connects the last operated tube in the first selected denomination to the starting tube of the next denomination of the series selected for operation in a circuit by-passing all the intervening denominations if any.

8. In combination, a plurality of electronic devices; means for causing the electronic devices to operate in sequence; an electric conductor; means for connecting an electrode of each electronic device to the conductor so that the operation of each electronic device will transmit a potential impulse in the conductor in the same manner; and means to selectively determine the number of electronic devices to operate.

9. In combination, a plurality of gaseous electron discharge tubes each having an anode, a cathode, and a control element; means supplying each tube with a cathode-anode potential and a bias potential for the control element, the cathodes being connected by a common conductor, said tubes being normally kept from discharging by the said bias potential on the control element; means including a capacitor connecting the cathodes of each two adjacent tubes; means connecting the tubes in series by connecting the cathode of each tube to the control element of the next succeeding tube; and means to cause a discharge through the first tube in the series, whereby said connections automatically cause the other tubes in the series to discharge in sequence and cause the change of potential of the cathodes as the tubes discharge to be impressed upon all the other cathodes.

10. In combination, an electric conductor; a plurality of electronic devices; means, including a resistance, for supplying operating potential to said devices; means connecting said devices to said conductor so that the bringing of any one of said electronic devices to a state of full conductivity will cause an electric potential impulse to be impressed on said conductor; means connecting the electronic devices for bringing them to a state of full conductivity one at a time in sequence; and selectively operable means controllable to break the connection between any two electronic devices so as to selectively determine the number of potential impulses impressed on the common conductor.

11. In combination, a plurality of banks of electronic devices; a common electric conductor for each bank of electronic devices; means whereby each device when operated will cause a potential electric impulse in the associated common conductor; means connecting all of the electronic devices in a bank for operation one at a time in sequence; control means cooperating with the connecting means for determining how far such sequential operation shall proceed in each bank; means for starting such an operation in each bank; and connections between the banks whereby electronic devices in one bank control the starting means of the next bank so that the banks are operated one at a time in sequence.

12. In combination, a plurality of denominational banks of electron tubes each bank having a tube for each digit of the denomination; means in each bank to select a number of tubes for operation; means connecting the tubes in a bank so the selected ones are operated in sequence one at a time; an output circuit from each bank of tubes having impressed thereon an electric potential impulse for each tube operated; a starting tube for each bank which must be operated to start the operation of the tubes in the bank; manual means to cause the starting tube of the first denominational bank in which a tube or tubes have been selected to operate; and connections between banks controlled by the selecting means in a bank to cause the last selected tube of a preceding bank to operate the starting tube in the next bank in which a tube has been selected, said operation of the starting tubes resulting in the denominational banks being operated in sequence, with an interval of time between the operation of digit tubes in successive banks.

13. In a calculating machine, in combination, a circuit supplying electric energy; an electric conductor; means operable to connect the supply circuit to the conductor to create an electric impulse therein; digit keys; a differential actuator consisting of a series of denominational banks controlled by the digit keys; starting means for each denominational bank, said starting means being rendered operable by an electric impulse in said conductor; connections, including switching means controlled by the digit keys, for connecting the conductor to the starting means of the differential bank of the first denomination of the series in which a digit key is depressed whereby an electric impulse may be given the starting means of that denominational bank only; a means producing an electric impulse upon completion of the operation of a denominational bank of the differential actuator; a second set of connections including switching means controlled by the digit key whereby the electric impulse produced by the completion of operation in a denominational bank is transmitted to the starting means of the denominational bank next highest in which a digit key has been operated; and means to delay the transmission of said electric impulse.

14. In a calculating machine, in combination, a plurality of electron tubes arranged in denominational banks, each tube representing a denominational digit; means coupling the tubes of each bank so that a selected number of tubes in a chosen bank may be caused to operate uniformly in numerical sequence; and means coupling the banks so that the chosen banks of tubes will operate in denominational sequence, said last coupling means including a capacitor to enforce a uniform pause between the operation of two banks be they adjacent or non-adjacent.

15. In a calculating machine, in combination, a plurality of groups of electron tubes, the groups being arranged in operative sequence; manual means to select for operation any number of tubes in any of the groups; means to cause the selected tubes of a group to operate in uniform sequence; and means causing the selected groups to operate successively at uniform intervals whether the chosen groups are adjacent or non-adjacent.

16. In a calculating machine, in combination, an accumulator of numerical data comprising gaseous electron discharge tubes representing digits including zeros, said tubes being arranged in denominational groups; means connecting the tubes in a group whereby they will be discharged one at a time in endless sequence by means of successive electric impulses; a common conductor for each group; differential means to supply said impulses to the tubes in a group by said common conductor, each of which impulses causes a discharge to occur in the tube next in sequence to the last discharging tube, and the extinguishment of said last discharging tube; a gaseous electron discharge transfer tube so connected with each denominational group that it is discharged by the same impulse that discharges the zero tube of that group; and connections between each such transfer tube and the common conductor of the next denominational group, whereby the discharge of the transfer tube impresses an electric impulse on said common conductor, thereby causing a denominational carry-over by causing the next tube in the sequential order of said next higher denomination to discharge 17. In a calculating machine, in combination, an electrically-operated accumulator of numerical data, said accumulator having denominational banks; means for transferring denominational carry-overs by electrical impulses; an electric impulse differential actuator; and electrical means comprising a capacitor for delaying the entry of data into a succeeding order of the accumulator by the differential actuator, whereby to avoid interference with the transfer of a denominational carry-over to said succeeding order from the next lower order 18. In combination, a plurality of electron discharge tubes connected in an endless operative chain circuit including a resistance network wherein they may be made to discharge one at a time in sequence; a terminal representing each tube; means including an isolation resistor of a value relatively great to those of the chain circuit connecting said terminals with said tubes so that a terminal will have one potential if its associated tube is discharging and another potential if said associated tube is not discharging, and so that a change in potential of a terminal will not affect the operative potential balance between the tubes; means automatically exploring the terminals for one potentially energized by a discharging tube; means to stop the exploring of the member when a terminal is sensed that has a potential indicating a discharging tube; and visible symbol-bearing means automatically set in accordance with the position of the exploring means.

19. In a calculating machine, in combination, a plurality of electron tubes arranged and connected to form an accumulator of numerical data; an indicator; indicator control means; means coupling said tubes and said indicator control means whereby the indicator is set to represent the sum of data accumulated; key-controlled differential means for entering data into the accumulator; indicator-controlled means for entering data into the accumulator; and a normally open electric supply switch which when closed conditions the machine for operation and automatically causes the indicator-controlled means to enter the data set on the indicator into the accumulator.

20. In a calculating machine, in combination, an accumulator of numerical data comprising denominational rows of digit-representing electron tubes wherein accumulated data in each denomination is represented by the conducting condition of a digit-representing tube; an indicator having symbol elements which display the number corresponding to the conducting digit tube; indicator control means; means coupling said tubes and said indicator control means whereby the indicator is set to represent the sum of data accumulated; and means controlled by said indicator whereby any number displayed in the symbol elements may be entered into the accumulator by causing an impulse of electric energy to be directed to the tubes representing the displayed digits thereby causing them to operate.

21. In a calculating machine, in combination, a source of electric energy; a main switch; a control switch having a normal position and a moved position; a conductor for the electric energy energized when the control switch is in moved position; an electronic tube having an anode-cathode circuit energized by the conductor and having a thermionic cathode heated only when the main switch is closed; an accumulator; means for resetting the accumulator; and means including a solenoid operated by the anode-cathode circuit for causing the resetting means to operate whenever the control switch is shifted to moved position after operation of the electron tube has been initiated, its cathode having been properly heated, by a previous shifting of the main switch to closed position.

22. In a calculating machine, in combination, a source of electric energy; a control switch having a normal position and a moved position; a conductor for the electric energy, energized when the switch is in moved position; an electronic tube having an anode-cathode circuit energized by the conductor, said tube being conductive only when its cathode is heated by the source of energy; an indicator; and means including a relay made ready by flow of electric energy through the electron tube and actuated by the return of the control switch to normal position to cause the indicator to operate.

23. In a calculating machine, in combination, an accumulator; an indicator controlled thereby; key-controlled differential means for entering data into the accumulator; indicator-controlled means for entering data into the accumulator; operating circuits for causing the accumulator, actuator, and indicator to operate; means to set the accumulator to zero; a normally open main switch which when closed completes certain of said operating circuits to condition the machine for operation and closes another of said operating circuits to cause the indicator-controlled means automatically to enter the data set on the indicator into the accumulator; control means which, when operated, completes other of said operating circuits to cause the indicator to show the accumulated data resulting from subsequent entries of data into the accumulator and prepares other of said operating circuits to said zero-setting means; and a control element which, when operated the first time after the closing of the main switch, actuates the control means to cause the indicator to operate and to prepare the circuits to the zero-setting means so that the element, when operated subsequently to the first time after the closing of the main switch, completes the prepared circuits to set the accumulator to zero and therewith the indicator.

24. In a calculating machine, in combination, an accumulator the data-storing elements of which are gaseous electron discharge tubes having thermionic cathodes, the heating of said cathodes being necessary to render the accumulator operative; a control electron tube having a thermionic cathode the heating of which is necessary to the operation of said tube; means to cause the cathodes of all tubes to be connected to a heating source; means to cause the control tube to operate; and controls for the accumulator which are rendered effective to allow complete action of the accumulator when said control tube is operated, in order to prevent operation of the accumulator before the cathodes are properly heated.

25. In combination, an accumulator comprising a bank of electron discharge tubes, there being a tube representing each digit of a numerical denomination; means to differentially enter data into the accumulator under key control by causing the proper digit tube to become active; an indicator; automatic means to set the indicator in accordance with the condition of the accumulator as represented by the active tube; means to clear the accumulator without clearing the indicator; and means to cause the operation of an accumulator tube corresponding to the setting of the indicator.

26. A generator of electric impulse sequences having a variable number of electric impulses in a sequence comprising, in combination, a plurality of electron tubes; a common means supplying operating energy for the tubes; means coupling the tubes so that they may be made to operate one at a time in sequence; an output conductor; means coupling said tubes thereto so that a distinct impulse is generated therein for each operation of a tube; and means including a switch for each tube for interrupting the first-mentioned coupling means controllable to stop the sequential operation of the tubes at any point in the sequence.

27. In combination, a plurality of groups of electron tubes; means selectively operable for supplying operating energy to selected ones of said tubes; means coupling the selected tubes of each group so that they may be made conducting one at a time in sequence; and means coupling the groups in which tubes have been selected so that the operation of the groups will occur successively.

28. In combination, a plurality of groups of electron tubes; means supplying operating energy to said tubes; means coupling the tubes of each group so that they may be made conducting one at a time in sequence; selectively operable means controllable to select a number of tubes in each group to become conducting sequentially; and means coupling the groups so that the sequential operation of the groups will occur successively.

29. In combination, a plurality of groups of electron tubes; means supplying operating energy to said tubes; means coupling the tubes of each group so that they may be made conducting one at a time in sequence; selectively operable means controllable to select a number of tubes in each group to become conducting sequentially; and means coupling the groups so that the act of conduction in the last device conducting in a given group will initiate conduction in the first selected device of the next group whereby sequential operation of the next group follows immediately conduction in the last device of the preceding group regardless of the number of devices selected for conduction in said group.

30. In combination, a circuit supplying electric energy; a plurality of denominational banks of keys, each key in a bank representing a digit of the denomination; a plurality of banks of electron tubes, one tube for each key; a plurality of sets of switches, one set for each key, operable by said keys, each set including three switches; and connections between said switches, said tubes and said supply circuit whereby, upon operating a selected key, one of the switches of the selected set renders the corresponding bank of tubes operative, a second switch connects to the supply circuit each digit tube in the corresponding bank up to and including the tube associated with the selected key, and a third switch causes the bank of tubes corresponding to the selected key to be operatively connected to the next selected bank.

31. In a calculating apparatus, the combination of a plurality of denominational banks of electron tubes, each bank including a tube for each digit of the denomination; means electrically coupling the tubes of each bank for sequential operation to produce sequences of electric impulses to operate an accumulator differentially; a starting electron tube for each bank, the operation of which tube produces an electric impulse to start the operation of its associated bank; a plurality of banks of digit keys, one key for each digit tube; a common conductor associated with all the digit tubes; means including a starting switch for connecting said common conductor with a source of electric potential; a starting impulse conductor connected to each starting tube; a first series of switches selectively controlled by the digit keys, each switch being effective, when operated by a selected digit key, to interrupt the common conductor and connect the portion thereof to which the starting switch is connected to the starting impulse conductor for the bank with which the selected digit key is associated; and a second series of switches selectively controlled by the digit keys, each switch being effective, when operated by a selected digit key, to connect the electron tube corresponding to the selected key to that portion of the common conductor associated with other banks of tubes and cut off from said source of potential by operation of a switch of the first series.

32. In a calculating machine, the combination of a plurality of electron tubes arranged and connected to form an accumulator of numerical data operated step by step by impulses impressed commonly on said tubes to enter units and operated by application of potential to certain tubes to enter more than a unit; differential means for generating electric impulse sequences; means for transmitting the impulses to the accumulator to operate said accumulator step by step; a source of electric energy; and differentially operable mechanism for directing a flow of electric energy to said accumulator to enter data of one or more units therein at a single step.

33. An accumulator for calculating apparatus comprising the combination of a plurality of sets of electron tubes, one set for each denomination of the accumulator, each set including a digit tube for each digit of the denomination, each tube including an anode, a cathode and a control grid; a plurality of transfer tubes, one for each denomination, each being an electron tube having an anode, a cathode and a control grid; means, for each denomination, for impressing electric impulses upon the control grids of the digit and transfer tubes of the corresponding denomination; means for connecting the anodes to a source of electric potential; means for connecting the cathodes to a source of electric potential; an electrical coupling between the cathode of each digit tube and the control grid and cathode of the next succeeding tube of the set, whereby the digit tubes of each set are operatively connected in an endless chain in which the operation of any tube in the chain will extinguish the preceding tube and prepare the succeeding tube for operation upon an electric impulse being impressed upon the control grid thereof; a connection between the cathode of the last digit tube of a denominational series and the control grid of the transfer tube for each denomination; and an electrical coupling between the cathode of the transfer tube for such denomination and the set of digit tubes for the next higher denomination of the accumulator, whereby the operation of the said last digit tube prepares the first digit tube of such series and the transfer tube for operation and the impressing of the next electric impulse upon the control grid of the transfer tube causes operation thereof and thereby impresses an electric impulse upon the control grids of the digit tubes of the next higher denomination.

34. An accumulator for calculating apparatus comprising the combination of a plurality of sets of gaseous electron discharge tubes, one set for each denomination of the accumulator, each set including a digit tube for each digit of the denomination, each tube including an anode, a cathode and a control grid; a plurality of transfer tubes, one for each denomination, each being a gaseous electron discharge tube having an anode, a cathode, and a control grid; means, one for each denomination, for impressing electric impulses upon the control grids of the digit and transfer tubes for said denomination; means for connecting the anodes to a source of electric potential; means for connecting the cathodes to a source of electric potential; an electrical coupling between the cathode of each digit tube and the control grid and cathode of the next succeeding tube of the set whereby the digit tubes of each set are connected in an endless operative chain in which the discharge of any tube in the chain will extinguish the preceding tube and prepare the succeeding tube for discharge upon an electric impulse being impressed upon the control grid thereof; an electrical coupling between the cathode of the last digit tube of a denominational series and the control grid of the transfer tube for such denomination; and an electrical coupling between the cathode of each transfer tube and the control grids of the tubes of the next higher denomination, whereby the discharge of the said last digit tube prepares the first tube of the series and the transfer tube for discharge and the impressing of the next electric impulse upon the control grid of the transfer tube causes discharge of the transfer tube and thereby impresses an electric impulse upon the control grids of the tubes of the next higher denominational series.

35. An accumulator for calculating apparatus comprising the combination of a plurality of input conductors, one for each denomination of the accumulator; a plurality of sets of electron tubes, one set for each denomination of the accumulator, each set including one digit representing tube for each digit of the denomination, each tube including an anode, a cathode and a control grid; a plurality of transfer tubes, one for each denomination, each being an electron tube having an anode, a cathode and a control grid; an electrical coupling between the control grid of each digit and transfer tube and the input conductor for the denomination with which the tube is associated; means for connecting the anodes to a source of operating electric potential; means for connecting the cathodes to a source of operating electric potential; electrical couplings between the cathode of each digit tube and the control grid and cathode of the next succeeding tube of the set whereby the tubes of each set are connected in an endless operative chain in which the operation of any tube in the chain will extinguish the preceding tube and prepare the succeeding tube for operation upon an electric potential impulse being impressed upon the input conductor corresponding to the set; a connection between the cathode of the last tube of a denominational series and the control grid of the transfer tube for such denomination, whereby the operation of said last tube prepares the transfer tube, as well as the first tube of the series, for operation; and an electrical coupling between the cathode of each transfer tube and the input conductor for the next higher denomination of the accumulator, whereby the impressing of the next electric potential impulse upon the input conductor corresponding to the denomination causes operation of the transfer tube and thereby impresses an electric potential impulse upon the input conductor of the next higher denomination and then extinguishes the transfer tube.

36. An accumulator for calculating apparatus comprising the combination of a plurality of input conductors, one for each denomination of the accumulator; a plurality of sets of gaseous electron discharge tubes, one set for each denomination of the accumulator, each set including one digit-representing tube for each digit of the denomination, each digit tube including an anode, a cathode and a control grid; a plurality of transfer tubes, one for each denomination, each being a gaseous electron discharge tube having an anode, a cathode and a control grid; an electrical coupling between the control grid of each digit and transfer tube and the input conductor for the denomination with which the tube is associated; means for connecting the anodes to a source of operating electric potential; means for connecting the cathodes to a source of operating electric ptential; electrical couplings between the cathode of each digit tube and the control grid and cathode of the next succeeding tube of the set whereby the tubes of each set are connected in an endless operative chain in which the discharge of any tube in the chain will extinguish the preceding tube and prepare the succeeding tube for discharge upon an electric potential impulse being impressed upon the input conductor corresponding to the set; an electrical coupling between the cathode of the last tube of each denominational series and the control grid of the transfer tube for such denomination, whereby the discharge of said last tube prepares the transfer tube, as well as the first tube of the series, for discharge; an electrical coupling between the cathode of each transfer tube and the input conductor for the next higher denomination of the accumulator, whereby the impressing of the next electric potential impulse upon the input conductor corresponding to the denomination causes discharge of the transfer tube and thereby impresses an electric potential impulse upon the input conductor of the next higher denomination; and circuit elements in the electrode connections of the transfer tube which then cause the extinguishment of the transfer tube.

37. In a calculating apparatus, the combination of a plurality of electron tubes, one digit-representing tube for each digit of a denomination, each tube having an anode, a cathode, and a control grid; means coupling said tubes in an endless operative chain wherein registration is effected by sequential operation of said tubes and the amount registered is denoted by the operating condition of one of said tubes; means for supplying electric potential to the anodes of said tubes; means for supplying the cathodes of said tubes with electric potential; and means for clearing a registration from said tubes including a circuit for connecting the control grid of the zero-representing tube to a source of firing potential and a switch for breaking and then making the supply circuit for the anodes of all of said tubes, while said grid is so connected, whereby any operating tube of the group is caused to cease operation and, then, operation of the zero-representing tube is initiated.

38. In a calculating apparatus, the combination of a plurality of electron tubes, one digit-representing tube for each digit of a denomination, each tube having an anode, a cathode, and a control grid; means coupling said tubes in an endless operative chain wherein registration is effected by sequential operation of said tubes and the amount registered is denoted by the operating condition of one of said tubes; an anode supply circuit connecting the anodes with a source of electric potential; a normally closed switch in said anode supply circuit; means connecting said cathodes with a source of electric potential; a circuit for connecting the control grid of the zero-representing tube to a source of firing potential; a normally open switch in said control grid circuit; and means for clearing a registration from said tubes including a key-controlled solenoid for actuating said switches so that said normally open switch is closed before said normally closed switch is opened, and, then, said normally closed switch is closed before said normally open switch is opened, whereby to cause any operating tube to cease operation and, then, to initiate operation of the zero-representing tube.

39. In a calculating apparatus, the combination of a plurality of electron tubes, one digit-representing tube for each digit of a denomination, each tube having an anode, a cathode, and a control grid; means coupling said tubes in an endless operative chain wherein registration is effected by sequential operation of said tubes and the amount registered is denoted by the operating condition of one of said tubes; an anode supply circuit connecting the anodes with a source of electric potential; a normally closed switch in said anode supply circuit; means connecting said cathodes with a source of electric potential; a circuit for connecting the control grid of the zero-representing tube to a source of firing potential; a normally open switch in said control grid circuit; and means for clearing a registration from said tubes including a solenoid, means actuated by the energization of the solenoid for, first, closing the normally open switch and, then, opening the normally closed switch, and actuated on deenergization of the solenoid to, first, open the normally open switch and, then, close the normally closed switch, and manually controlled means for energizing and deenergizing said solenoid.

40. In a calculating apparatus, the combination of a plurality of electron tubes, there being one tube for representing each digit of a denomination; means coupling said tubes in an endless operative chain in which registration is effected by sequential operation of said tubes and the amount registered is denoted by the digit-representing tube in operation; means for supplying operating potential to said tubes; a distributing switch; automatic means for setting said switch to any one of a plurality of digit-representing positions, depending upon the tube which is operating; and a circuit completed by said distributing switch for impressing an operation-initiating electric impulse upon the tube corresponding to the instant switch setting.

41. In a calculating apparatus, the combination of a plurality of electron tubes, there being one tube for representing each digit of a denomination, each tube having an anode, a cathode and a control grid; means coupling said tubes in an endless operative chain in which registration is effected by sequential operation of said tubes and the amount registered is denoted by the digit-representing tube in operation; anode and cathode supply circuits for supplying electric potential to said anodes and cathodes; a main switch for making and breaking said supply circuits; a distributing switch; automatic means for setting said distributing switch to any of a plurality of digit-representing positions, depending upon the tube which is operating; and a circuit energized by said main switch, said circuit being completed by said distributing switch, for impressing an electric potential upon the control grid of the tube corresponding to the instant switch setting.

42. A generator of electric impulse sequences controllable to vary the number of electric potential impulses in a sequence comprising the combination of a set of electronic devices; an output conductor for receiving the generated impulse sequences; electrical couplings between said electronic devices and said output conductor whereby the operation of each electronic device will impress an electric impulse upon said conductor; electrical couplings between said electronic devices whereby upon initiation of operation of the first of said devices other electronic devices of the set will automatically operate successively; means for initiating operation of the first electronic device of the set; and means for selectively making and breaking said couplings between the electronic devices to determine the number of them to operate successively in the generation of an impulse sequence.

43. A generator of electric impulse sequences controllable to vary the number of electric potential impulses in a sequence comprising the combination of a set of electron tubes; each tube having an anode, a cathode and a control grid; an output conductor coupled to said tubes receiving an impulse as a tube becomes conducting; an anode supply conductor connected with a source of eelctric potential; connections between the anode of each tube of the set and the anode of the next succeeding tube, each such connection including an anode circuit switch normally completing such connection but operable to interrupt said connection and connect said anode supply conductor to the anode of the corresponding tube; means for connecting the cathodes of said tubes to a source of electric potential; an electrical coupling between the cathode of each tube and the control grid of the next succeeding tube for causing said tubes to operate successively; means for transmitting an electric potential impulse to the control grid of the first tube of the set; and means for selectively operating said anode circuit switches, whereby to connect the anodes of selected tubes to the anode supply conductor and thereby determine the number of tubes in the set to be operated successively upon transmitting an impulse to the control grid of the first tube of the set.

44. A generator of electric impulse sequences controllable to vary the number of electric potential impulses in a sequence comprising the combination of a set of electron tubes, each tube having an anode, a cathode and a control grid; an output conductor for receiving the generated impulse sequences; means for connecting the anodes to a source of electric potential; means for connecting the cathodes to a source of electric potential; a connection between the cathode of each tube and the control grid of the next succeeding tube whereby said tubes may be caused to operate succeessively, each such connection including a normally closed grid supply switch operable to interrupt said connection; electrical couplings between the cathode of each tube and said output conductor; means for transmitting an electric potential impulse to the control grid of the first tube of the set; and means for selectively operating said grid supply switches whereby to interrupt the connections between selected tubes of the set and thereby determine the number of tubes in the set to be operated successively upon transmitting an impulse to the control grid of the first tube of the set.

45. A generator of electric impulse sequences controllable to vary the number of electric potential impulses in a sequence comprising the combination of a set of electron tubes, each tube having an anode, a cathode and a control grid; an output conductor for receiving the generated impulse sequences; an anode supply conductor connected with a source of electric potential; connections between the anode of each tube of the set and the anode of the next succeeding tube, each such connection including an anode circuit switch normally completing such connection but operable to interrupt said connection and connect said anode supply conductor to the anode of the corresponding tube; means for connecting the cathodes of said tubes to a source of electric potential; a connection between the cathode of each tube and the control grid of the next succeeding tube whereby the tubes may be caused to operate successively, each such connection including a normally closed grid supply switch operable to interrupt said connection; electrical couplings between the cathode of each tube and said output conductor; means for transmitting an electric potential impulse to the control grid of the first tube of the set; and means for selectively operating said anode circuit switches and grid supply switches, whereby to interrupt the connections between selected tubes of the set and thereby determine the number of tubes in the set to be operated successively upon transmitting an impulse to the control grid of the first tube of the set.

46. A generator of electric impulse sequences controllable to vary the number of electric potential impulses in a sequence comprising the combination of a set of gaseous electron discharge tubes, each tube having an anode, a cathode and a control grid; an output conductor for receiving the generated impulse sequences; an anode supply conductor connected with a source of electric potential; connections between the anode of each tube of the set and the anode of the next succeeding tube, each such connection including an anode circuit switch normally completing such connection but operable to interrupt said connection and connect said anode supply conductor to the anode of the corresponding tube; means for connecting the cathodes of said tubes to a source of electric potential; a connection between the cathode of each tube and the control grid of the next succeeding tube whereby said tubes may be caused to discharge successively, each such connection including a resistor and a normally closed grid supply switch operable to interrupt said connection; electrical couplings between the cathode of each tube and said output conductor, each such coupling including a resistor and a capacitor in parallel; means for transmitting an electric potential impulse to the control grid of the first tube of the set; and means for selectively operating said anode circuit switches and grid supply switches, whereby to interrupt the connections between selected tubes of the set and thereby determine the number of tubes in the set to be discharged successively upon transmitting an impulse to the control grid of the first tube of the set.

47. A denominational generator of electric impulse sequences, in which the number of electric potential impulses in sequence for each denomination is selectively variable to represent denominational digits, comprising the combination of a plurality of output conductors, one for each denomination; a plurality of sets of electron tubes, one set for each denomination, each set including an electron tube for each digit of the denomination; means for supplying operating energy to said tubes; electrical couplings between the tubes of each set whereby upon operation of the first tube of the set the remaining tubes of said set may be caused automatically to operate successively; electrical couplings between the tubes of each set and the output conductor for the corresponding denomination, whereby the operation of each tube in a set will generate an electric potential impulse in the corresponding output conductor; means including a conductor common to the denominations for initiating operation in sequence of the first tubes of said sets; and selectively operable means, one for each set of tubes, controllable to determine the initiation of the operation in said set and to vary the number of tubes in the set that will operate sequentially, and thereby determine the number of impulses in the sequences generated in each of the several output conductors to represent denominational digits.

48. A differential device for calculating apparatus comprising the combination of a plurality of output conductors, one for each denomination; a plurality of sets of electron tubes, one set for each denomination, each set including one electron tube for each unit of data; a plurality of banks of digit keys, one bank for each denomination, each bank including a key for each digit to be entered; means for supplying operating energy to said tubes; electrical couplings between the tubes of each set whereby, upon operation of the first tube of the set, the remaining tubes of said set may be caused automatically to operate successively; electrical couplings between the tubes of each set and the output conductor for the corresponding denomination, whereby the operation of each tube in a set will generate an electric potential impulse in the corresponding output conductor; means including a conductor common to the denominations for initiating operation in sequence of the first tubes of said sets; and selectively operable means, for each set of tubes, controllable by said digit keys to determine the initiation of operation in said set and to vary the number of tubes in each set that will operate sequentially, to correspond to the values of the operated keys, and thereby determine the number of impulses in the sequences generated in each of the several output conductors to represent denominational digits.

49. A differential device for calculating apparatus comprising the combination of means settable to represent digit values; a set of electronic devices; an output conductor coupled to said devices for receiving an impulse as a device becomes conducting; electrical couplings between said electronic devices and said output conductor whereby the operation of each electronic device will impress an electric impulse upon said conductor; electrical couplings between said electronic devices whereby upon initiation of operation of the first of said devices other electronic devices of the set may automatically operate successively; means for initiating operation of the first electronic device of the set; and means controlled by said settable means for selectively varying said coupling between the electronic devices to determine the number of them to operate successively in the generation of an impulse sequence.

50. A differential device for calculating apparatus comprising the combination of a bank of digit keys, one for each digit; a set of electronic devices, one for each digit key; an output conductor coupled to said devices for receiving an impulse as a device becomes conducting and receiving a number of said impulses corresponding to the value of an operated digit key; electrical couplings between said electronic devices and said output conductor whereby the operation of each electronic device will impress an electric impulse upon said conductor; electrical couplings between said electronic devices whereby upon initiation of operation of the first of said devices other electronic devices of the set may automatically operate successively; means for initiating operation of the first electronic device of the set; and means controlled by said digit keys for selectively varying said coupling between the electronic devices to determine the number of them to operate successively in the generation of an impulse sequence.

51. A differential device for calculating apparatus comprising the combination of a plurality of output conductors, one for each denomination; a plurality of banks of electronic devices, one bank for each denomination, each bank including one digit-representing device for each digit of the denomination; a starting impulse conductor for each bank for transmitting an electric impulse to the first electronic device in said bank to initiate the operation thereof; a common conductor having portions associated with the several banks of electronic devices; means for connecting said common conductor with a source of electric potential; a plurality of bank-selecting switches, one of each electronic device, each said switch normally connecting adjacent portions of the common conductor and being operable to break said connection and connect a portion of the common conductor to the starting impulse conductor associated with the corresponding bank; a plurality of bank-routing switches, one for each electronic device, each said switch normally coupling adjacent electronic devices enabling sequential operation thereof but being operable to interrupt said coupling and to connect the electronic device to which the switch corresponds to a portion of the common conductor associated with the next higher bank; means for electrically coupling said electronic devices to the corresponding output conductors; and selectively operable means for operating said switches whereby to select the banks in which electronic devices will be operated by connecting the last of the electronic devices in a bank to be operated to the portion of the common conductor associated with the higher banks to initiate the operation of the next higher bank selected.

52. A differential device for calculating apparatus comprising the combination of a plurality of output conductors, one for each denomination; a plurality of banks of electron tubes, one bank for each denomination, each bank including one digit-representing tube for each digit of the denomination, each tube having an anode, a cathode and a control grid; a common conductor having portions associated with the several banks of tubes; means for connecting said common conductor with a source of electric potential; a starting impulse conductor for each bank of tubes for transmitting a starting impulse to the control grid of the first tube of said bank to initiate the operation thereof; a plurality of denomination-selecting switches, one for each tube, each said switch normally connecting adjacent portions of the common conductor and being operable to break said connection and connect a portion of the common conductor to the starting impulse conductor associated with the corresponding bank of tubes; a connection between the cathode of each tube and the control grid of the next succeeding tube of each bank; a plurality of grid supply switches, one for each tube, each such switch normally completing said connection to the next control grid but being operable to interrupt said connection and to connect the cathode of the corresponding tube to a portion of the common conductor associated with the bank of tubes of next higher denomination; means for electrically coupling said tubes to the output conductors for the corresponding denomination; and selectively operable means for operating said denomination-selecting switches and said grid supply switches, whereby the cathode potential of the last tube in a bank will be conveyed to the portion of the common conductor associated with the tubes of the next higher bank.

53. An impulse generator for generating impulse sequences having a variable number of electric potential impulses in the sequence comprising the combination of a plurality of digit-representing electron tubes, one digit-representing tube being provided for each digit of a de-denomination; means coupling said digit-representing tubes in a sequence so that operation of the first tube in the sequence may cause succeeding tubes therein to operate successively and the operation of any tube in the sequence will cause any preceding tube therein to cease operation; an output conductor; means coupling said tubes to said output conductor whereby an electric impulse is impressed upon said conductor each time that a tube in the sequence operates; selectively operable means controllable to interrupt the coupling between selected tubes of the sequence to determine the number of tubes to operate in sequence; a starting electron tube for the sequence; an electrical coupling between said starting tube and the first tube of the sequence whereby operation of said starting tube causes the first tube of the sequence to operate; a circuit for supplying operating energy to said starting and digit-representing tubes, the coupling between said starting tube and the first tube of the series being such that said starting tube, after having operated to transmit a starting impulse to said first tube, continues to operate until the operating energy is cut off therefrom; and means for interrupting said supply circuit whereby said starting tube and any operating digit-representing tube are caused to cease operation preparatory to the initiation of a new sequence of operation by another operation of the starting tube.

54. An impulse generator for producing impulse sequences having a variable number of electric potential impulses in the sequence comprising the combination of a set of digit electron tubes, one digit-representing tube being provided for each digit of a denomination; means coupling said digit tubes so that they may operate in sequence upon the initiation of operation of the first tube of the set; an output conductor; means coupling said digit tubes to said output conductor so that an electric potential impulse is impressed on said conductor each time a tube of the set operates; a starting tube; means coupling said starting tube to the first digit tube of the set whereby operation of said starting tube causes said first tube to operate; a circuit for supplying operating energy to said starting and digit tubes; a starting switch for closing said circuit to supply said energy to said tubes; a second normally closed switch in said circuit; means for transmitting an electric impulse to said starting tube to cause it to operate; selectively operable means for interrupting the coupling between selected digit tubes of the set to determine the number of said tubes to operate in sequence; and means for opening said second switch automatically upon completion of sequential operation of said tubes; the coupling between said starting tube and the first digit tube being such that said starting tube will continue in operation until said second switch opens, whereby to prevent a repeat operation if the starting switch is held closed inadvertently.

55. Apparatus for originating a transmitting, and receiving units of data accurately at high speed comprising the combination of an impulse emitter for emitting impulse sequences having precisely controlled variable numbers of electric impulses including a plurality of electron tubes, means for supplying operating energy to said tubes, a selectively operable network coupling said tubes in a sequence so that operation of the first tube of the sequence will cause automatically selected remaining tubes of the sequence to operate successively one at a time, means for initiating operation of said first tube, an output conductor, and means coupling all of said tubes to said conductor so that operation of each tube generates a distinct electric impulse in said conductor, said impulses occurring automatically in sequence upon initiating operation of said first tube; an impulse receiver including an input conductor, a plurality of electron tubes, means for supplying operating energy to said tubes, and a network coupling said tubes in an endless operative sequence so that said tubes automatically will operate successively one at a time upon successive electric impulses being impressed thereon; means coupling all of said tubes to said input conductor; and means for transmitting said impulse sequences from said output conductor to said input conductor.

56. An impulse emitter for emitting at high speeds impulse sequences having precisely controlled variable numbers of electric impulses comprising the combination of a plurality of electron tubes; means for supplying operating energy to said tubes; selectively operable means coupling said tubes in a sequence so that operation of the first tube of the sequence will cause automatically the selected tubes of the sequence to operate successively one at a time; means for initiating operation of said first tube; an output conductor; and means coupling all of said tubes to said conductor so that operation of each tube generates a distinct electric impulse in said conductor.

57. In combination, a plurality of gaseous electron tubes; connections between the tubes causing the tubes when rendered conductive to be rendered conductive serially; connections between the tubes including a capacitor coupling each two tubes causing the tubes to be operable one at a time; and a resistor between each two of the capacitors to eliminate potential surges of an oscillatory nature in said connections.

58. In combination, a plurality of denominational banks of electron discharge tubes, the tubes in a bank being coupled so that they operate consecutively one at a time; means supplying operating energy to said tubes; means to select the number of tubes, if any, to be operated in a bank; means connecting the banks; and means operated by the selecting means in cooperation with the connecting means whereby the banks in which a selection has been made are caused to be operated consecutively.

59. In combination, a plurality of electron tubes each having a cathode and an anode; an electric circuit supplying the cathode-anode potential; means connecting the tubes for operation in sequence one at a time; manual means for selecting which electron tubes shall operate; and automatic means including a gaseous triode electron tube actuating a solenoid switch rendered effective by the last of said selected tubes to operate for interrupting the said electric circuit immediately after the last of the selected electron tubes has operated.

60. In combination, a plurality of denominational banks of digit-representing electron tubes each having a cathode connected through a resistance to a potential supply circuit; a key associated with each tube; means including switches connecting the tubes in a bank so that they may operate serially from the lowest digit tube to and including the digit tube selected by operating a key which disconnects said connecting means by operating one of said switches; means connected with each bank for initiating an operation in that bank; means including a starting switch for causing the operation of the initiating means in the lowest denominational bank in which a key has been depressed; and means cooperating with an operated key switch for connecting the cathode of the last tube to operate in a bank to the initiating means in the next higher denominational bank in which a key has been depressed, whereby said means will deliver an electric impulse thereto to cause operation thereof.

61. In a calculating machine, in combination, a supply circuit for electric potential; an electric conductor; key means operable to connect the supply circuit to the conductor to cause an electric potential therein; a differential actuator consisting of a plurality of denominational banks of electronic devices, all banks served by said conductor; digit keys controlling the differential actuator; starting means for starting the operation of the electronic devices in each denominational bank, said starting means being operated by said electric potential; and a switching means controlled by each of the digit keys which connects the conductor to the starting means of the associated differential bank of the lowest denomination in which a digit key is depressed and disconnects that portion of the conductor serving other banks from the supply circuit, whereby said electric potential may be applied to said starting means and to no other denominational starting means.

62. In a calculating machine, in combination, a circuit supplying electric energy; a common electric conductor; key means operable to connect the supply circuit to the common conductor to cause an electric potential impulse therein; a differential actuator comprising a series of denominational banks of electronic devices controlled by associated banks of digit keys; starting means for each denominational bank, said starting means being rendered operable by an electric potential impulse; starting impulse conductors, one for each starting means and connected thereto; switching means controlled by the digit keys which connect the common conductor to the starting impulse conductor, the switch operated by a key of the differential bank of the first denomination of the series in which a digit key is depressed disconnecting the common conductor from the supply circuit, whereby an electric potential may be applied to the starting means of that denomination and to no other starting means; a means producing an electric potential impulse upon completion of the operation of a denominational bank of the differential actuator; and connections including a second switching means whereby the potential impulse produced by the completion of operation in a denominational bank is conveyed by the common conductor and the appropriate starting impulse conductor to the starting means of the next highest denomination in which a digit key has been operated.

63. In combination, a plurality of electron discharge tubes each having an anode and a cathode; means including a conductor supplied through a resistance with a source of electrode potential for causing a discharge between the anodes and cathodes in the tubes one at a time in sequence; and means coupling the electrode of each tube so supplied by the conductor to the conductor through a capacitor so as to cause a momentary potential impulse in the conductor as each tube discharges.

64. In combination, a plurality of gaseous electron discharge tubes each having a cathode, an anode, and a control element; means to supply said control element with a potential bias normally preventing an electric discharge between the anode and the cathode; a high resistance in the supply conductor common to the cathodes and a resistance in the cathode circuit of each tube; means connecting the cathode of each tube to the control element of the succeeding tube whereby the rise in the cathode potential upon a discharge occurring in one tube causes a rise in the control element potential in the next succeeding tube, which thereupon discharges; and means for coupling the cathode of each tube to the supply conductor whereby a rise in potential is caused in the conductor as each tube discharges.

65. In a calculating machine, in combination, an accumulator of numerical data including a denominational bank of electron tubes having a tube representing each digit of the denomination including zero, the sum of the accumulated data being represented in said accumulator by conduction of a tube in the bank corresponding to the digit value of said sum; and manually controlled means having a fixed sequence of operation for first causing any conducting tube of the bank to cease conducting and then causing the zero tube to become conducting.

66. In a calculating machine, in combination, an accumulator comprising electronic devices representing digits and zero; means to enter numerical data into the accumulator by causing a representative device to operate; an indicator; means to set the indicator in accordance with the data represented by the operating device; and means to clear the accumulator by causing any operating device, including the zero device, to cease operation, said means disabling the setting means of the indicator, which retains thereon the data which has last been cancelled from the accumulator.

67. In a machine of the class described, in combination, an accumulator of numerical data including a denominational bank of electron tubes, said bank having a tube representing the zero and each digit of the denomination; means controlling the operation of the tubes so that the sum of accumulated data is represented by causing a tube in the bank representing the sum of the accumulated data to become conducting; and means including a switch causing the conducting tube to cease conducting and then causing the zero tube to become conducting, thereby resetting the accumulator to zero.

68. An electronic accumulator comprising electronic means producing manifestations, respectively representative of digits entered, means controlled by electrical manifestations representative, respectively, of digits to be entered, for producing digit-representing impulses operable to adjust said electronic means, in steps, equal in number to the values of said respective digits to produce a different manifestation, indicative of the cumulative value of said digits, and means for resetting said electronic means comprising means apart from said adjusting means to return said electronic means to a preliminary reset condition, and means finally adjusting said electronic means to a zero manifestation.

69. An electronic accumulator comprising in each of a plurality of denominational orders an electrical network with electronic discharge means operable upon pulsing of the network input for producing sustained, selective, output voltage conditions in the network indicative of different digits, digit-representing devices for determining digits to be entered, electronic means controlled by said digit-representing devices for selectively producing electrical signals manifesting different digits to be entered in different order networks, electronic discharge entry means, controlled by said signals, for pulsing each said network input to operate the electronic discharge means in the network so as to progress the network through a number of voltage conditions proportional to the differential magnitude of the digit to be entered in said network, and carry producing means controlled by a lower order network when its capacity is exceeded for bringing about additional pulsing of a higher order network of said electronic discharge means to effect a carry entry therein.

70. An electronic apparatus comprising electronic discharge manifesting means containing pulse receiving control electrodes, continually energized electronic discharge entry means, potentials applied to which are variable, to emit a selective number of electrical pulses and to apply said pulses, to said control electrodes so as to change the electronic status of the manifesting means to produce a manfestation dependent upon the number of applied pulses, and digit determining means for effecting variations in potential of the electronic discharge entry means to cause said means to produce and apply a number of pulses dependent on the magnitude of a digit to be entered in the manifesting means.

71. In a calculating apparatus, the combination of a multidenominational accumulator having, for each denominational order, a plurality of electronic discharge devices, one for each digit of the denomination, an input conductor, and an electrical network connecting the electronic discharge devices in a closed chain and to the input conductor, whereby said devices will be caused to discharge successively in a predetermined sequence by the occurrence of successive electric pulses on said input conductor; a differential actuator for each order including a device for selectively manifesting a digit to be entered in such order and means controlled thereby for impressing on the input conductor for such order a chain of electric pulses corresponding in number to the digit manifested for entry in such order; a device for each denominational order operable to indicate the cumulative amounts therein; means for operating the indicating devices differentially to indicate any of the various digits which may be represented by the related denominational order of the accumulator; and means operating in synchronism with the indicating devices for testing the conducting and non-conducting condition of the electronic discharge devices and controlling the indicating device operating means so that the indicating devices will be operable to indicate the digits represented by the related denominational orders of the accumulator.

72. In combination, a plurality of electron discharge devices connected in an endless operative chain circuit including a resistance network wherein they may be made to discharge one at a time in sequence to represent symbols; a conductor representing each of said devices; means connecting said conductors with said devices so that a conductor will have one potential if its associated device is discharging and another potential if said associated device is not discharging; means automatically exploring the conductors sequentially for one having a potential indicative of a discharging device; and means controlled by the exploring means to present at a reading point a symbol corresponding to the discharging device.

73. In combination, value entry receiving means including a series of electronic members, each having either an on condition or an alternative off condition, circuits correlating the members for progressive alteration of their respective conditions and according high and low voltage points respectively determined by the different conditions of the members, means controlled by value manifestations for entering values into the receiving means by acting through said circuits to progressively alter the conditions of the members, means operable to manifest the different values of a notation; means testing the high and low voltage points of the circuits; and means controlled by the testing means for causing the manifesting means to be rendered effective selectively under control of the high voltage point of said circuits for manifesting the result of the entered values, each different high voltage point corresponding to a different one of the different values of a chosen notation.

74. In combination, a plurality of electron discharge devices; means connecting the devices in an endless operative chain circuit wherein they may be made to discharge one at a time in sequence to represent various digits, said connecting means including a resistance network; a conductor representing each of said devices; means connecting said conductor to said resistance network so that a conductor will have one potential if its associated device is discharging and another potential if its associated device is not discharging; indicating means; means to drive the indicating means to present digit symbols in succession at a reading point; testing means operable in synchronism with the indicating means for testing the potentials on the conductors; and means controlled by the testing means according to the potentials on said conductor to cause the indicator to be arrested in position to display the symbol of the digit represented by conducting and non-conducting condition of the discharge devices.

75. In combination, an electric conductor; a plurality of electronic devices, one of the electrodes of each device being connected to said conductor so that a change in potential of such an electrode will be conveyed to said conductor; means connecting the electronic devices for operation one at a time in sequence; and means to differentially control the number of impulses in a given sequence by controlling the number of electronic devices to operate in sequence.

76. A group of electron tubes; circuits connecting the tubes so that a selected number of said tubes may be rendered fully conductive one at a time in self-timed sequence; a second group of electron tubes; a conductor connecting the first group of tubes and the second group of tubes; and means coupling the second tubes in an endless operative chain so that they will be rendered fully conductive one at a time in sequence timed by the sequence of the selected tubes of the first-named group of tubes through the conductor connecting the two groups of tubes.

77. A group of electron tubes; circuits connecting the tubes so that a selected number may be rendered fully conductive one at a time in self-timed sequence; a second group of electron tubes; a conductor connecting the first group of tubes and the second group of tubes; and means coupling the second group of tubes in an endless operative chain so that they will be rendered fully conductive one at a time by reason of and in the sequence intervals between the bringing to full conductivity of the selected tubes of the first-named group.

78. The combination of a plurality of electron tubes connected in an endless operative chain wherein but one tube at a time operates; means to cause the tubes to operate in sequence in response to impulses of electric energy impressed thereon, each impulse causing a step in the sequence of operation; means for producing electric impulses differentially, said means comprising a group of gaseous electron tubes arranged to operate selectively in sequences of varying numbers, each operation of a tube causing an impulse of electric energy; and means for transmitting said impulses from the impulse-producing means to the endless chain of tubes.

79. In a calculating machine, in combination, means including a plurality of electron tubes rendered conducting in selected numbers for generating and emitting a differentially selected number of electrical impulses; an accumulator of numerical data having electron discharge tubes as digit-representing elements; means connecting the tubes to cause them to operate sequentially in response to said impulses to represent the sum of accumulated data, said connecting means including timing elements such that the speed of operation of the accumulator is correlated to that of the impulse generator by the substantially inertialess factors of resistance, capacity, inductance, and ionization time; and means for transmitting said impulses from the generating and emitting means to said accumulator.

80. In a calculating machine, the combination of a plurality of denominational rows of electron discharge tubes; means coupling the tubes of each row so that they may be discharged in sequence one at a time, from the beginning of a row, different extents toward the end thereof in one operation; a group of electron tubes for each denominational row; means coupling the tubes of each group so that they may be discharged in sequence one at a time in an endless chain a number of times beginning with the tube following the one last discharged; a conductor connecting each row of tubes with its associated group of tubes, said conductor having an electric impulse impressed thereon each time a tube in a row is discharged, which impulse discharges the next tube in sequence in the associated group of tubes; and means connecting the groups of tubes so that when the tubes of a group of a lower denomination have been discharged once around the chain from a beginning point, an electric impulse will be impressed upon the conductor for the next higher denominational order.

81. A numerical accumulator comprising a series of banks of electronic devices, one bank for each numerical denomination of the accumulator, each bank including an electronic device corresponding to and representing each digit of the denomination; means connecting the electronic devices of each bank in an endless operative chain so that the devices will be brought successively to full conductivity upon the impression of successive electric impulses thereon; an input conductor for each bank, connected to the devices thereof, for transmitting thereto electric impulses corresponding in number to the digits, in the corresponding denomination, of items to be entered in the accumulator one denomination at a time; means to transfer carry-over data between banks; and selectively controlled means for impressing said digit-representing impulse sequences on selected ones of said input conductors.

82. An impulse emitter for emitting at high speeds impulse sequences having precisely controlled variable numbers of electric impulses comprising the combination of a plurality of anode-cathode pairs; means for supplying operating energy thereto; a network including control means for the anode-cathode pairs coupling said pairs in a sequence so that electron flow between the anode and cathode elements of the first pair of the sequence will cause automatically electron flow to occur between the elements of the remaining pairs of the sequence successively, one pair at a time, said network including a means in which the electron flow between the elements of each pair generates a distinct electric impulse; means for initiating electron flow between the elements of the first pair; and selectively operable means controllable to determine the number of successive electron flows to occur automatically in sequence between the elements of said pairs upon initiating said flow between the elements of said first pair.

83. Apparatus of the class described comprising the combination of a group of anode-cathode pairs; a network including anode-cathode control means coupling said pairs so that electron flow will be caused to occur between the anode and cathode elements of the pairs, one pair at a time, in automatic self-timed sequence; a second group of anode-cathode pairs; a second network including anode-cathode control means coupling the pairs of the second group so that electron flow may be caused to occur between the elements of said pairs, one pair at a time, in sequence, by successive electric impulses; a conductor; means coupling said first network to said conductor so that an electric impulse will be generated therein for each electron flow between elements of pair of the first group; and means to impress the successive impulses produced in said conductor upon the second network, whereby, at each impulse, electron flow will be initiated between the elements of the pair of the second group next in sequence to that pair between the elements of which electron flow is occurring at the time an impulse is impressed on the second network.

84. An apparatus of the class described comprising a set of electron tubes; a network including control means for the electron tubes coupling the tubes of said set in sequence so that, upon initiation of operation of the first tube of the sequence, the remaining tubes of said sequence will self-operate successively one at a time; means for supplying operating energy to said tubes; a conductor connected to said network so that an electric impulse will be generated therein for each operation of a tube of the sequence; a second group of electron tubes; a second network including control means for the electron tubes coupling the tubes of said second group in an endless operative sequence so that said tubes will be caused to operate successively, upon the impressing of successive electric impulses upon said second network, said networks being such that the interval between successive operations of the tubes of the second group may be less than the interval between successive operations of the tubes of the first group; and means for transmitting the impulses impressed on said conductor by successive operations of the tubes of the first group to said second network.

85. An electronic accumulator comprising in each of a plurality of orders, a plurality of cyclically operable electronic elements, each operable to an on and to an off condition, under control of successive electrical manifestations, means interconnecting said elements whereby the on condition of one element conditions the next succeeding element, to be turned on, upon application of an electrical manifestation thereto, entry control means, controlling the application of said electrical manifestations to said elements, in proportion to the value of digits to be entered, carry means, controlled by the on condition of one of said elements of a said order and further controlled by the operation of said entry control means in said one order, to produce a carry from said order to the next higher order, and means controlled by the on condition of a chosen element in the said next higher order and by the aforementioned carry means to produce a carry to the still next higher order.

86. In combination with a plurality of electronic trigger circuits comprising a value registering order and electrically interrelated for differential value registering operation, electrical means to convert representations of different digits into related electrical manifestations, and electronic means selectively controlled by said manifestations for acting upon said circuits to effect successive triggering operations thereof as to perform registering operations differentially varying in accordance with the magnitudes of the represented digits.

87. In combination, an electronic accumulator having ordered organizations of electronic elements, each organization including a plurality of electronic elements and circuits interrelating them for progressive amount designating operation, multi-order amount determining means, and entry control means controlled thereby and acting through the circuits of the ordered organizations for variably effecting such progressive operations of the organizations, each such operation in accordance with the variable magnitude of the correspondingly ordered digit of a determined amount, whereby entry of the digits of said determined amount into the respectively ordered organizations of the accumulator is effected, and electronic discharge carry control means interrelating the ordered organizations to control carry from one order into another.

88. An electronic commutator or the like, comprising source means for successive electrical pulses, a series of electronic discharge tube means having their input circuits connected to said source means, means so conductively interconnecting said series of tube means into a closed ring as to adjust the constants of their circuits for producing successive operation of the tube means in a cyclic manner by successive pulses received by their input circuits from said source means, and means for resetting said ring to a chosen status including means conditioning said ring to a preliminary reset condition and means finally adjusting said ring to said chosen status.

89. In combination, electronic accumulating means comprising, in each order, electronic digit manifesting means selectively producing a plurality of discrete, static, electrical conditions, each of said conditions being indicative of a different digit, means selectively producing electrical manifestations of digits to be entered, means controlled thereby for operating the electronic digit manifesting means of an order step by step through a number of steps dependent upon the digit to be entered in said order so as to produce a condition therein indicative of the cumulative value of such entered digit and of previously entered digits, and electronic discharge carry means controlled by one such order for effecting a step of operation of the electronic means of a higher order to enter a carry value therein.

90. An electronic totalizer comprising a succession of electronic discharge members, each member capable of assuming either an on condition or an off condition, for selectively manifesting different digits, means so connecting said members, one to another, that, at any time, only one member is in on condition, the digit being manifested corresponding to the particular member in on condition, and entry control means controlled by a digit manifestation for stepping said on condition through said entire succession.

91. An electronic accumulator comprising a plurality of electronic elements for producing distinctive patterns of electronic manifestations, each representative of a different digit, means producing a series of pulses, proportional to the value of a digit to be entered, sequentially operating different numbers of said elements, in proportion to the value of the digits to be entered, and electronic carry producing means, including means controlled by a manifestation in a predetermined one of said elements, for producing a carry effect.

92. An electronic accumulator comprising a plurality of electronic elements for producing separate electronic manifestations, of either of two kinds, the different patterns of said separate manifestations being, respectively, representative of different digits, means sequentially operating different numbers of said elements, in proportion to the values of digits to be entered, to assume either one of said two kinds of separate manifestations, and means, including means controlled by manifestations in a chosen one of said elements, to produce a carry effect.

93. A machine in which higher and lower orders of entry receiving means are denominationally related by carry control means, said machine comprising electronic discharge means, in the higher order, alterable in discharge status to selectively produce manifestations respectively indicative of different digits, entry control means responsive to a digit signal for bringing about alteration in discharge status of said discharge means so as to adjust the manifestations according to the signaled digit, and means, exclusive of said entry control means and responsive to operation of the carry control means for acting, apart from the entry control means to bring about supplemental alteration in discharge status of the electronic discharge means so as to adjust the manifestations according to a carry entry, whereby carry is effected from lower to higher order.

94. In combination, electronic accumulating means comprising in each order an electrical network of electronic discharge means operable in response to pulses impressed upon the network to selectively produce patterns of a plurality of static, electrical conditions, each pattern indicative of a different digit, means to selectively produce electrical manifestations of the digits of a plural order number to be entered, means controlled thereby for applying a number of pulses to the network of each order in proportion to the value of the digit to be entered in the order so as to operate the electronic discharge means thereof to produce a pattern indicative of the cumulative value of such entered digits, and electronic discharge carry means controlled by one order for producing a carry entry into an adjacent order, whereby, through such digit and carry entries, successively entered plural order numbers may be accumulated and their total indicated by the patterns in the different orders of the accumulating means.

95. An electronic accumulator comprising a plurality of electronic elements each including an energized electronic emitting device and associated circuits, operable to either of sustained electrical on and off conditions upon application of successive control electrical manifestations, means interconnecting said elements in a closed chain, whereby upon application of successive control manifestations, said elements are cyclically sequentially operated, and each operated sequentially to an on and to an off condition, means, controlled by a manifestation representative of a digit to be entered, limiting the number of applications of said control manifestations, in proportion to the value of said digit, to thereby step the on condition of said elements, sequentially about said chain of elements, the element in on condition manifesting the corresponding digit, and said means, controlled by a manifestation representative of another digit to be entered, limiting the number of applications of said control manifestation, in proportion to the value of said second digit, to step the on condition of said element about said chain, to thereby indicate the cumulative value of said digits.

96. An electronic accumulator comprising in each denominational order, a plurality of cyclically operable electronic elements, each operable to an on and to an off condition under control of successive electrical manifestations, means interconnecting said elements whereby the on condition of one element conditions the next succeeding element, to be turned on, upon application of an electrical manifestation thereto, entry control means controlling the application of said electrical manifestations to said elements, in proportion to the value of digit to be entered, and carry means, controlled by an on condition of one of said elements in one order and further controlled by the operation of said entry control means in said one order, to introduce a carry value into another order.

97. An electronic accumulator comprising electronic digit manifesting means producing a manifestation indicative of a digit entered, step by step operable means for altering the manifestation of said means, and means producing controlling electrical manifestations representative, respectively, of digits to be entered, controlling operation of said altering means for a number of steps equal to the value of the respective digits to be entered, whereby said electronic digit manifesting means is adjusted to produce a manifestation indicative of the cumulative value of said digits.

98. An electronic accumulator comprising circuits including electronic devices for manifesting the sum of successive amounts entered, means for determining a chosen time period for operation of said electronic devices, entry means for imparting sequential steps of operation to the devices, each step in a differential portion of said time period, and means for controlling the operation of said entry means through a number of such differential time portions varying in proportion to the value of each of successive digits to be entered to thereby determine the number of said steps of operation imparted to the devices in accordance with the respective digit to be entered.

99. An electronic accumulator comprising electronic indicating means for producing an electronic manifestation, differentially positioned within a predetermined series of positions, means for controlling the operation of said electronic means to differentially position said manifestation in steps, varying in number in accordance with the period of said control operation, and means controlling said operation controlling means for periods in proportion to the value of successive digits, whereby said manifestation is stepped and differentially positioned within said predetermined series of positions in accordance with the cumulative value of digits entered.

100. An accumulator comprising in each denominational order, a plurality of electronic elements for producing individual electronic manifestations, each representative of one, only, of the digits of a chosen notation, means sequentially operating different numbers of said elements, in proportion to the value of a digit to be entered, said sequentially operating means when controlled by manifestations representative respectively of different digits to be entered, sequentially operating said electronic elements to produce a manifestation representative of the cumulative value of said digits, means controlled by the passage of one of said orders from an electrical condition representative of the highest to an electrical condition representative of the lowest digit of said notation to control carry into a first next order, and means controlled by an electrical condition in the latter order, representative of the highest digit in said notation and by said carry control means to control further carry into a second next order.

101. In combination with a plurality of electronic discharge devices comprising a register order and circuits interrelating them for progressive value registering operation, read-out means to selectively produce a representation of a digit of a notation, and electronic means coacting with said read-out means to control said circuits for causing the discharge devices to perform a progressive value registering operation to an extent varying in accordance with the magnitude of the digit represented.

102. A digit totalizing apparatus comprising in each order a mechanically inertialess commutator-like organization of grid-controlled electronic discharge tubes operable to selectively statically manifest different digits of a notation, means for entering digits in such organization, under control of digit representations, by bringing about the grid-controlled operation of the tubes to manifest the cumulative value of a plurality of such entered digits, means controlled by passage of one order organization from a manifestation of the highest digit of the notation to a manifestation of the lowest digit of the notation for producing an electrical carry manifestation, means controlled thereby for bringing about grid-controlled tube operation of the next higher order organization of discharge tubes so as to enter a carry value in the latter organization, and means controlled by the said next higher order organization upon manifesting the highest digit of the notation and further controlled by said electrical carry manifestation for bringing about grid-controlled tube operation of the still next higher order organization of tubes also to enter a carry value therein.

103. A totalizing apparatus comprising a commutator-like organization of grid-controlled electron tubes operable to selectively, statically manifest different digits of a notation, means for entering digits in the organization, under control of digit representations, by bringing about grid-controlled operation of the tubes to manifest the cumulative digital value of a plurality of such entered digits, means electrically testing for a carry condition of the organization, and electronic discharge tube means controlled by said organization and by said testing means for producing an electrical carry manifestation.

104. A totalizer comprising in each denominational totaling order a network of electronic trigger circuits, each operable from one electronic sustained condition to another such condition, means electrically coupling the circuits of a network for sequential operation, means electrically connected to each order network of electronic circuits for impressing pulses on the network to operate a number of the circuits sequentially dependent upon the number of impressed pulses, and electronic discharge means controlled by one order network when its totaling capacity is exceeded, for bringing about additional pulsing of a next order network of the trigger circuits to effect a carry entry therein.

105. An accumulator comprising in each order a network of trigger circuits, each containing electronic discharge means with pulse reactive means for changing the electronic status of the discharge means in response to pulses so as to trip the circuit from one electrical condition to another, said circuits by their electrical conditions selectively manifesting different digits of a notation, mechanically stationary means so operatively connecting the circuits of the network as to enable them to be tripped sequentially, entry control means for controlling pulsing of said pulse receiving means so as to change the status of the discharge means of different numbers of said circuits sequentially in proportion to the value of a digit to be entered, means for selecting the digits to be entered and rendering the entry control means effective in accordance with the selected digits, and means controlled by an order network concomitantly with passage thereof from highest digit manifesting condition to lowest digit manifesting condition for producing a carry entry into another order network of the trigger circuits.

106. An electronic accumulator or the like, comprising, in each of a plurality of denominational orders, a plurality of electronic circuits for producing electronic manifestations selectively representative of different digits of a notation, variable entry means for each order for producing a variable series of pulses, in accordance with the differential magnitudes of different determined digits of the notation for sequentially operating different numbers of said circuits of the order according to the magnitudes of the digits to be entered in the order, and electronic carry producing means, conditioned by the manifestation representative of the highest digit of the notation produced in a said order of circuits and rendered effective by the pulsing of said order of circuits to alter the manifestation to a manifestation representative of the lowest digit of the notation, for bringing about the pulsing of another such order of electronic circuit to enter a carry value therein.

107. An electronic apparatus comprising electronic discharge manifesting means containing pulse receiving control electrodes, means producing a plurality of electrical pulses, entry means applying said pulses to said control electrodes so as to change the electronic status of the manifesting means to produce a manifestation indicative of the number of said pulses applied, and selectively effective electronic means for controlling the number of said pulses, in accordance with the magnitude of a digit.

108. An electronic accumulator comprising, in each of a plurality of denominational orders, a plurality of electronic circuits for producing electronic manifestations, each representative of a different digit of a notation, electrical connections to couple the circuits of each order for sequential digit manifesting operation, means comprised of variable entry control means and digit determining means for each order for sequentially operating different numbers of said circuits of the order in accordance with the differential magnitudes of different determined digits of the notation, and means controlled by the sequential operation of chosen ones of the circuits of a said order to bring about carry entry into a higher order of said electronic circuits.

109. In combination with a series of electronic trigger circuits, comprising a register order and interrelated for progressive value registering operation, electronic discharge means to transmit an electrical manifestation of a representation of a digit of a notation, and means responsive to the transmitted manifestation for effecting sequential tripping operations of said circuits to perform a progressive value registering operation to an extent varying in accordance with the magnitude of the digit represented.

110. A numerical accumulator comprising a series of banks of electronic devices, one bank for each numerical denomination of the accumulator, each bank including an electronic device corresponding to and representing each digit of the denomination; means connecting the electronic devices of each bank in an endless operative chain so that the devices will be brought successively to full conductivity upon the impression of a sequence of successive electric impulses thereon; an input conductor for each bank, connected to the devices thereof, for transmitting thereto sequences of electric impulses corresponding in number of impulses in the sequence to the digit, in the corresponding denomination, of an item to be entered in the accumulator; means to transfer carry-over data between banks; and selectively controlled means for impressing said digit-representing impulse sequences on the input conductor of an order.

111. In a calculating apparatus, the combination of a plurality of electronic discharge devices forming a denominational order of an accumulator, there being one of said devices for each digit of the denomination; an input conductor common to said devices; an electrical network connecting said devices in a closed chain and to said input conductor, whereby said devices will be caused to discharge successively in a predetermined sequence upon the occurrence of successive electric pulses on said input conductor; means for selectively manifesting a digit to be entered into said order of the accumulator; and an instrumentality controlled by said manifesting means for impressing upon said input conductor a chain of electric pulses corresponding in number to the digit manifested by said means.

112. In a calculating apparatus, the combination of a plurality of electronic discharge devices forming a denominational order of an accumulator, there being one of said devices for each digit of the denomination; an input conductor common to said devices; an electrical network connecting said devices in a closed chain and to said input conductor, whereby said devices will be caused to discharge successively in a predetermined sequence upon the occurrence of successive electric pulses on said input conductor; means for selectively manifesting a digit to be entered into said order of the accumulator; and an instrumentality controlled by said manifesting means for generating and impressing upon said input conductor a chain of electric pulses corresponding in number to the digit manifested by said means.

113. In a calculating apparatus, the combination of a plurality of electronic discharge devices forming a denominational order of an accumulator, there being one of said devices for each digit of the denomination; an input conductor common to said devices; an electrical network connecting said devices in a closed chain and to said input conductor, whereby said devices will be caused to discharge successively in a predetermined sequence upon the occurrence of successive electric pulses on said input conductor; means for selectively manifesting a digit to be entered into said order of the accumulator; and an instrumentality including electronic discharge devices controlled by said manifesting means for impressing upon said input conductor a chain of electric pulses corresponding in number to the digit manifested by said means.

114. In combination, an electronic accumulator comprising ordered organizations of electronic elements, each organization including a plurality of electronic elements and circuits interrelating the elements for progressive digit designating operation, multi-order amount determining means to produce ordered manifestations of the digits of determined amounts, one amount at a time, ordered electronic entry control means controlled by said ordered manifestations to serve through the circuits of the correspondingly ordered organizations for causing progressive digit designating operations of the organizations, each such operation in accordance with the magnitude of the correspondingly ordered digit of a determined amount, and carry control means conditioned by one organization when its capacity is exceeded for causing a progressive digit designating operation of an adjacent order in accordance with a carry value.

115. An electronic totalizer comprising a succession of electronic discharge members, each member capable of assuming either an on or an off condition for selectively representing different digits, means so connecting said members, one to another, that one member at a time is in on condition, selective entry control means controlled by a digit manifestation for stepping the on condition of said members through said entire succession, and means controlled by the change in position in said succession of the member in on condition from one particular position to another particular position to produce a carry manifestation.

116. In combination, an electronic accumulator comprising electron emitting means for producing electronic representations indicative of any of the values one to nine and zero as a result of an entry or an accumulation of entries; entry control means selectively operable to control the entry of any of the digit values one to nine into said accumulator; electronic entry means for producing groups of impulses corresponding to the several digit values and including circuits controlled by said control means, according to the digit desired to be entered, for controlling the operation of the entry means to produce the required number of impulses; and connections between the entry means and the accumulator to transmit the impulses to the accumulator to cause an entry of the corresponding digit value into the accumulator.

117. In combination, an order of electronic means producing manifestations of different values, means to adjust said manifestations progressively for a differential period varying according to a value entered, means for intermittently testing throughout the said differential period of adjustment for passage of the electronic means beyond the limit value manifestation thereof, value receiving means, and means controlled by the order of electronic means and by said testing means and effective collaterally with said passage for entering a carry value in said receiving means.

118. In a system of the class described, potential source means, a first circuit network comprising electric space discharge tube means including a plurality of tubes having electrode means to which potentials are applied for selectively producing space discharge manifestations in various different ones of said tubes indicative of different digits of a notation, means for selecting different digits to be entered, a second circuit network comprising electric space discharge tube means including a plurality of tubes having electrode means varied in potential under control of said selecting means to produce space discharge changes of said latter tube means corresponding in numbers according to the selected digits, a circuit coupling the output of said second circuit network to the input of said first circuit network to apply potential changes to the electrode means of the first mentioned tube means, in response to the space discharge changes of the second mentioned tube means, for advancing the space discharge manifestations of the first mentioned tube means proportionally to the selected digits, a work circuit including a space discharge tube altered in space discharge status to cause the work circuit to manifest advance of the manifestations of said first network beyond the manifestation indicative of the last digit of the notation, and a circuit controlled by said first mentioned tube means, upon the last mentioned advance in its manifestations, for producing a controlling change in potential upon an electrode of the tube in said work circuit.

119. In an apparatus of the class described, electric potential source means, means for selecting different digits to be entered, a network of electronic discharge tube means including a plurality of tubes and connected circuits energized by potentials derived from the source means, different ones of said tubes being selectively operable to produce electric manifestations selectively of different digits and said tubes and circuits being responsive to digit-entry-effecting changes of potential for progression of its manifestations, by selective discharges in the tubes, proportionally to the cumulative value of successive digits entered, an electronic discharge tube circuit electrically coupled to said network and operable to produce digit-entry-effecting changes of potential in the network corresponding in number according to the selected digit, and circuits operatively connecting the digit-selecting means, to said discharge tube circuit for applying potentials, derived from said source means, to said tube circuit to operate the latter for producing only the selected number of digit-entry-effecting changes of potential in said network whereby said network is controlled so that a plurality of such digit entries made in succession result in the production of an electrical manifestation by the discharge in the tube in the network corresponding to the cumulative value of the entered digits.

120. An electronic device comprising electronic digit manifesting means forming a value registering order, said manifesting means including a plurality of electrodes between which are formed a plurality of electron discharge paths and circuits interconnecting the electrodes to be operable characteristically to manifest, by selective electronic discharges in various ones of said paths of said order, various digits and further operable to cause the discharge to occur in various ones of the paths to accumulate digit values, manifesting the digits of the sums of the accumulated values by discharges between the electrodes related to the paths corresponding to these digits; electronic entry means controllable according to the digit values to be entered for causing the operation of the manifesting means to enter digit values therein; means for selecting digit values for entry; and means controlled by the selecting means for controlling the electronic entry means according to the selected digits.

121. An accumulator comprising a plurality of electronic devices arranged in different denominational orders, respectively, the electronic device of each order including a plurality of electrodes providing a plurality of electron discharge paths related to different digits and circuits interconnecting the electrodes for controlling the selective discharge in the various paths according to the digits in the accumulator, said devices being operable to accumulate amounts and represent the resulting digits by the selective discharges in the discharge paths related to these digits; control devices for effecting the operation of the electronic devices in the several orders in accordance with the respective digits composing a multi-denominational amount to be entered, and causing, by selective conduction in the discharge paths in each of said electronic devices, the manifestations of totals, in accordance with selective entries; digit-selecting means for selecting the digits of said multi-denominational amount and for controlling the control devices accordingly; and means controlled by a certain electrical manifestation produced by an associated device passing through a predetermined one of said digit-representing conditions in one order to produce a carry in another order.

122. In a device of the class described, the combination of an impulse-responsive circuit network including electron discharge tube means and interconnections therebetween, said circuit network being operable to accumulate digit entries in response to digit-representing impulses and to produce static electrical manifestations corresponding to the sum of entered digits and previously-entered digits; electronic entry means controllable by electric signals, each indicative of a different digit, and electrically connected to said network to supply said digit-representing impulses corresponding in number to the digit to be entered to said network to bring about the entry of a selected digit value corresponding to the electric signal applied to the entry means, so as to cause an accumulation in the network in accordance with this digit value, whereby a plurality of such digit entries made in succession result in the production of a static electrical manifestation by the network of the cumulative value of the entered digits; and means for selecting each such digit to be entered by applying the corresponding electric signal to the electronic entry means.

123. In a device of the class described, the combination of an electronic accumulator operable in response to impulses to produce discriminative static electronic manifestations of different digit values; electronic entry means selectively operable to produce digit-representing impulses corresponding in number to the digit to be entered which impulses can cause an accumulative operation of the electronic accumulator to enter selected digits of an amount therein; means to couple the entry means to the accumulator to apply the digit-representing impulses to the accumulator to cause an operation thereof, said accumulator at the termination of an entry of an amount therein statically and electronically manifesting the total of the addition of the amount entered and the amount previously manifested; and value-selecting means for controlling the selective operation of the entry means according to an amount to be entered into the accumulator.

124. The combination of a plurality of electronic circuits comprising a value-registering order and electrically interrelated so that various ones of the electronic circuits will be selectively operable to represent digits in differential value-registering operations; means to convert representations of different digits into related electrical manifestations; and electronic means selectively controlled by said manifestations for acting upon said circuits to effect successive operations thereof to perform registering operations differentially varying in accordance with the magnitudes of the represented digits.

125. In combination with a plurality of electronic discharge means comprising a value receiving and registering order and circuits interrelating them for progressive value registering operation; means to convert representations of different digits into related differentially timed electrical manifestations; and electronic discharge means controlled by said manifestations for acting through said circuits to cause differential extents of progressive value registering operation thereof according to the differential timing of said manifestations.

126. In combination, an electronic accumulator having denominationally ordered organizations of electronic elements, the organization for each denominational order including a plurality of electronic elements and circuits interrelating them for selective operation of various ones of said elements to represent digits in amount-registering operation; multi-order amount-determining means; and entry control means controlled thereby and acting through the circuits of the various ordered organizations for variably effecting such registering operations of the organizations, each such operation in accordance with the variable magnitude of the correspondingly ordered digit of a determined amount, whereby entry of the digits of said determined amount into the respectively-ordered organizations of the accumulator is effected.

127. In combination with a plurality of electronic discharge devices comprising a register order and circuits interrelating them for selective operation of various ones of said devices to represent digits in a value-registering operation; means to selectively produce a representation of a digit of a notation; and electronic means coacting with the aforementioned means and operating through said circuits for causing the discharge devices to perform a value-registering operation to an extent varying in accordance with the magnitude of the digit represented by said aforementioned means.

128. A totalizing apparatus comprising electronic digit-manifesting means including a plurality of electrodes providing a plurality of electron discharge paths related to the different digits and interconnections between said electrodes, said means operable to selectively, statically manifest different digits of a notation by selective discharge between the electrodes forming various ones of the paths and further operable to accumulate digit values by causing the discharge to occur between different electrodes forming the discharge paths and manifesting the digits of the sum of the accumulated values by the discharge between the electrodes related to those digits; means for entering digits into the electronic digit-manifesting means, under control of digit representations, by bringing about the changing of the paths in which discharge takes place; means electrically testing for a carry condition of the manifesting means; and electronic discharge tube means controlled by a discharge between certain electrodes of said manifesting means and by said testing means for producing an electrical carry manifestation.

129. In combination with a series of electronic trigger circuits, comprising a register order and interrelated for accumulative value-registering operation; electronic discharge means to transmit an electrical manifestation of a digit of a notation; and means responsive to the transmitted manifestations for effecting operation of said circuits to perform an accumulative value-registering operation to an extent varying in accordance with the magnitude of the digit represented.

130. In an apparatus of the class described, the combination of an accumulating device including a plurality of electronic devices and circuits interconnecting them for step-by-step operation in response to electric impulses to accumulate amounts; means settable to represent a digit of an amount; electronic read-out means controlled by the settable means for reading the digit of the amount in the settable means and transmitting a corresponding number of impulses to the accumulating device; means to apply an initiating signal to the read-out means to initiate a read-out operation; and means to produce a signal when the read-out operation has been completed.

131. In an apparatus of the class described, the combination of a multi-denominational-order accumulator having in each order a plurality of electronic devices and circuits interconnecting the devices for step-by-step operation in response to impulses to accumulate entries in that order; multi-denominational-order means settable to represent a multi-denominational-order amount; read-out means controlled by the settable means for reading the amount therein and transferring, to respective orders of the accumulator, groups of impulses, each group containing impulses corresponding in number to the amount set in its related order of the settable means; means to apply an initiating signal to the read-out means to initiate an amount transfer operation; and means to provide a signal when the transfer of the amount has been completed.

132. In a device of the class described, the combination of means settable to represent a digit value; electron discharge means controlled by the means on which the digit value is set and operable to produce a group of impulses corresponding in number to the set digit value; and an accumulating device operated by the impulses of the group and including a plurality of electronic devices and circuits interconnecting them for step-by-step operation in response to the impulses to accumulate amounts.

133. In an apparatus of the class described, the combination of an accumulating device including a plurality of electronic devices and circuits interconnecting them for step-by-step operation in response to electric impulses to accumulate amounts; means settable to represent a digit of an amount; electronic read-out means controlled by the settable means for reading the digit in the settable means and transmitting a corresponding number of impulses to the accumulating device; and means to apply an initiating signal to the read-out means to initiate a read-out operation with the consequent transfer of the amount to the accumulator.

134. In an electronic accumulator operable in response to electrical impulses derived from a source means for successive electrical impulses, the combination of ordered organizations of electron discharge devices connected to the source means to be operated by impulses therefrom, each organization including a plurality of electron discharge devices and circuits interrelating the devices for accumulating operation in response to said impulses, said devices representing digits of amounts by the selective discharge therein; means for resetting the organizations to a chosen status including means for conditioning each organization to a preliminary reset condition; and means finally adjusting each organization to said chosen status.

135. An electronic commutator or the like, comprising source means for successive electrical pulses, a series of electronic discharge tube means having their input circuits connected to said source means, means so conductively interconnecting said series of tube means into a closed ring as to adjust the contents of their circuits for producing successive operation of the tube means in a cyclic manner by successive pulses received by their input circuits from said source means, and means for resetting said ring so that a chosen tube means is operating, including means to cause any operating tube means to cease operating and means thereafter directly controlling said chosen tube means to cause it to operate.

136. An electronic accumulator comprising a plurality of electron discharge devices, each device operable to an "on" condition and to an "off" condition; circuits interrelating the devices for progressive amount-registering operation in which the devices represent the digits "0" and "1" to "9" by their selective operation in "on" condition; and reset means for the accumulator including means operable to cause any "on" devices to operate to their "off" condition, and including means thereafter operable to cause the devices to be operable to provide a "0" representation.

JOSEPH R. DESCH.
ROBERT E. MUMMA.

REFERENCES CITED

The following references are of record in the file of this patent:

UNITED STATES PATENTS

| Number | Name | Date |
|---|---|---|
| Re. 13,632 | Piscicelli | Oct. 21, 1913 |
| 945,912 | Cleal | Jan. 11, 1910 |
| 988,327 | Foster | Apr. 4, 1911 |
| 1,039,988 | Molina | Oct. 1, 1912 |
| 1,044,597 | Sugden et al. | Nov. 19, 1912 |
| 1,166,517 | Goldberg | Jan. 4, 1916 |
| 1,842,950 | Robertson | June 26, 1932 |
| 1,946,615 | Demarest | Feb. 13, 1934 |
| 2,074,066 | Wheeler et al. | Mar. 16, 1937 |
| 2,076,335 | Dallenbach | Apr. 6, 1937 |
| 2,088,474 | Haller | July 27, 1937 |
| 2,099,065 | Holden | Nov. 16, 1937 |
| 2,118,424 | Watanabe | May 24, 1938 |
| 2,131,117 | Conover | June 21, 1938 |
| 2,146,862 | Shumard | Feb. 14, 1939 |
| 2,157,690 | Clough | May 9, 1939 |
| 2,158,285 | Koch | May 16, 1939 |
| 2,176,932 | Smith | Oct. 24, 1939 |
| 2,210,574 | Fitch | Aug. 6, 1940 |

OTHER REFERENCES

Proceedings of the Royal Society of London, Series A, volume 132, Wynn-Williams, pages 295–310; 1931.

Proceedings of the Royal Society of London, Series A, volume 136, Wynn-Williams, pages 312–324; 1932.

"A Triode Vacuum Tube Scale of Two Circuits," R. S. I., volume 9, Lifschutz and Lawson, pages 83–89; March 1938.

"Electronic Switching Circuits," Electrical Engineering, Shumard, volume 57, pages 209–220; May 1938.

"Trigger Circuits," Electronics, pages 14–17; August 1939.